(12) United States Patent
Coyle et al.

(10) Patent No.: US 6,502,212 B1
(45) Date of Patent: Dec. 31, 2002

(54) METHOD AND APPARATUS FOR BUS PARAMETER OPTIMIZATION USING PROBES OF SYSTEM CONFIGURATIONS

(75) Inventors: Joseph P. Coyle, Leominster, MA (US); Garry M. Tobin, Atkinson, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/386,564

(22) Filed: Aug. 31, 1999

(51) Int. Cl.$^7$ ................................................. G06F 11/00
(52) U.S. Cl. ........................................... 714/43; 710/15
(58) Field of Search .............................. 714/43, 44, 45, 714/47, 56, 39, 37, 33, 25; 710/15, 16, 17, 18, 58

(56) References Cited

U.S. PATENT DOCUMENTS

| | | |
|---|---|---|
| 4,451,886 A | 5/1984 | Guest et al. |
| 4,691,294 A | 9/1987 | Humpleman |
| 4,716,525 A | 12/1987 | Gilanyi et al. |
| 4,797,815 A | 1/1989 | Moore |
| 4,864,496 A | 9/1989 | Triolo et al. |
| 4,881,165 A | 11/1989 | Sager et al. |
| 5,001,712 A * | 3/1991 | Splett et al. ................... 371/3 |
| 5,138,257 A * | 8/1992 | Katsura ................... 324/158 R |
| 5,357,195 A * | 10/1994 | Gasbarro et al. ......... 324/158.1 |
| 5,359,235 A | 10/1994 | Coyle et al. |
| 5,406,147 A | 4/1995 | Coyle et al. |
| 5,440,722 A | 8/1995 | VanderSpek et al. |
| 5,450,572 A | 9/1995 | Ruedinger et al. |
| 5,452,436 A | 9/1995 | Arai et al. |
| 5,461,330 A | 10/1995 | Gist et al. |
| 5,479,123 A | 12/1995 | Gist et al. |
| 5,499,338 A | 3/1996 | Gercekci et al. |
| 5,534,811 A | 7/1996 | Gist et al. |
| 5,574,866 A | 11/1996 | Smith et al. |
| 5,592,658 A | 1/1997 | Noam |
| 5,596,715 A * | 1/1997 | Klein et al. ............. 395/183.19 |
| 5,600,824 A | 2/1997 | Williams et al. |
| 5,628,027 A * | 5/1997 | Belmont ..................... 395/821 |
| 5,634,014 A | 5/1997 | Gist et al. |
| 5,654,653 A | 8/1997 | Coyle et al. |
| 5,657,456 A | 8/1997 | Gist et al. |

(List continued on next page.)

Primary Examiner—Nadeem Iqbal
(74) Attorney, Agent, or Firm—Kudirka & Jobse, LLP

(57) ABSTRACT

A bus tuning system is provided for determining the configuration of an electronic device and for testing and tuning a bus system of the electronic device specifically for its configuration, the bus system including a bus interface coupled with a bus characterized by a number of parameters. The system has a mechanism for determining the configuration of the electronic device; a mechanism for injecting a set of stimulus patterns on the bus; a mechanism for collecting information regarding operation of the electronic device corresponding to the stimulus patterns, including information identifying any error resulting from the set of stimulus patterns; a mechanism for comparing the collected information with information corresponding to the configuration of the electronic device; a mechanism for determining, responsive to the comparing mechanism, whether the electronic device is operating within a predetermined set of operating specifications; and a mechanism for adjusting values of one or more of the parameters by varying one or more electronic characteristics of the bus interface in response to a set of digital control signals to obtain a set of operating and signaling parameters of the bus interface that cause the electronic device to operate within the predetermined set of specifications.

28 Claims, 40 Drawing Sheets

U.S. PATENT DOCUMENTS

| | | | |
|---|---|---|---|
| 5,687,330 A | | 11/1997 | Gist et al. |
| 5,701,409 A | * | 12/1997 | Gates .................... 395/183.06 |
| 5,729,678 A | * | 3/1998 | Hunt et al. ............ 395/183.19 |
| 5,819,053 A | | 10/1998 | Goodrum et al. |
| 5,844,913 A | * | 12/1998 | Hassoun et al. ........... 371/21.1 |
| 5,951,705 A | * | 9/1999 | Arkin et al. ................ 714/738 |
| 5,978,934 A | * | 11/1999 | Gates .......................... 714/41 |
| 5,996,034 A | * | 11/1999 | Carter ....................... 710/100 |
| 6,049,894 A | * | 4/2000 | Gates .......................... 714/41 |
| 6,134,621 A | | 10/2000 | Kelley et al. |
| 6,163,824 A | * | 12/2000 | Quackenbush et al. ..... 710/100 |
| 6,182,248 B1 | | 1/2002 | Armstrong et al. |

* cited by examiner

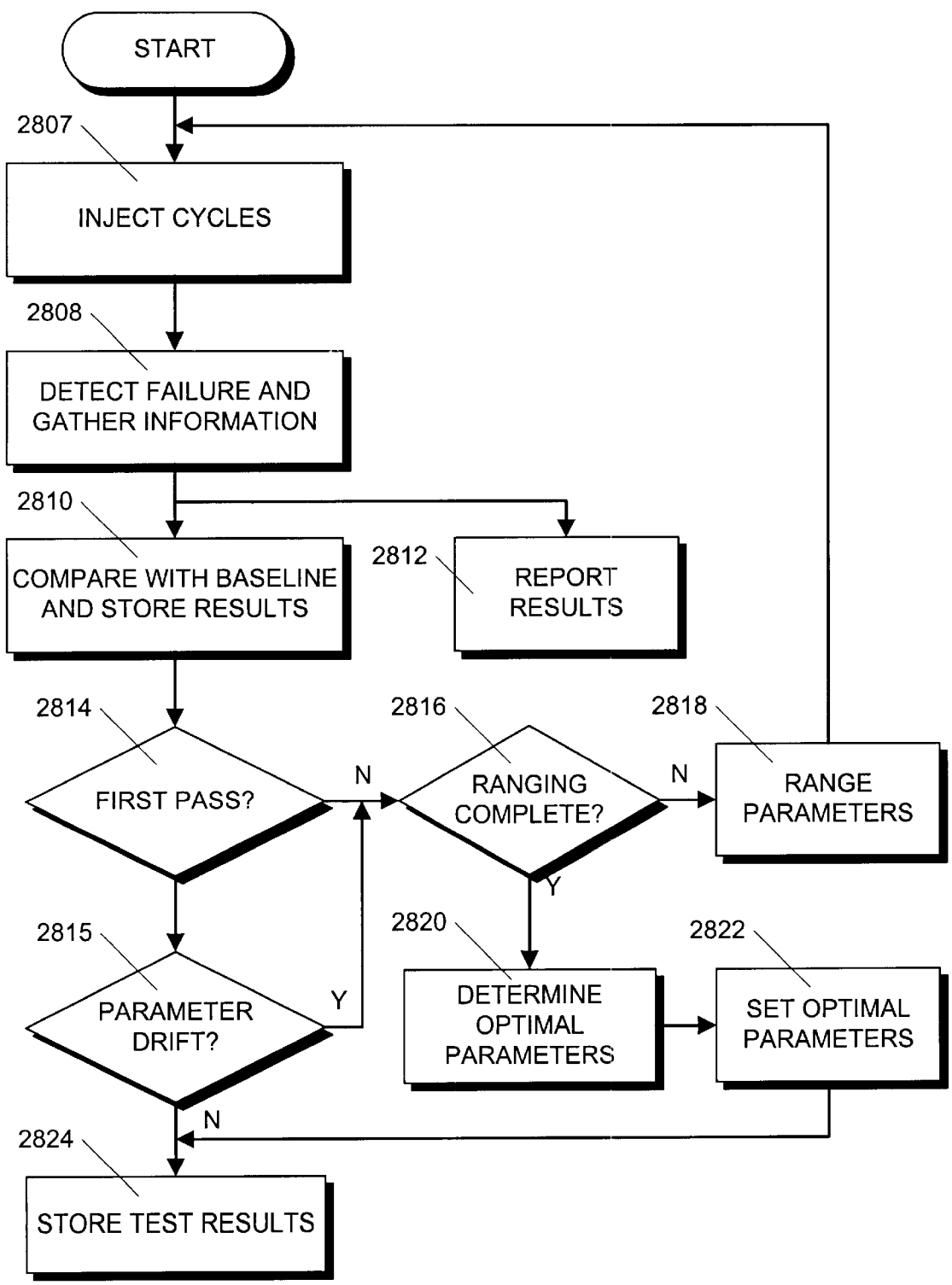
*FIG. 28B HASS SECONDARY TESTING*

METHOD AND APPARATUS FOR BUS PARAMETER OPTIMIZATION USING PROBES OF SYSTEM CONFIGURATIONS

RELATED APPLICATIONS

The present patent application is related to the following co-pending, commonly-assigned U.S. patent applications, which are incorporated by reference herein in their entirety:

1) Ser. No. 09/387,660, entitled "Method And Apparatus For Operational Envelope Testing of Busses to Identify HALT Limits" (P3587), filed on even date herewith by Joseph P. Coyle and Garry M. Tobin.
2) Ser. No. 09/386,563, entitled "Method and Apparatus for Programmable Adjustment of Bus Driver Propagation Times" (P3621), filed on even date herewith by Garry M. Tobin and Joseph P. Coyle.
3) Ser. No. 09/386,809, entitled "Method and Apparatus for Programmable Adjustment of Bus Termination Resistance (P3623) filed on even date herewith by Garry M. Tobin and Joseph P. Coyle.
4) Ser. No. 09/387,320, entitled "Method and Apparatus for Inducing Bus Saturation During Operational Testing of Busses Using a Pattern Generator" (P3624) filed on even date herewith by Joseph P. Coyle and Garry M. Tobin.
5) Ser. No. 09/386,553, entitled "Method and Apparatus for Extracting First Failure and Attendant Operating Information from Computer System Devices" (P3625) filed on even date herewith by Garry M. Tobin and Joseph P. Coyle.
6) Ser. No. 09/387,120, entitled "Method and Apparatus for Programmable Adjustment of Computer System Bus Parameters" (P3614) filed on even date herewith by Garry M. Tobin and Joseph P. Coyle.
7) Ser. No. 09/386,985, entitled "Method and Apparatus for HASS Testing of Busses Under Programmable Control" (P3723) filed on even date herewith by Joseph P. Coyle and Garry M. Tobin.

FIELD OF THE INVENTION

This invention relates generally to computer systems, and more particularly to identifying, capturing, isolating and diagnosing errors in computer system operation.

BACKGROUND OF THE INVENTION

As is known in the art, bus adapters and other devices are connected to a bus through bus interfaces and occupy physical bus locations for device interconnection called "bus slots". A bus interface is typically designed for a particular type of bus, and is responsible for complying with the signaling requirements of the bus, sometimes called its "bus protocol". The bus protocol includes the bus' electrical, physical and logical characteristics for reliable bus transfers. The bus interface generally includes bus drivers and bus receivers to send and receive, respectively, signals over the bus in accordance with the bus protocol. Essentially, each device connected to the bus has a separate instance of a bus interface for each line of the bus, each including a driver for driving that line and a receiver for sensing voltages on that line and resolving them into logic states. Bus protocols are typically specified by manufacturers and often by standards-making organizations. Bus adapters include bus interfaces for each of the busses to which they are connected.

For operation of the bus, certain of the devices can initiate requests to gain control of the bus to perform, for example, a memory access such as a "read" or "write" operation. Such operations require the requesting device (e.g., a central processing unit (CPU) and the responding device (e.g., a memory) to exchange a number of bus signals. Initially, the requesting device needs to acquire control of the bus. This can be effected, e.g., through arbitration, which generally requires the exchange of arbitration and other handshaking signals over the bus with other bus devices such as a bus arbiter and/or other potential requesting devices. Then, after eventually gaining control, the requesting device needs to assert the appropriate command line, e.g., the read line or the write line, to designate the type of operation. Additionally, for memory operations, the requesting device needs to place address information on address lines of the bus to identify the memory addresses to be accessed. Finally, the responding device needs to respond to the command, e.g., the memory needs to place data onto the bus from the addressed locations, or receive data from the bus and store them at the addressed locations.

For purposes hereof, a "bus transaction" can be defined as the set of all bus signals (e.g., handshaking, command, address and data) asserted after the requesting device has gained control of the bus, which are used to complete a logical task, such as a "read" or "write" operation, performed over the bus. Devices connected to the bus transmit the signals of a bus transaction in synchrony with the bus' clock. A "bus cycle" refers to the number of bus clock cycles required to perform a bus transaction. During a bus cycle, the requesting device asserts certain bus lines in accordance with the bus protocol, and the responding device scans certain bus lines to ascertain the information contained in handshaking, command, address, and data signals also in accordance with the bus protocol.

To assert a bus line, a bus device drives the bus line to a high voltage level or a low voltage level during each of one or more clock ticks during a bus cycle. The high voltage and low voltage levels correspond to digital LOGIC HIGH and LOGIC LOW states. To scan a bus line, a bus device typically detects the voltage on the line at a particular time, e.g., at a rising or falling edge of the bus clock, and determines whether the detected voltage is at a high or low level. The voltage level on certain lines determines, for example, whether the transaction is a read or a write, and, on other lines, whether the data includes a LOGIC HIGH or LOGIC LOW during the corresponding tick of the bus clock. Many bus lines are only driven for a portion (often only a small portion) of the bus cycle of a bus transaction.

Computer system architecture has advanced dramatically in performance and complexity. In terms of performance, computer systems can achieve higher clock speeds with increased bus widths and lower bus operating voltages. Increased bus clock speeds, measured usually in megahertz (MHz) can allow data to be transferred faster over the, computer system's bus, thereby allowing computer applications to run faster. The size of a bus, known as its width, corresponds generally to the number of data lines in the bus and determines how much data can be transmitted in parallel at the same time; thus, wider busses typically transfer data faster. Lower bus operating voltages can advantageously also reduce power consumption, which is important, for example, in miniaturization of integrated circuits and in mobile computing for extending battery operating times. Unfortunately, lower operating voltages can make bus signals more susceptible to signaling errors due to lower signal-to-noise ratios and to signal distortion. Such noise and signal distortion can make it difficult for bus receivers to differentiate correctly, e.g., between data logic states, thus potentially yielding erroneous data.

Transient and other non-predictable errors in the received bus signals can also arise from other causes as well, and often have deleterious impacts on computer system performance. Such errors can arise, for example, from degradation over time of bus drivers and receivers in bus interfaces. Bus errors can also arise due to non-compatibility of add-on components such as adapter cards that are integrated into the computer system after installation at a customer site, and connected to one of the computer's busses, e.g., through "plug and play" operation. Where such adapter cards malfunction or simply exhibit operating parameters unanticipated by the original computer manufacturer, transfer errors can arise on the bus to which they are connected. Such bus errors can result in lost or corrupted data or hanging of the bus protocol so as to prevent completion of a bus transaction. In extreme cases, bus errors can cause system crashes.

For diagnosing bus error conditions, it is often necessary to reproduce the errors. For example, when an error occurs during normal transfers over a system bus of a computer system, it may be necessary to drive the system bus with the same set of stimuli under the same conditions as when the error occurred in order to determine its causes. It may prove difficult to apply such stimuli and reproduce the error conditions under control of the computer's operating system due to the complexities involved.

It would be desirable to provide a technique for testing bus operation to determine whether the bus is likely to perform adequately during actual operating conditions, and to assess the likelihood of bus transfer errors. Such testing should preferably lend itself for use in design verification and quality assurance prior to shipment from a system manufacturer, as well as in field servicing to assure bus operation has not degraded after installation at a customer's facility. It would also be desirable to be able to run such testing in electronic devices using designed-in (i.e., embedded) testing features rather external testing apparatus that may affect testing results and are cumbersome, time-consuming and costly to use.

SUMMARY OF THE INVENTION

The invention resides in a computer system or other electronic apparatus in which bus testing logic is built into (i.e., embedded in) at least some of the devices connected to the bus to enable these devices to perform diagnostic testing of the bus and their bus interfaces. Under control of the test logic, the devices drive the bus with output voltages corresponding to a set of predetermined test bit patterns. For example, each test bit pattern is selected to cause the bus to reach a target bus utilization or saturation level. Each test bit pattern can include a plurality of digital values corresponding to drive voltages for the bus for testing that target bus utilization level over a bus cycle of a bus transaction. The bus signals produced by the devices propagate along the bus and are received by other devices. The received bus signals are resolved into a received bit pattern. The received bit pattern can be compared with the test bit pattern used to generate the bus signals in order to detect discrepancies, or a first failure resulting from the test can be captured, as described in the above-referenced patent application entitled "Method and Apparatus for Extracting First Failure and Attendant Operating Information From Computer System Devices".

The invention permits system stress testing without the need of instruction stream generated cycles. The testing can be performed, for example, for purposes of design verification, diagnostic testing after an error has been encountered, or on a regular basis, e.g., as part of power on self-test (POST) procedures. The invention permits deterministic saturations of the bus when and where desired, e.g., for inducing various forms of error conditions, such as system-level bottlenecks and latencies, in a reproducible manner. The invention can also be used to associate a "victim" bit on a bus with its "aggressor" bit, and thus trace causes of bus error conditions.

More specifically, the invention can be embodied in a test system for testing communications over a bus connecting a number of electronic devices, e.g., components of a computer system. The test system is preferably embedded in the devices themselves rather than in apparatus external to them, and is responsive to digital control signals, e.g., conforming to JTAG, for scanning test data into and out of the devices. The test system has a stress injection module for injecting a set of stimulus patterns on the bus; an error identification module for identifying an error resulting from the set of stimulus patterns; a bus tuning module for adjusting one or more bus operating and signaling parameters by varying one or more electronic characteristics of the bus interface in response to a set of digital control signals so that testing can be performed at one or more of a number of different sets of operating and signaling parameters; a programmable control module for providing the digital control signals to the bus tuning module; and a presentation module for presenting a plurality of results of the testing. The test system can be implemented, for example, for performing HALT testing, in which the presentation module provides test results specifying a failure envelop. The test system can also be implemented, for example, for performing HASS testing, in which a bus system is tuned so as (a) to establish the normal operating envelop and recommended specifications for the device or system; (b) to maintain substantially "like new" operation of the bus interface of an electronic device after a period of use, and correct for parameter drift and other parameter time-dependent and use-dependent variations in signaling and operating parameters; and (c) to optimize operating and signaling parameters, e.g., for communication over a bus of an individual computer system as it is configured at a customer's facility, and/or for particular customer applications.

In yet another aspect of the invention, a tuning system can be provided for use in tuning an electronic device such as a computer system to take into account loading and noise and other contributions of configuration changes made after shipment by a manufacturer, e.g., by downstream parties such as system integrators and end-users. The tuning system can include a probe mechanism or configuration tables for determining types of devices in the system; a parameter look-up table for providing operating and signaling parameter values for the devices in the system; and a tuner and analyzer for tuning the bus to obtain the values of the operating and signaling parameters or optimized values thereof.

BRIEF DESCRIPTION OF THE DRAWINGS

The above and further advantages of the invention may be better understood by referring to the following description in conjunction with the accompanying drawings in which:

FIGS. 28A through 28D are block diagrams of an exemplary method for performing respective HASS baseline-establishing testing and the HASS secondary testing on electronic devices.

DETAILED DESCRIPTION

A system for testing and tuning busses in accordance with an illustrative embodiment of the invention will now be described. As set forth below in separate sections, the bus testing system includes a number of components including a mechanism for inducing bus saturation using a pattern generator (Section I), a mechanism for first failure capture (Section II), and a mechanism for bus tuning (Section III). These components come together into a bus testing system (Section III), which can perform HALT and HASS testing, and, in some embodiments, tune the bus based, in part, on device configuration.

I. Bus Testing by Inducing Bus Saturation Using a Pattern Generator

A) Electronic System

Figure 1:
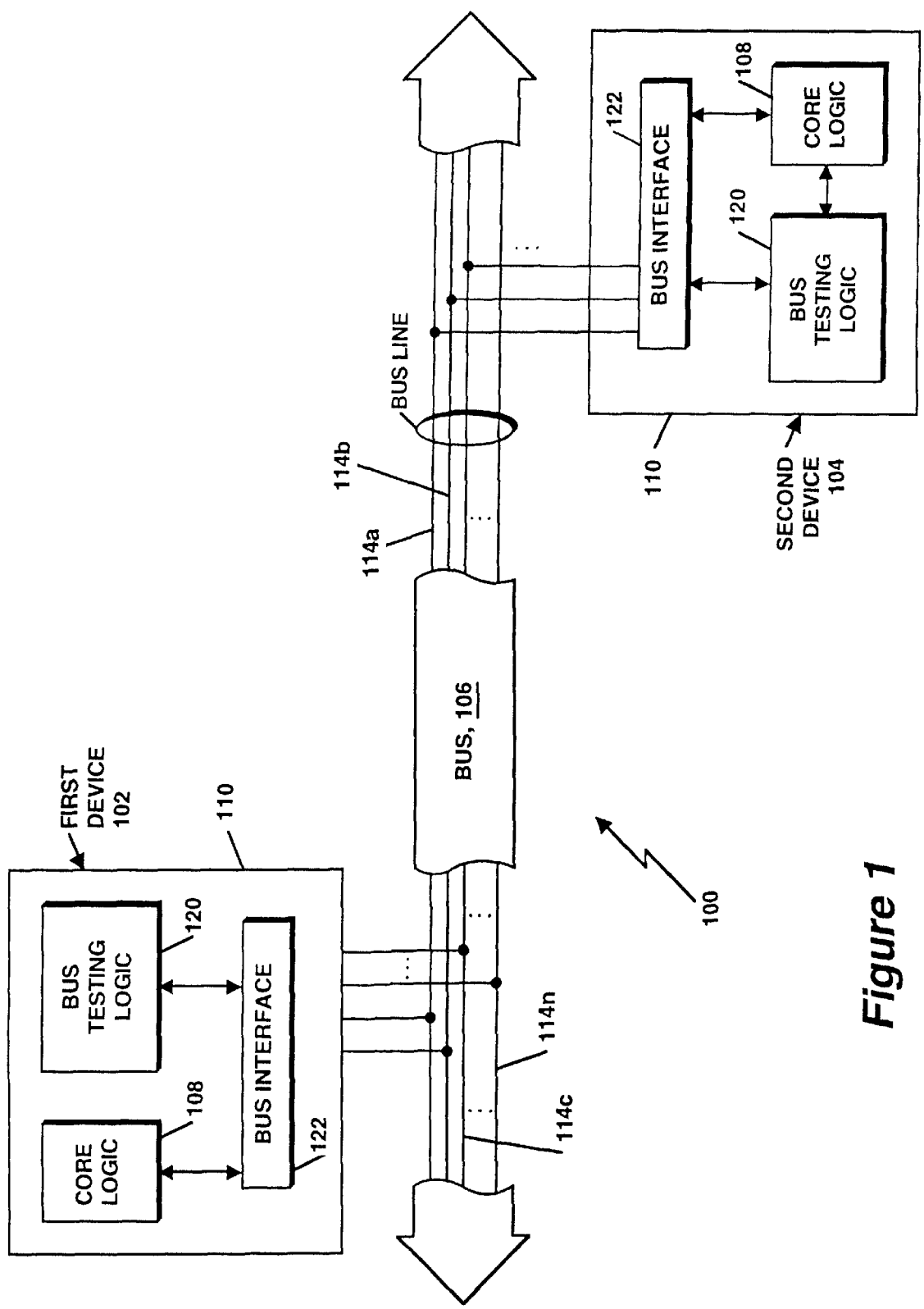
FIG. 1 is a block diagram of an electronic system having first and second functional devices interconnected by a bus and bus testing logic in accordance with an embodiment of the invention with respect to cycle injection.

FIG. 1 shows an electronic system 100 having first and second devices 102, 104 interconnected for communication therebetween by a bus 106, which illustrates an aspect of the invention regarding bus testing using cycle injection. While only two such devices are shown for illustrative purposes, the invention can be implemented with any practical number of such devices. The electronic system 100 can be, for example, a computer system, such as, e.g., a workstation, server, or personal computer. The electronic system 100 can also be, for example, a communication device such as a cellular phone, or even, foreseeably, a video game console, entertainment system, or other electronic apparatus or instrument having a processor (such as a microprocessor or digital signal processor) or controller. Alternatively, the electronic system 100 can comprise a network of computer systems or other network-capable electronic apparatus or instruments, which are interconnected by a communication channel, which will be referred to herein as a bus.

For ease of explanation, the devices 102, 104 are shown as containing the same components. Each device 102, 104 has conventional core logic 108 for performing the respective device's intended functions. For example, where the electronic system 100 is a computer system, the devices 102, 104 can be, e.g., a CPU and a memory module, and the core logic 108 of each can be responsible, respectively, for processing and storing computer program instructions and data. Each device 102, 104 also includes novel, bus testing logic 120 for testing the bus 106, as described in detail, by injecting a predetermined sequence of voltage levels, high or low, so that they can be analyzed after traversing the bus. The bus testing logic 120 can be implemented in software, firmware, hardware, or a combination, depending on the application, and is preferably implemented on the same printed circuit board or application specific integrated circuit (ASIC) as the rest of the device. A bus interface 122 connects the core logic 108 and bus testing logic 120 to the bus 106, and is responsible for driving the bus 106 or receiving signals from the bus 106. Thus, for example, in order for the first device 102 to send a message to the second device 104, the core logic 108 of the first device 102 provides address, data and control information to the bus interface 122 of the first device 102, which converts the information into bus signals that, after gaining control of the bus 106, it sends over the bus to the second device 104. The bus signals must comply with the bus protocol specified for bus 106, including its electrical, physical, and logical requirements.

Figure 2A:
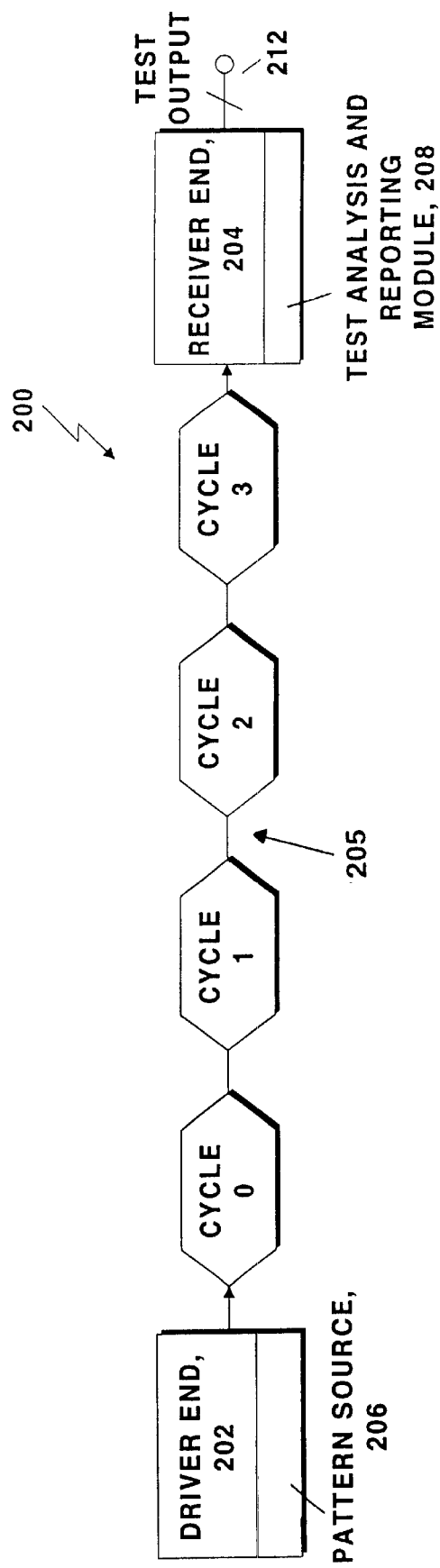
FIGS. 2A and 2B are illustrations of a unidirectional and a loopback testing methodology, respectively, which can be implemented by the electronic system of FIG. 1.
Figure 2B:
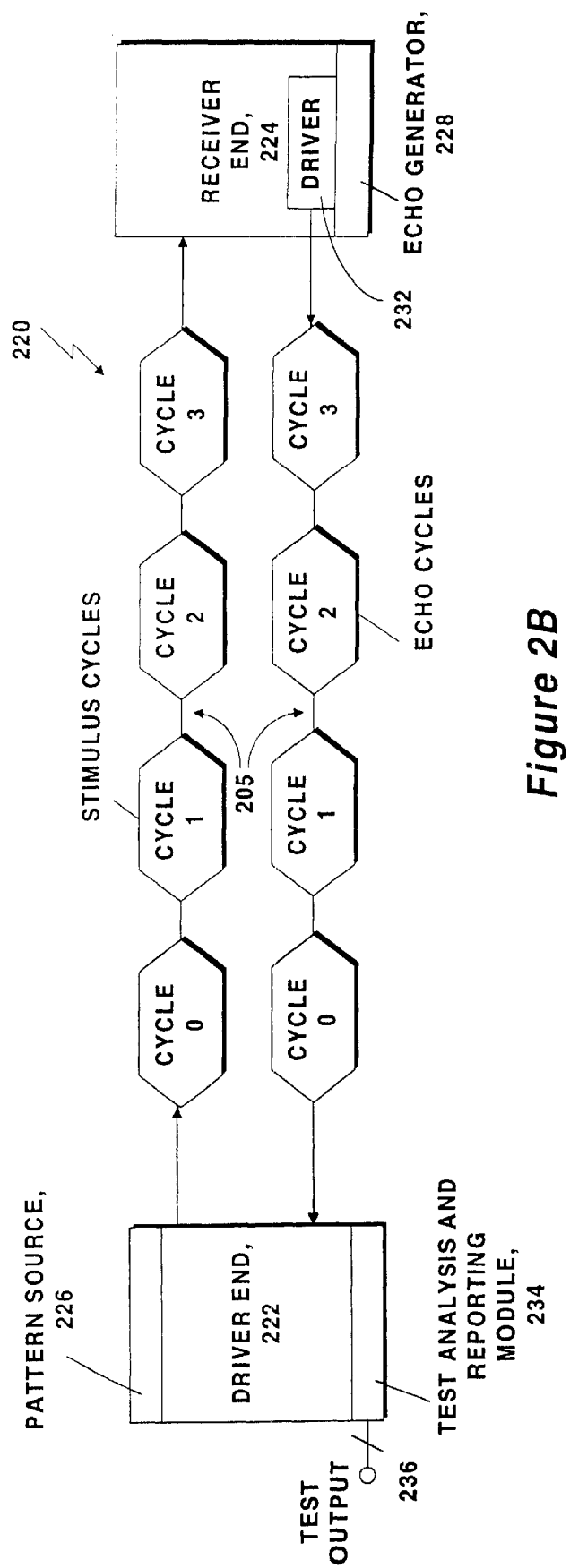

FIG. 2A and FIG. 2B show alternative methodologies for testing the bus 106. In FIG. 2A, a unidirectional testing methodology 200 is illustrated, in which a driver end 202, e.g., at first device 102 of FIG. 1, sends a predetermined sequence of bus testing voltages over the bus 205 to a receiver end 204, e.g., at the second device 104 of FIG. 1. The voltage level sequence is sent over the bus during a number of bus cycles, denoted Cycle 0, Cycle 1, etc. as stimulus cycles; hence the test entails "cycle injection." A pattern source 206 in the driver end 202 provides the voltage level sequence, called a "pattern", and a test analysis and reporting module 208, e.g., in the receiver end 204 analyzes the received bus signals and reports the results over test output link 212. Alternatively, as noted below, the receiver end 204 can forward the received stimulus cycles, e.g., over link 212, to an external processor for analysis of any errors that may have arisen during transmission and reception.

In FIG. 2B, a loopback testing methodology 220 is illustrated, in which (a) a driver end 222, e.g., at first device 102 of FIG. 1, sends a predetermined bus testing voltage pattern over the bus 205 to a receiver end 224, e.g., at second device 104 of FIG. 1, and (b) the receiver end 224 stores the received pattern and, after gaining control of the bus 205, forwards it back to the driver end 222. Accordingly, the pattern traverses the bus 205 twice, once in a forward direction and once, during loopback, in the reverse direction. Note that, for illustration purposes, the bus 205 is shown for the forward pattern signal and, separately, the reverse pattern signal. In loopback testing, a pattern source 226 in the driver end 202 provides the voltage level pattern for driving the bus, called the stimulus cycles. An echo generator 228 in the receiver end 224 responds to the stimulus cycles by generating a replica version of the received stimulus cycles, called echo cycles or simply "echo", which, after gaining bus control, a driver 232 at the receiver end 224 are sent over the bus 205. A test analysis and reporting module 234, this time located in the driver end 222, can analyze the echo cycles for any errors that may have arisen during transmission and reception of the stimulus cycles, and transmission and reception of the echo signals, and report the results over output link 236. Alternatively, the driver end 222 can forward the received echo signals, e.g., over link 212, to an external processor for analysis.

Figure 2C:
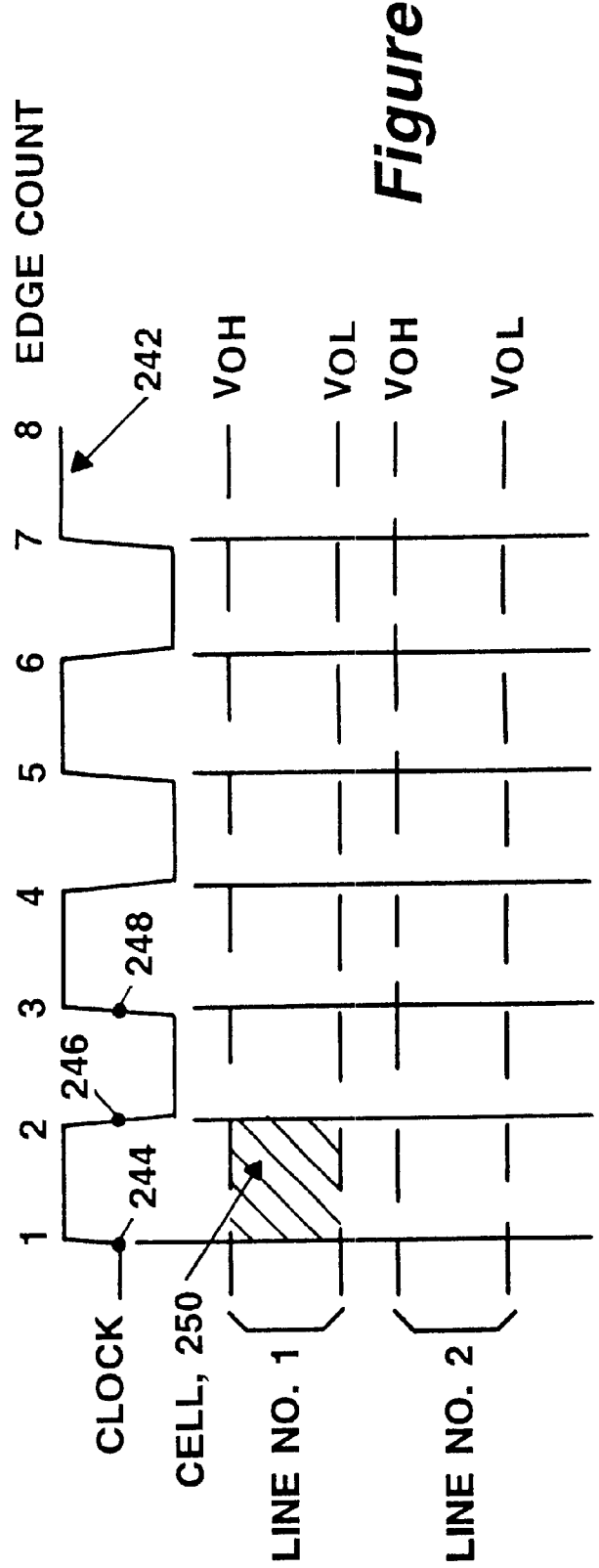
FIG. 2C is an illustration of a number of waveforms useful in understanding the concept of a voltage sequence pattern applied to the bus for stressing a bus system per FIGS. 2A and 2B.

FIG. 2C shows a number of waveforms useful in conveying an understanding of the voltage sequence pattern as just described in conjunction with FIGS. 2A and 2B. The top waveform in FIG. 2C is a CLOCK 242, which is characterized by a frequency, i.e., a number of clock cycles over a period of time (Hertz). A clock cycle includes an upward or positive tick, as noted between points 244 and 246 of the waveform 242, and an adjacent downward or negative tick, as noted between points 246 and 248. The clock is Used to synchronize signals on the various bus lines, of which Line No. 1 and No. 2 are depicted. Line Nos. 1 and 2 are representative of the control, address, and data lines of the bus. Theoretically, each line can be driven during each tick to either a high voltage level $V_{OH}$ or to a low voltage level $V_{OL}$, e.g., to represent different logic states, with $V_{OH}$ and $V_{OL}$ representing voltage limits for the driver output. Accordingly, as illustrated, $V_{OH}$, $V_{OL}$ and the boundaries of each tick form a rectangularly-shaped cell, as shown at 250, with a different cell formed at each tick at each line.

In practice, the bus protocol will generally specify that certain bus lines are only asserted during certain times and for certain durations, and commencing only at certain leading or trailing edges of a tick. (An edge count is noted at the top of FIG. 2C.) Moreover, the bus protocol may also specify the maximum number of clock cycles in a bus transaction. For example, a bus transaction can consist of nine clock cycles, and thus 18 cells on each line. Some bus protocols also specify a dead time between bus cycles, during which the bus lines normally used during a bus transaction may not be asserted. Thus, the bus is normally used for signaling during bus transactions for only a portion of the time. In other words, the bus lines No. 1 and No. 2 are normally asserted (either HIGH or LOW) during only a portion of the total number of bus cells, e.g., less than the 18 cell total.

Bus line utilization or bus saturation,:as it is often called, is usually expressed as a percentage. For example, one hundred percent (100%) utilization of a bus line occurs when the bus line is asserted, e.g., during all cells of a transaction (e.g., 18 cells), fifty percent (50%) utilization occurs when the bus line is asserted during half the cells of a transaction (9 cells in the example), etc. This should be contrasted with use of the term bus saturation in another sense, in which it means 100% of available bus bandwidth (bus cycles) being utilized, with or without taking into account constraints on bus bandwidth imposed by the bus protocol. Accordingly, three different definitions of bus saturation percentage emerge, which can apply in various applications of the invention:

(1) the ratio of the number of cells used to the number of cells occurring during test duration, times 100%;

(2) the ratio of the number of bus cycles used to the number of bus cycles available, times 100%;

(3) the ratio of the number of bus cycles used to the number of bus cycles available under bus protocol, times 100%.

During testing, the invention can apply various preselected stimuli patterns to the bus, and can increase the frequency of their application so as to increase bus saturation percentages. At each pattern application and/or saturation level, the test apparatus can seek to identify the occurrence of any errors induced by the test signals.

Figure 3:
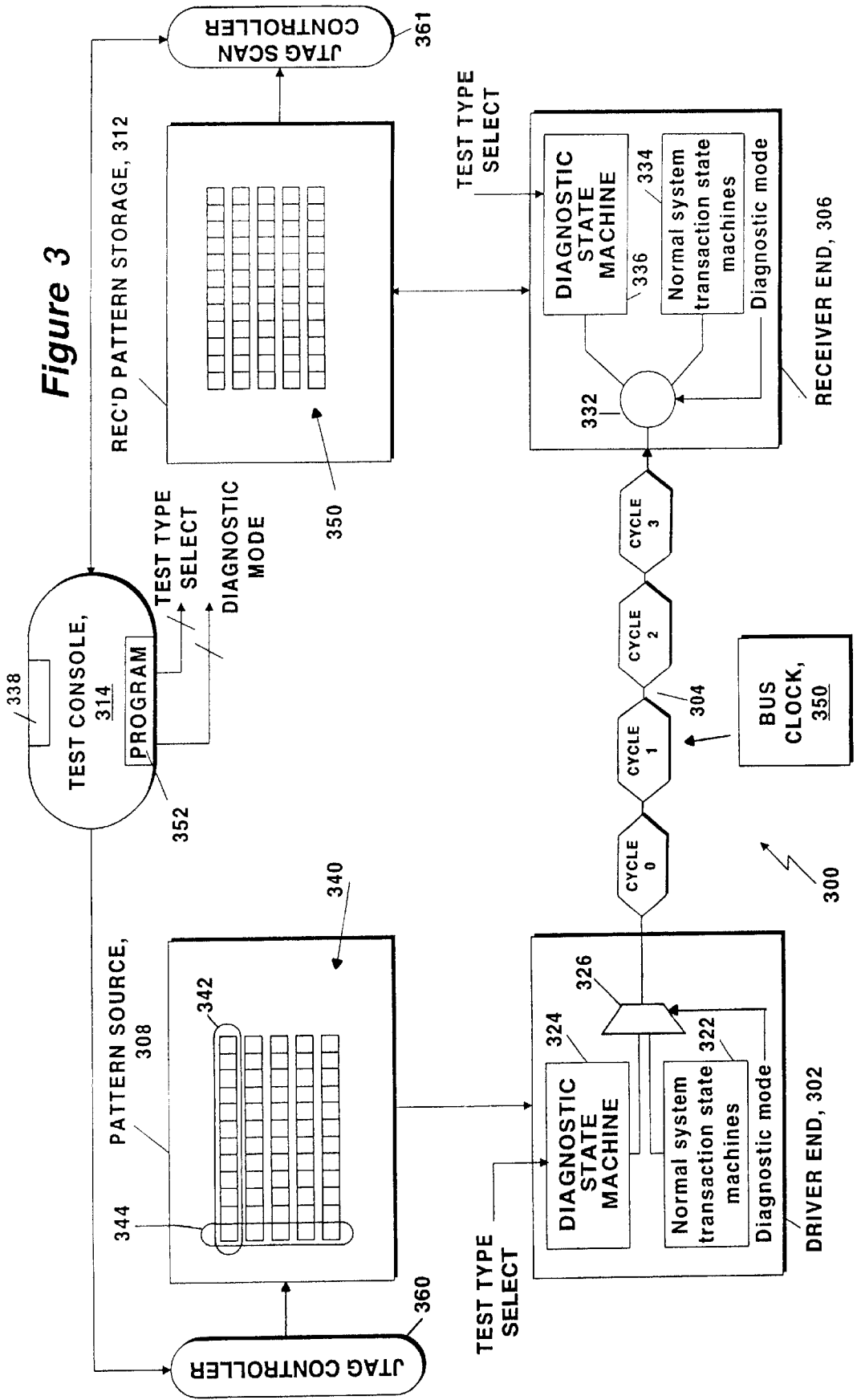
FIG. 3 is a block diagram of an exemplary embodiment for implementing the unidirectional testing methodology of FIG. 2A.

FIG. 3 shows an exemplary embodiment of a testing apparatus 300 in an arrangement suitable for performing unidirectional testing. The testing apparatus 300 has a driver end 302 for applying signals to a bus 304, a receiver end 306 for receiving signals from the bus 304, a pattern source 308 for providing a pattern of voltages to the driver end 302 for use in testing the bus 304, a pattern storage module 312 for storing a received pattern after it has traversed the bus 304, and a test console 314 for controlling the diagnostic testing, e.g., responsive to input from a test technician.

The driver end 302 has a normal system transaction state machine 322 for generating a bus transaction as a result of the "normal" functions (i.e., not diagnostic test related, as described herein) of a device connected to the bus 304, e.g., the first device 102 of FIG. 1. The driver end 302 also has a diagnostic state machine 324 for self-transactions, i.e., for generating transactions specifically for use in testing. The term "self-transactions" imports that the transactions generated by the diagnostic state machine 324 will be transactions between one and the same device, e.g., the first device 102 or second device 104 of FIG. 1, for loopback testing.

During operation, the state machines 322, 324 of the driver end 302 apply their output signals intended for bus 304 to input terminals of a multiplexer 326. A multiplexer 326 is responsive to a diagnostic mode signal for passing to an output terminal thereof either the signals from the normal system transaction state machines 322 or from the diagnostic state machine 324. The driver end 302 drives the bus 304 at voltage levels corresponding to the signals passed by the multiplexer 314. At receiver end 306, received bus signals are applied to a switch 332, which is responsive to the diagnostic mode signal for passing the received bus signals either to normal system transaction state machines 334 or to a diagnostic state machine 336.

Accordingly, for normal operation of the device, the normal system transaction state machines 322, 334 can send and receive signals over the bus 304; however, for purposes of testing, the diagnostic state machines 324, 336 will instead be able to send and receive signals over the bus 304. To that end, the diagnostic mode signal, which controls the multiplexer 314 and switch 318, has a first value indicative of normal system transactions and a second value indicative of diagnostic transactions. The test console 314 can apply the diagnostic mode signals to the multiplexer 326 and switch 332 to start or terminate testing of the bus. The test console 314 can initiate bus testing, for example, as part of a start-up routine for the device, for example, during boot up, where the device is a computer system. Alternatively, a test console 314 can initiate bus testing, for example, by receiving suitable instructions from a technician, preferably using a graphical user interface (GUI) 338 provided by the test console 314. Moreover, the test console 314 can control whether the diagnostic test utilizes a unidirectional methodology or a loopback methodology by applying a test-type select signal to the diagnostic state machines 324, 336. The test-type select signal preferably has a first value indicative of a unidirectional methodology and a second value indicative of a loopback methodology, and the diagnostic state machines 324, 336 perform the tests accordingly.

As noted above, the pattern source 308 provides a pattern 340 of test voltages for used by the diagnostic state machine 324. The pattern 340 can be stored as digital values, either ONEs or ZEROs, for each bus line, indicating whether the corresponding bus line should be driven with, e.g., a corresponding high or low voltage level. Moreover, the pattern 340 can be stored in a memory as an array, in which each row of values can be applied to a different one of the bus lines, and each value (represented in the figure as a block) of a row can be applied to the corresponding bus line during one of the sequential cells of the bus cycle. Thus, for example, the values in the top row 342 could be applied to bus line No. 1 of FIG. 2C during sequential cells, and the values in the far-left column 344 could be applied to the various lines of the bus 304 (including, e.g., lines Nos. 1 and 2 of FIG. 2C) during cells corresponding to the same, last tick of the bus clock 350 of the bus cycle of the test transaction.

For purposes of testing, the sequential values in the pattern 340 for each bus line can be selected to stress the bus and test accurate reception in a variety of ways. For example, each bus line can be tested to various percent levels of utilization, for example, at 25 percent, 50 percent, 75 percent, and 100 percent utilization. Moreover, the successive cells for each bus line can have alternately high and low values to maximize voltage swings during a bus cycle, and thereby to maximize the effects that signal distortion (relative to the idealized waveform) may have on accurate reception. Alternatively, each bus line can be tested with a string of constant high or constant low values so as to assess the effects of cumulative DC-offset on accurate reception.

The pattern 340 is generated by the test console 314 and stored in the pattern source 308, for example, using a JTAG controller 360 or other programmable technique to load the values into the pattern source 308. The JTAG controller 360 preferably complies with the "JTAG Specification, as set forth in IEEE 1149.1-1990, Standard Test Access Port and Boundary-Scan Architecture ("JTAG Spec"), which is incorporated herein by reference, and available from IEEE, 3 Park Avenue, 17$^{th}$ Floor, NY, N.Y., 10016-5997, USA.

As noted above, the received pattern storage 312 holds a pattern 350 of test voltages after being transmitted over the bus 304. The pattern 350 should thus correspond to the source pattern 340 as provided for transmission by the pattern source 308, with any differences between the two patterns 340, 350 being designated as errors. Accordingly, a simple way to analyze the results of the diagnostic testing would be to compare the source pattern 340 with the received pattern 350 on a cell-by-cell or bit-by-bit basis, and indicate the lines and cells in which errors occurred. For these purposes, the diagnostic state machine 336 can store the received pattern 350 in the received pattern storage 312, which is then scanned out by a scan controller 360 and passed to the test console 314 for analysis. The scan controller 360 and the scanning of the pattern from the received pattern storage 350 can comply with JTAG Spec.

The test console 314 can be implemented in a computer system, which preferably stores and executes a computer executable program 352, e.g., software, for generating the pattern 340, loading the pattern into the pattern source 308, analyzing the pattern 350, and reporting out the results. The program 352 can also set the test-type signal and the diagnostic mode signal. In other, alternative embodiments, the diagnostic state machines 324, 336 can be responsible for generating and analyzing patterns themselves, without the need for external analyzers and can report out, e.g., only error information.

Figure 4A:
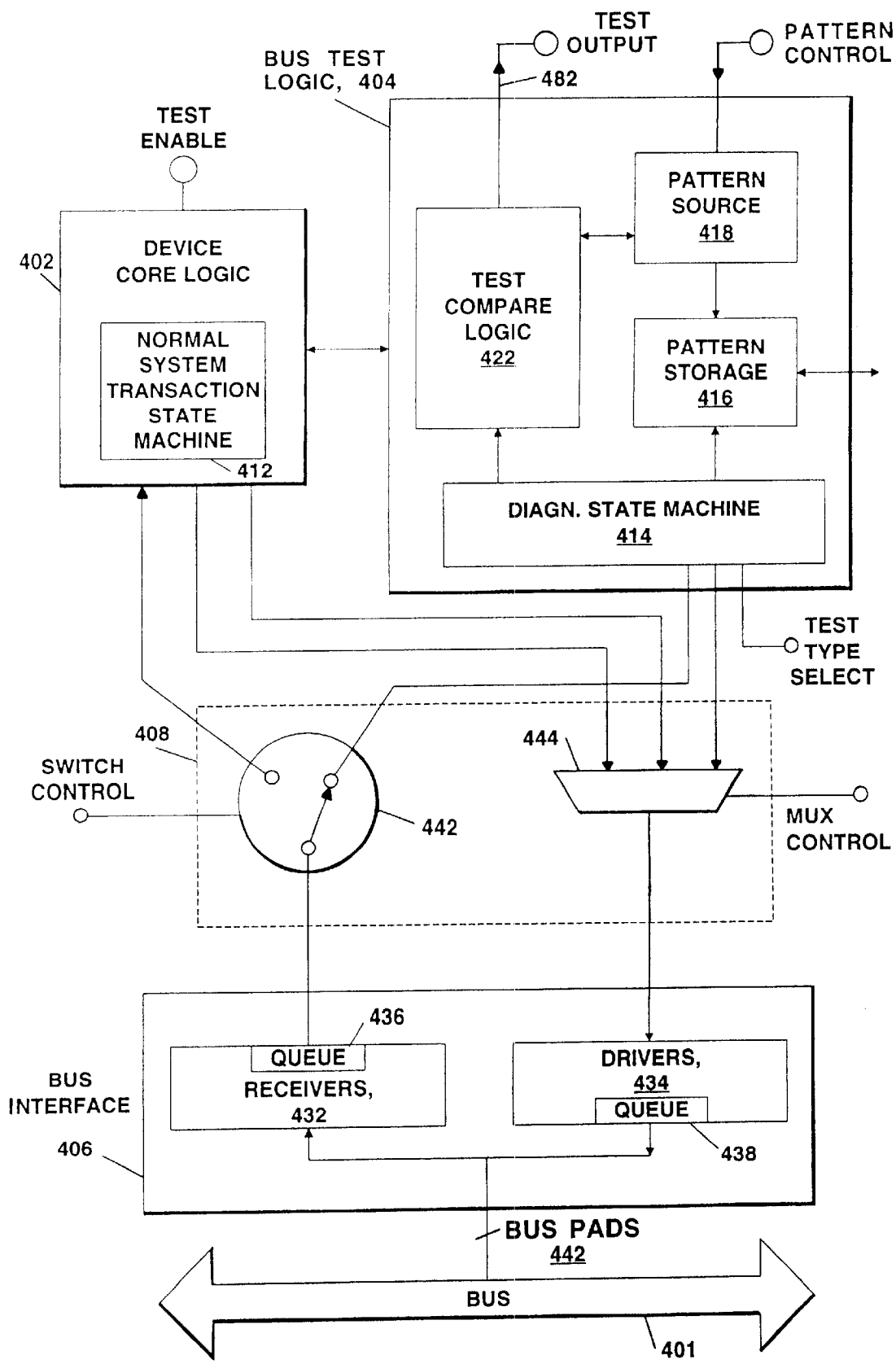
FIG. 4A is a block diagram of an exemplary one of the devices of FIG. 1 in accordance with an embodiment of the invention, which can implement both the unidirectional and loopback testing methodology of FIGS. 2A and 2B.

FIG. 4A shows an embodiment of a bus device 400, which can be used to implement either of the first or second devices 102, 104 of FIG. 1, and permit both unidirectional or loopback testing of bus 401. The bus device 400 includes device core logic 402, bus testing logic 404, a bus interface 406, and signal control circuitry 408. The device core logic 402 includes normal system transaction state machines 412, as described above. The bus testing logic 404 includes a diagnostic state machine 414 for providing the appropriate logic to conduct bus testing, a pattern storage module 416 for holding one or more patterns, including source patterns and/or received patterns, a pattern source 418 for providing patterns used for stimulus cycles, and test compare logic 422 for comparing source patterns with received patterns to identify errors. The pattern storage 416 can be a conventional memory device. The pattern source 418 can be (a) a link from the test console 314, a user input device, (b) an automated pattern generator that generates patterns, e.g., of pre-specified forms, or (c) a pattern selector that selects, e.g., responsive to a user input, one of a plurality of patterns preloaded into the pattern store 416. The test compare logic 422 is shown as separate from the diagnostic state machine 414, though it can also be implemented as part of the latter state machine.

The bus interface 406 includes a set of receivers 432 and a set of drivers 434. A transceiver comprising one of the receivers 432 and one of the drivers 434 can be provided for each bus line. Alternatively, where the bus 401 is implemented as a point-to-point switching fabric, e.g., in the form of a crossbar switch, the bus interface 406 can be implemented with the appropriate transceiver implementation. The receivers 432 and drivers 434 can also have queues or buffers 436, 438 for congestion and flow control purposes. For example, queues 438 can hold driver output pending the device 400 gaining control of the bus 401 and then can apply the driver output onto bus pads 442 of the bus 401.

The signal control circuitry 408 includes a switch 442 for selectively providing signals from the receivers 432 either to the device core logic 402 for normal device functioning or to the bus test logic 404 for diagnostic testing purposes, responsive to a switch control signal. The signal flow control circuitry 418 also includes a multiplexer (MUX) 444 for selectively providing signals to the drivers 434 from either the device core logic 402 for normal device functioning or the bus test logic 404 for diagnostic testing purposes, responsive to a MUX control signal. In some implementations, the MUX control signal can be, for example, an arbitration signal from an arbiter indicating that the device 400 has gained control of the bus 401 for a particular purpose.

With these component parts, the device 400 is equipped to perform as either of the driver end 302 or receiver end 306 of FIG. 3. Moreover, the bus test logic 404 can perform as either or both of the diagnostic state machines 324, 336 of FIG. 3, and can perform analysis of test results.

As an alternative to the test compare logic 422 for analyzing the results of the test, the bus test logic 404 can apply a time sequence of bus signals on the bus that the test bit patterns represent, and the first failure (if any) induced in the receiving device by those bus signals can be identified, and attendant operating information captured, as described below under the heading "First Failure Capture". Thus, the test compare logic 422 can be regarded as optional in some applications of this aspect of the invention.

The compare logic 422 can be otherwise implemented in some applications of the invention. For example, the applied bus signals can cause an error correction code (ECC) error, and the bus test logic 404 can verify that the error was detected and properly corrected at the receiver. This approach can be used to introduce purposefully a bus error, such as an ECC or parity error, in order to assure that the first failure capture system or the error detection system implemented by the electronic device can properly detect the error.

Figure 4B:
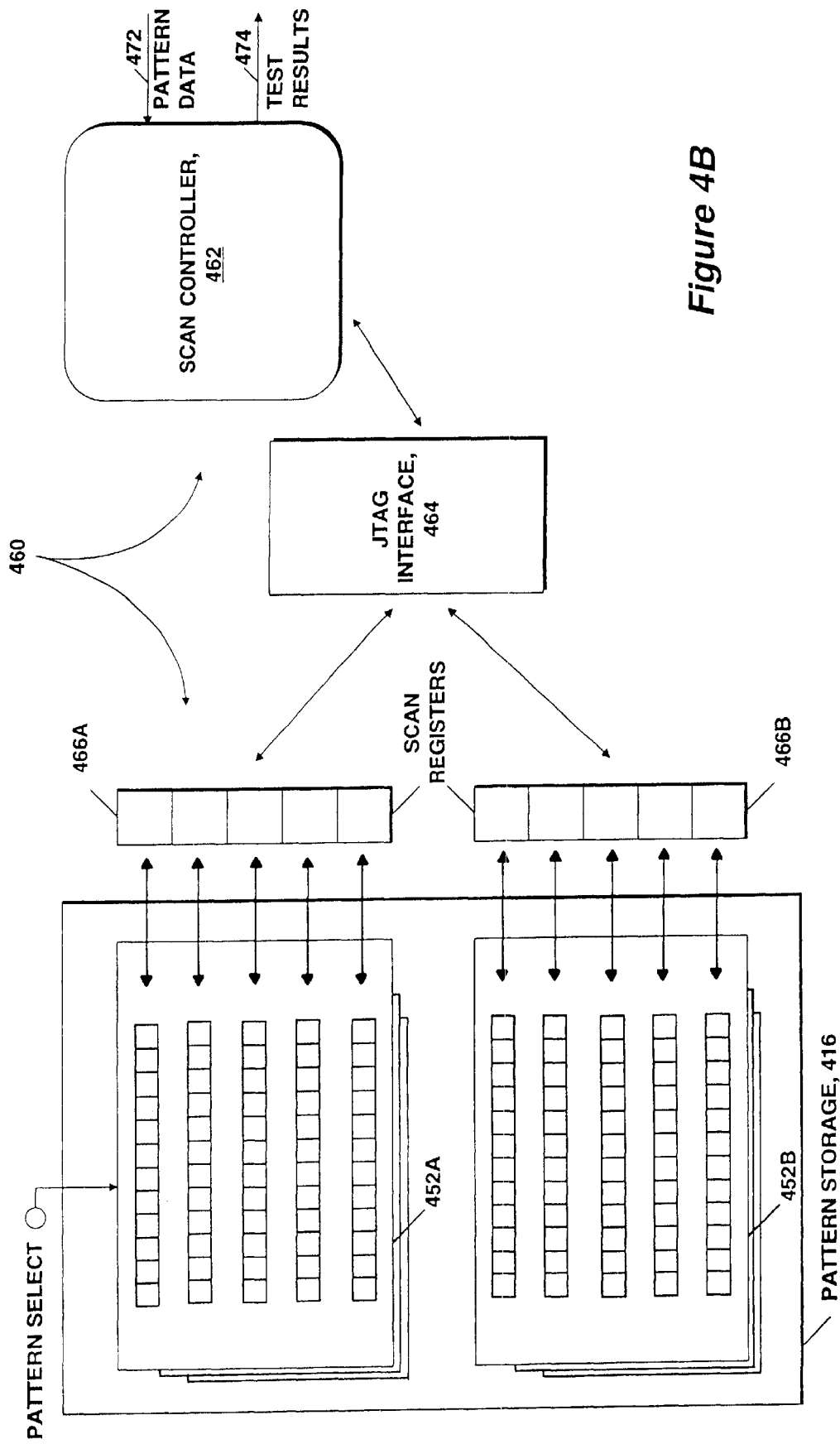
FIG. 4B is a block diagram of the pattern storage of FIG. 4A for holding a plurality of bit patterns, in combination with a JTAG interface and scan controller in accordance with an embodiment of the invention.

FIG. 4B shows an implementation of the pattern storage 416 of FIG. 4A. As illustrated, the pattern storage 416 can hold one or more patterns 452A, 452B. For example, it can hold a number of stimulus patterns or a number of stimulus and received patterns. A pattern select signal can be used to select the one of the stimulus patterns to be used in testing. FIG. 4B also shows a JTAG apparatus 460 for scanning patterns into and out of the pattern storage 416. The JTAG apparatus 460 includes a scan controller 462 for receiving data for a stimulus pattern on a pattern data input port 472, and applying them to the pattern storage 416 through a JTAG interface 464 and one or more scan registers 466A, 466B. Likewise, received patterns can be scanned from the patterns 452A, 452B into the scan registers 466A, 466B via the JTAG interface 464 and scan controller 462, and placed on a test results output port 474. The JTAG apparatus 460 preferable complies with the JTAG Spec, and provides for programmable control, e.g., computer-executable software control of loading and reading of pattern data.

Analysis of the test results can be effected by a separate service processor, as noted below. The service processor used for analysis of test results need not be a service-dedicated computer system. It can also be a general-purpose computer system, such as that used for general system administration, which should also receive the error notification signal so as to alert the 'system administrator, e.g., by a visual or audio display of an error alert. The error notification signal can be provided, e.g., from the test compare logic 422 over test output terminal 482.

Figure 5:
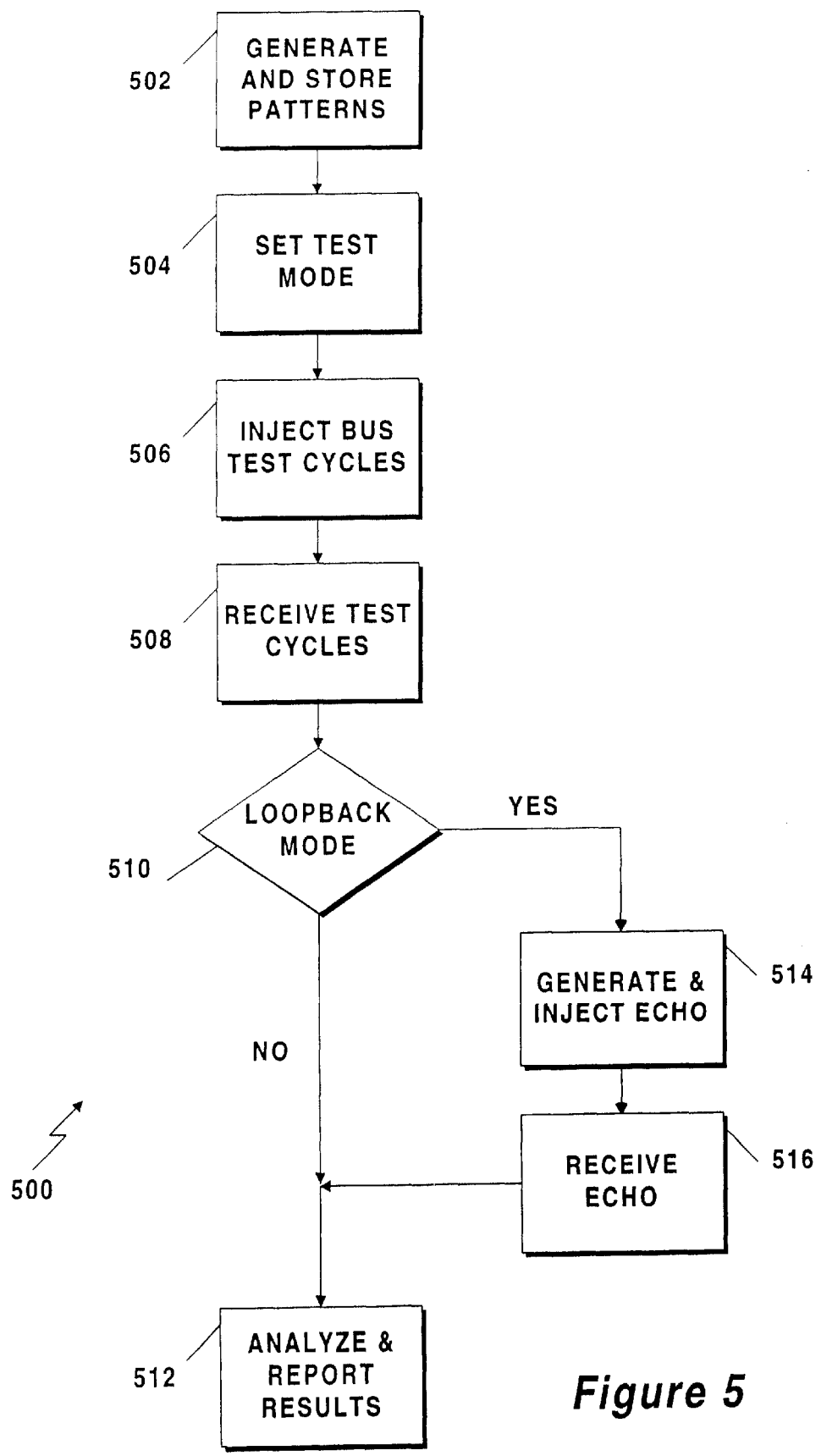
FIG. 5 is a flow chart of a method of bus testing using the apparatus of FIGS. 1–4B, in accordance with an embodiment of the invention.

FIG. 5 shows a method 500 of bus testing. The method 500 starts in block 502 with generating and storing stimulus patterns. Each test requires at least one pattern. In block 504, the method 500 sets the test mode, i.e., whether the test will be unidirectional or loopback. If more than one stimulus pattern is stored, then block 504 can also select the pattern that is to be used in the next test to be run. In block 506, the method 500 causes drivers to inject the stimulus cycles per the pattern onto the bus. In block 508, the method 500 causes receivers to receive the patterns from the bus, and store them for analysis or retransmission, depending on test methodology.

The method 500 determines, in block 510, whether the diagnostic test entails a loopback methodology. If not, then the test is unidirectional, and method 500 next, in block 512, analyzes the received pattern and reports the results. If a loopback test, the method 500 next, in block 514, generates and injects an echo replica of the received pattern, and, in block 516, causes a receiver in the same device that originally sent the stimulus pattern: to receive the echo. Afterwards, method 500 directs the echo to block 512 for analysis and reporting, as described above.

II. First Failure Capture

A) Electronic System

Figure 6:
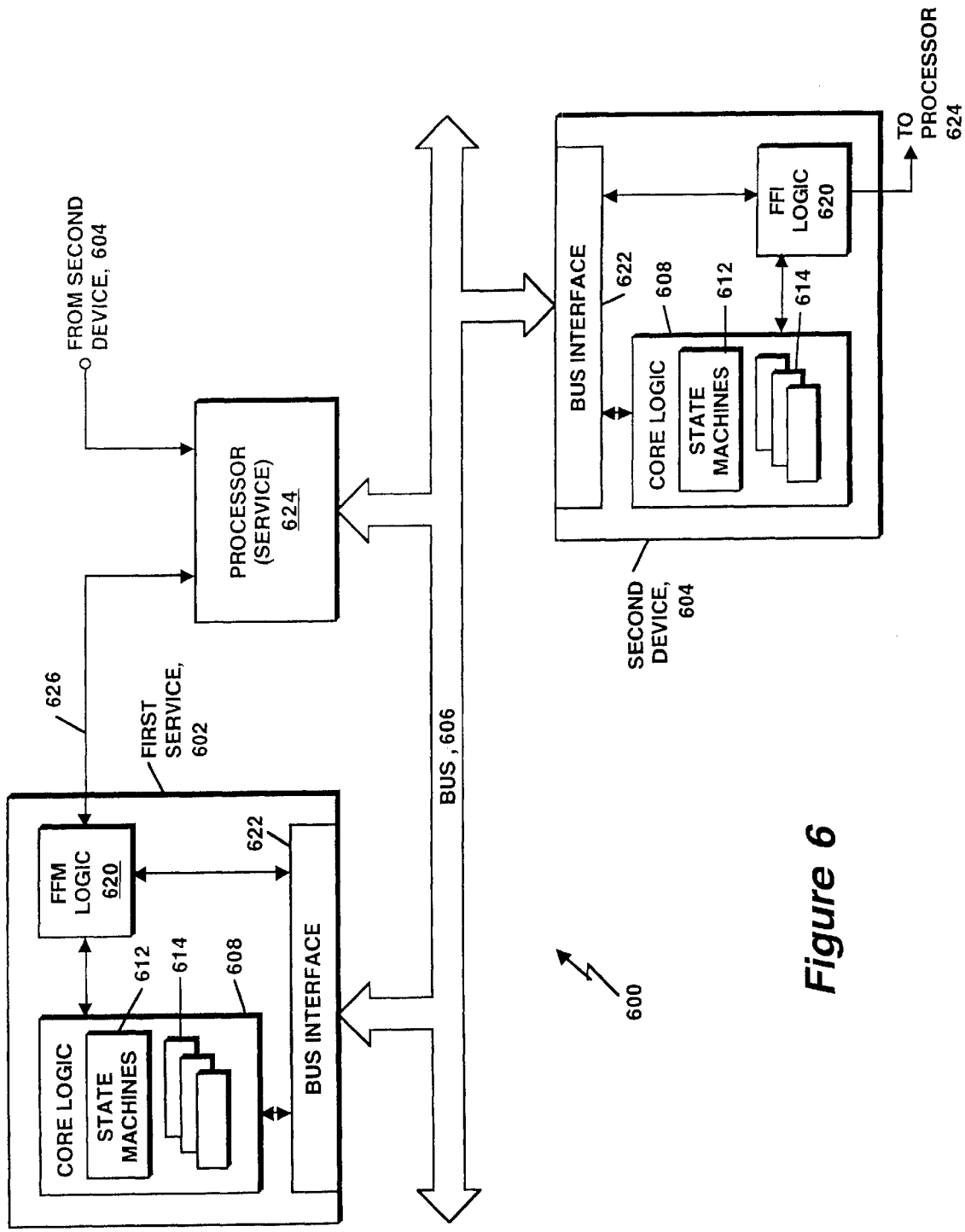
FIG. 6 is a block diagram of an electronic system having first and second functional devices and a service processor in accordance with an embodiment of the invention with respect to first failure capture.

FIG. 6 shows an electronic system 600 having first and second devices 602, 604 interconnected by a bus 606, which illustrates an aspect of the invention regarding first failure capture. While only two such devices are shown for illustrative purposes, the invention can be implemented with any practical number of such devices. The electronic system 600 can be, for example, a computer system, such as, e.g., a workstation, server, or personal computer. The electronic system 600 can also be, for example, a communication device such as a cellular phone, or even, foreseeably, a video game console, entertainment system, or other electronic apparatus or instrument having a processor (such as a microprocessor or digital signal processor) or controller. Alternatively, the electronic system 600 can comprise a network of computer systems or other network-capable electronic apparatus or instruments, which are interconnected by a communication channel, which will be referred to herein as a bus.

For ease of explanation, the devices 602, 604 are shown as containing the same components. Each device 602, 604 has conventional core logic 608 for performing the respective device's intended functions. For example, where the electronic system 600 is a computer system, the devices 602, 604 can be, e.g., a CPU and a memory module, and the core logic 608 of each can be responsible, respectively, for processing and storing computer program instructions and data. The core logic 608 can include, for example, one or more conventional state machines 612 and a plurality of conventional registers 614 for storing state and other information in the typical manner of conventional computer systems. Each device 602, 604 also includes novel, first failure management (FFM) logic 620, for detecting a first failure condition as it occurs in the device and capturing state and other information from the state machines 612 and registers 614 for use in analyzing, diagnosing and correcting the condition. More specifically, the state machines 612 and registers 614 can cooperate with the FFM logic 620 to make available bus, state, status, temperature, and other operating information for use in error analysis. A bus interface 622 connects the core logic 608 and FFM logic 620 to the bus 606 for communication, e.g., with a processor 624, which performs the aforementioned analysis, and with the other of the devices 602, 604. Alternatively, the information from the FFM logic 620 can be provided to the processor 624 over a dedicated link 626, for example, in accordance with the JTAG Spec.

Accordingly, once an error condition is detected, the operating information, as made available by the state machines 612 and registers 614, is captured in the FFM logic 620 which maintains a copy of the operating information in a storage dedicated to the FFM logic 620. While the registers 614 of the core logic 608 will update their contents in the usual manner often in disregard of the error condition, the FFM logic 620 responds to an indication of the occurrence of an error within the system by statically holding its copy of the operating information until that information can be extracted by the service processor 624. Thus, in summary, the FFM logic 620 is responsible for detecting the error condition, retaining the attendant operating information, and providing that information to the service processor 624. The FFM logic 620 can also provide an error notification signal, e.g., to a computer operator or computer system administrator, to inform that individual of the error.

Figure 7A:
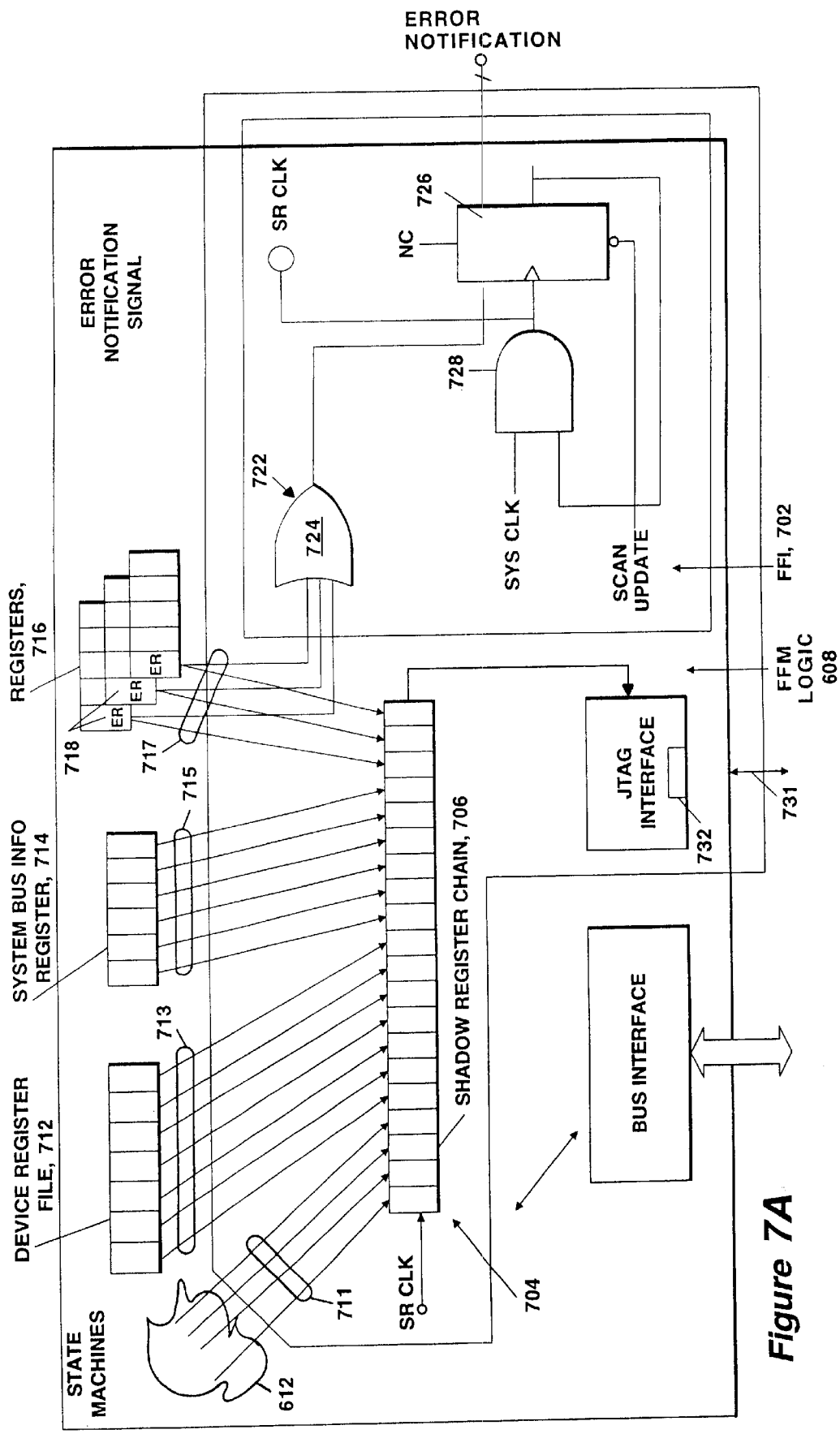
FIG. 7A is a representation, partially in block diagram form and partially in schematic form, of an exemplary one of the devices of FIG. 6, showing details of the first failure management (FFM) logic in accordance with an embodiment of the invention.

FIG. 7A shows a representative embodiment of one of the devices 602, 604 in greater detail with respect to the FFM logic 620. The FFM logic 620 is depicted as including a first failure identification (FFI) logic module 702, in the form of electronic circuitry, and a dedicated storage device 704, e.g., in the form of a shadow register chain 706. It should be understood that the invention can be implemented in various alternative fashions, for example, the FFI logic 702 can be implemented in software, firmware and/or hardware, and the shadow storage device 704 can be implemented using any suitable storage device, such as electronic memory, a stack of registers, etc., depending on the application.

A number of different devices within the computer system can provide operating information to the shadow register chain 706. These sources can include the state machines 612 as shown in FIG. 7A, which provide data to the shadow register chain 706 regarding their current state. Likewise, these sources can include registers 614, such as, for example, a device register file 712, a system bus information register 714, and other registers 716 containing error flags, which can provide data to the shadow register chain 706 about state and other operating conditions. The error flags of the registers 716 can be, for example, single-bit locations 718 that individually assume a first binary value (e.g., ONE) to indicate an error condition and otherwise have a different, second binary value (e.g., ZERO). Individual error flags can also comprise a plurality of bits. The error condition can be any sort of error or fault, such as, for example, a parity bit error or a protocol violation (e.g., missing acknowledgement signal during messaging, or addressing error indicative of non-existent resource).

The information in state machines 612 is transferred to shadow register chain 706 by means of an update mechanism schematically illustrated by arrows 711. Similarly, the information in devices registers 712, system bus info register 714 and registers 716 is transferred to shadow register chain 706 by means of an update mechanism schematically illustrated by arrows 713, 715 and 717, respectively. The update mechanisms could consist of logic (part of core logic 608, not shown) which applies the outputs of the registers 612, 712, 714 and 716 to stages in shadow register chain 706 under control of a clock signal or other occurrence.

Alternatively, the registers 612, 71.2, 714 and 716 can be connected to respective stages in shadow register chain 706 and the updating or transfer of information controlled by clocking or enabling the shadow register chain 706 stages at appropriate times. In this case, the control signal to which the shadow storage stages are responsive can be a special clock signal, for example, which controls shifting of the shadow register or overwriting of the history queue, so as to continue updating of the contents of that register or queue for so long as no error is detected. In FIG. 7A, this control signal is generated by gate 728 under control of the system clock, SYS CLK.

The FFI logic 702 cooperates with the shadow register chain 706 to provide a first failure capture mechanism that captures the operating information, which is useful, e.g., to isolate a transient error. The FFI logic 702 causes the shadow register chain 706 to continually capture new operating information until an error is detected, whereupon it causes the shadow register chain 706 to stop capturing any new information subsequent to the detected error. In other words, upon a detected error, the FFI logic 702 controls the update mechanism to stop or interrupt the "updating" of the shadow register chain operating information so that the shadow register chain 706 retains the operating information attendant to the detected error.

A way to implement this aspect of the invention is to have the core logic 608 continually scan: the state machines 612 and registers 614, and transfer the state and register contents in the shadow register 706, with the concomitant shifting out of its prior contents, which can be discarded. Upon detection of an error condition, the scanning is interrupted and the shadow register contents frozen until its contents can be read out by the service processor 624.

The FFI logic 702 includes error logic 722 for receiving the error flags from the single-bit locations 718 of the registers 716, and, if any of the error flags have the error-indicating first value, producing an error identification signal to indicate a first failure event. The error logic 722 can be implemented as an OR gate 724, having the bits from the error flags applied to individual input terminals thereof, and, if any indicate an error, producing the error identification signal on its output terminal.

The error identification signal is applied to a capture mechanism, which includes gate 728 and latch 726. In particular, the error identification signal is applied to an input terminal of a latch 726, whose output is an Error Notification signal. The latch 726 is clocked by a clock signal formed by an AND gate 728. The output of the AND gate 728 is also used as the clock signal, called SR clock, for the shadow register chain 706. The AND gate 728 receives a system clock at a first input terminal and a feedback signal from the output of the latch 726 at a second input terminal. Upon the Error Notification signal goes positive to indicate an error, the feedback signal blocks the AND gate from producing a positive clock output. Since the SR clock is effectively stopped, the shadow chain register 706 retains (i.e., freezes) its contents and stops updating it with subsequent new operating information. A scan update signal applied to a reset terminal of the latch 726 can re-arm the FFI logic 702.

Alternatively, the error identification signal could be applied to a capture mechanism (not shown) in the core logic 608 which, in turn, causes the core logic to interrupt transfer of information from the registers 612, 712, 715 and 717 to the shadow register chain 706.

Thus, the error flags are logically OR'ed together, and can cause freezing of operating information in the shadow register chain and/or the assertion of an error signal upon any of the error flags indicating an error condition. The error signal can be used, e.g., as an interrupt in the system or, e.g., can be applied to a dedicated "error event" pin out for notification to the system.

In this exemplary embodiment, the error notification signal can be sent to the service processor 624 (FIG. 6), which can cause the contents of the shadow register chain 706 to be emptied, e.g., serially, via a JTAG interface 730. The contents can then be provided over link 731 to the service processor 624 for analysis of the detected error condition. The JTAG interface 730 can include a JTAG controller 732 in compliance with the JTAG Spec. The JTAG controller 732 is responsive to a digital control signal generated, e.g., by a computer program implemented in compliance with the JTAG Spec and executed, for example, by the service processor 624.

Figure 7B:
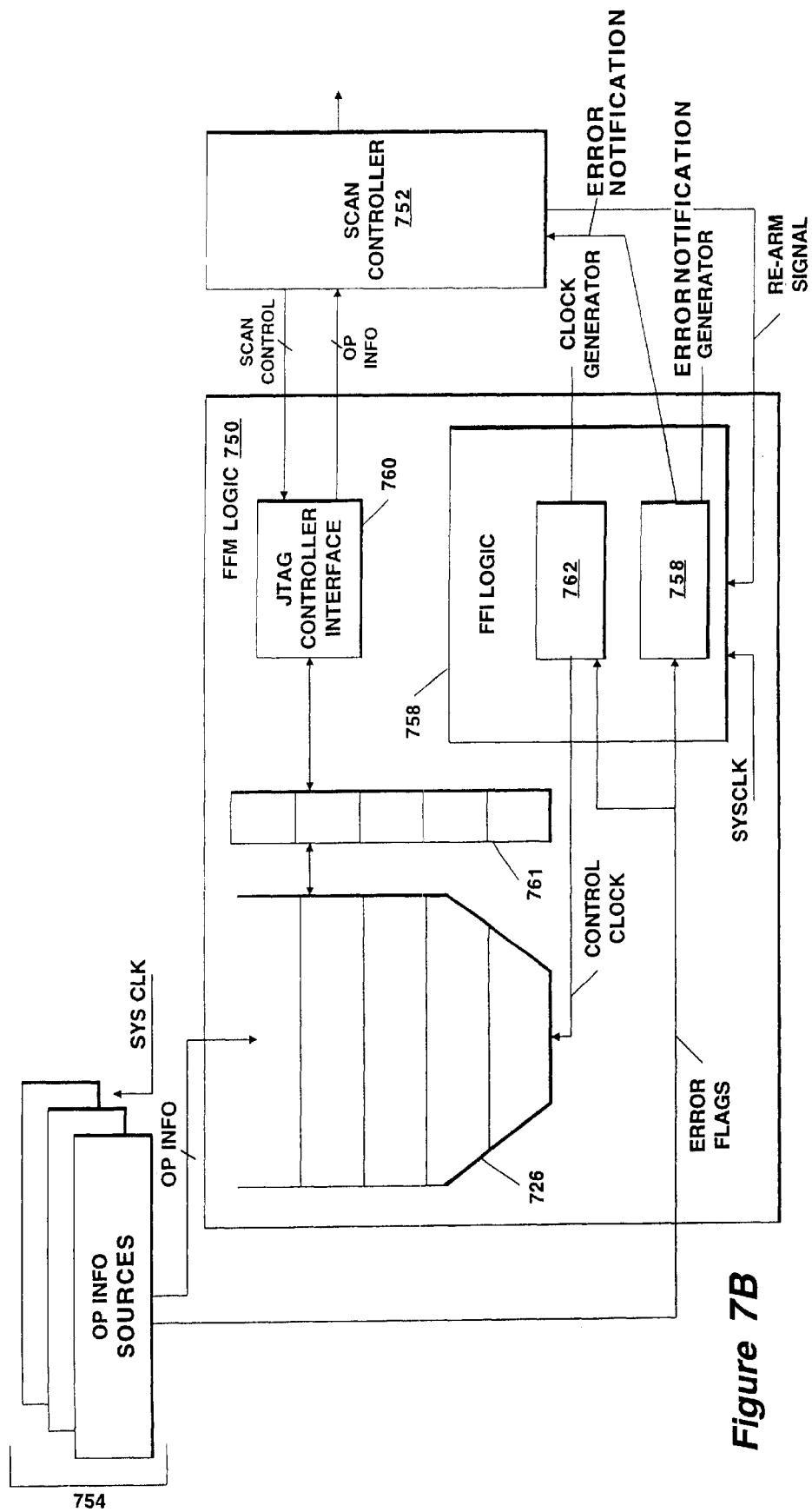
FIG. 7B is a representation, partially in block diagram form and partially in schematic form, of an alternative embodiment of the FFM logic and a scan controller in accordance with the invention.

FIG. 7B shows an alternative embodiment of FFM logic 750 under the control of a scan controller 752 in accordance with the invention. A plurality of operating information sources 754 are coupled to the FFM logic 750 to provide both operating information, including, for example, state and other information useful in diagnosing an error condition, as well as error flags that indicate whether an error condition has occurred. Collectively, this information can also be called the error-related operating information (EROI). The EROI is updated from time to time, e.g., as the state and other operating information changes or as this information is polled and provided to the operating information sources. Thus, each updated version of EROI is associated with a particular system clock cycle when the information is provided to the FFM logic 750.

The FFM logic 750 includes a history queue 756 for storing each successive version of the EROI at a different entry thereof so as to contain essentially a history of the EROI, e.g., including a history of system state and other information. As updated EROI continue to be added to the history queue 726, it becomes filled, and, then, prior entries may be overwritten with subsequent EROI versions.

The FFM logic 750 also includes FFI logic 758 and a JTAG controller/interface 760. The FFI logic 758 has an error notification generator 758 and a clock generator 762. The error notification generator 758 is responsive to the error flags for providing an error notification signal to the scan controller 752. The clock generator 762 is responsive to the error flags and the system clock (SYS CLK) for providing a control signal, e.g., a control clock, indicative of an error condition for stopping or freezing over-writing of queue entries. The FFI logic 758 can be implemented, for example, as shown at reference number 702 in FIG. 7A. The JTAG controller/interface 760 is responsible for scanning out, via a scan register 761, one or more queue entries under the control of the scan controller 752.

Accordingly, the scan controller 752, in response to the error notification signal from the FFI logic 758, (a) provides the JTAG controller/interface 760 with a scan control signal, and (b) receives EROI from one or more queue entries via the JTAG controller/interface 760. The scan controller 752 can cause the JTAG controller/interface to extract only the most current EROI entry as of the time that an error condition was detected, or a history of EROI including, e.g., one or more prior EROI entries and possibly subsequent entries. After receiving the desired EROI entries, the scan controller 752 can send the FFI logic 758 a re-arm signal to reset its logic, whereby the control clock unfreezes the history queue 726 causing it to continue receiving new EROI versions, and the error notification generator 758 awaits a next error condition.

Figure 8:
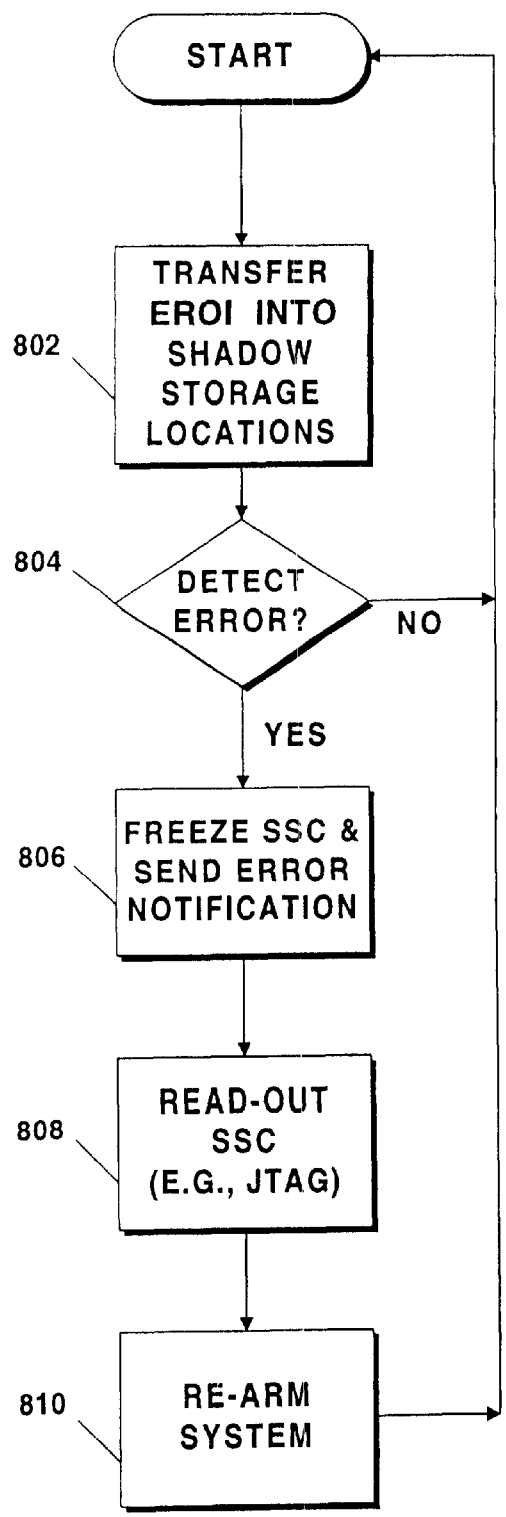
FIG. 8 is a flow chart of a method of first failure management in accordance with an embodiment of the invention.

FIG. 8 illustrates a method 800 of implementing the invention according to an exemplary embodiment. The method 800 starts in block 802 with the transfer of a copy of EROI into the shadow scan register, history queue or other storage locations from other devices within the electronic system, such as, for example, device registers. In block 804, the method 800 tests error flags in the system to detect whether an error condition is indicated. If no error is detected, the method 800 returns to step 802. If an error is detected, the method 800 in block 806 freezes the shadow storage location contents ("SSC") so as to preserve the EROI contained therein and sends an error notification signal to a scan controller or processor. Then, in block 808, the method 800 reads out the SSC of the shadow storage locations, which can comprise, e.g., EROI version(s) attendant to the detected error condition. For these purposes, the method 800 can, for example, use JTAG techniques under computer program control to provide the information to a processor for analysis. Then, after attending to the error condition in an appropriate way, in block 810, the method 800 re-arms the system and continues in block 802, as described above.

As noted above, the service processor 624 used for analysis of the EROI need not be a service-dedicated computer system. It can also be a general-purpose computer system, such as that used for general system administration, which should also receive the error notification signal so as to alert the system administrator, e.g., by a visual or audio display of an error alert.

III. Bus Tuning

A) Electronic System

Figure 9:
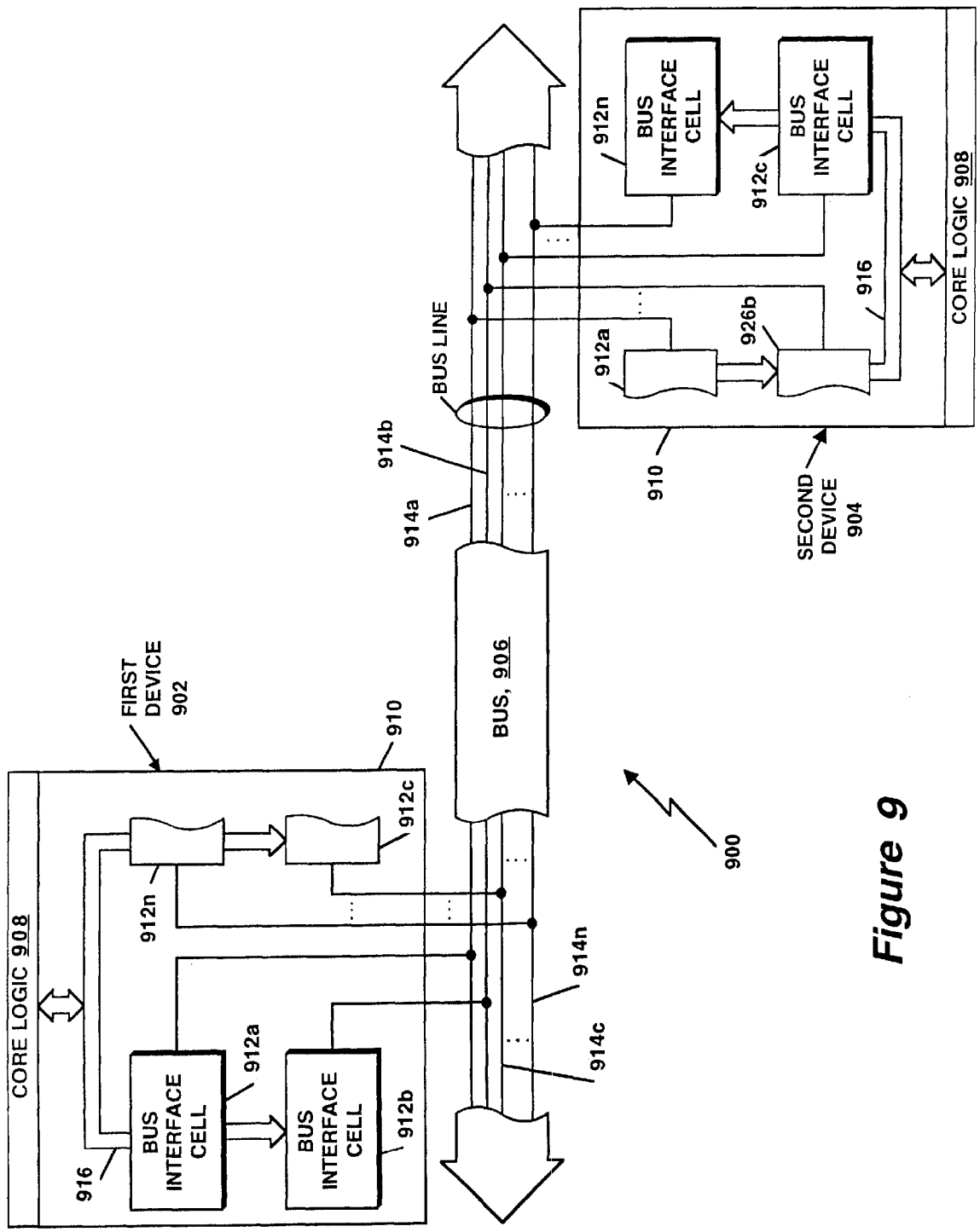
FIG. 9 is a block diagram of an electronic system in which first and second devices communicate over a bus in accordance with an embodiment of the invention with respect to bus tuning or adjustment.

FIG. 9 shows an electronic system 900 having first and second devices 902, 904 interconnected by a bus 906. While only two such devices are shown for illustrative purposes, the invention can be implemented with any practical number of such devices.

The electronic system 900 can be, for example, a computer system, such as, e.g., a workstation, server, or personal computer. The electronic system 900 can also be, for example, a communication device such as a cellular phone, or even, foreseeably, a video game, entertainment system, or other electronic apparatus or instruments having components interconnected by a bus for communication therebetween. Alternatively, the electronic system 900 can comprise a network of computer systems or other network-capable electronic apparatus or instruments, which are interconnected by a communication channel, which will be referred to herein as a "bus".

Each device 902, 904 has core logic 908, typically including a processor or controller (not shown) and other components (not shown) for performing the device's intended functions, and a bus interface 910. The bus interface 910 includes a plurality of bus interface cells 912a, 912b, . . . 912n, e.g., one connected to each conductor or line 914a, 914b, . . . 914n of the bus 906 for sending and receiving signals over that line, and thereby collectively providing an input/output (I/O) interface between its device 902, 904 and the other device 904, 902. The bus interface cells 912a, . . . 912n are interconnected via an interface cell control bus 916. The bus 916 includes reference voltage signal lines, enable signal lines and supply voltage signal lines, as necessary for operation of the cells.

Figure 10:
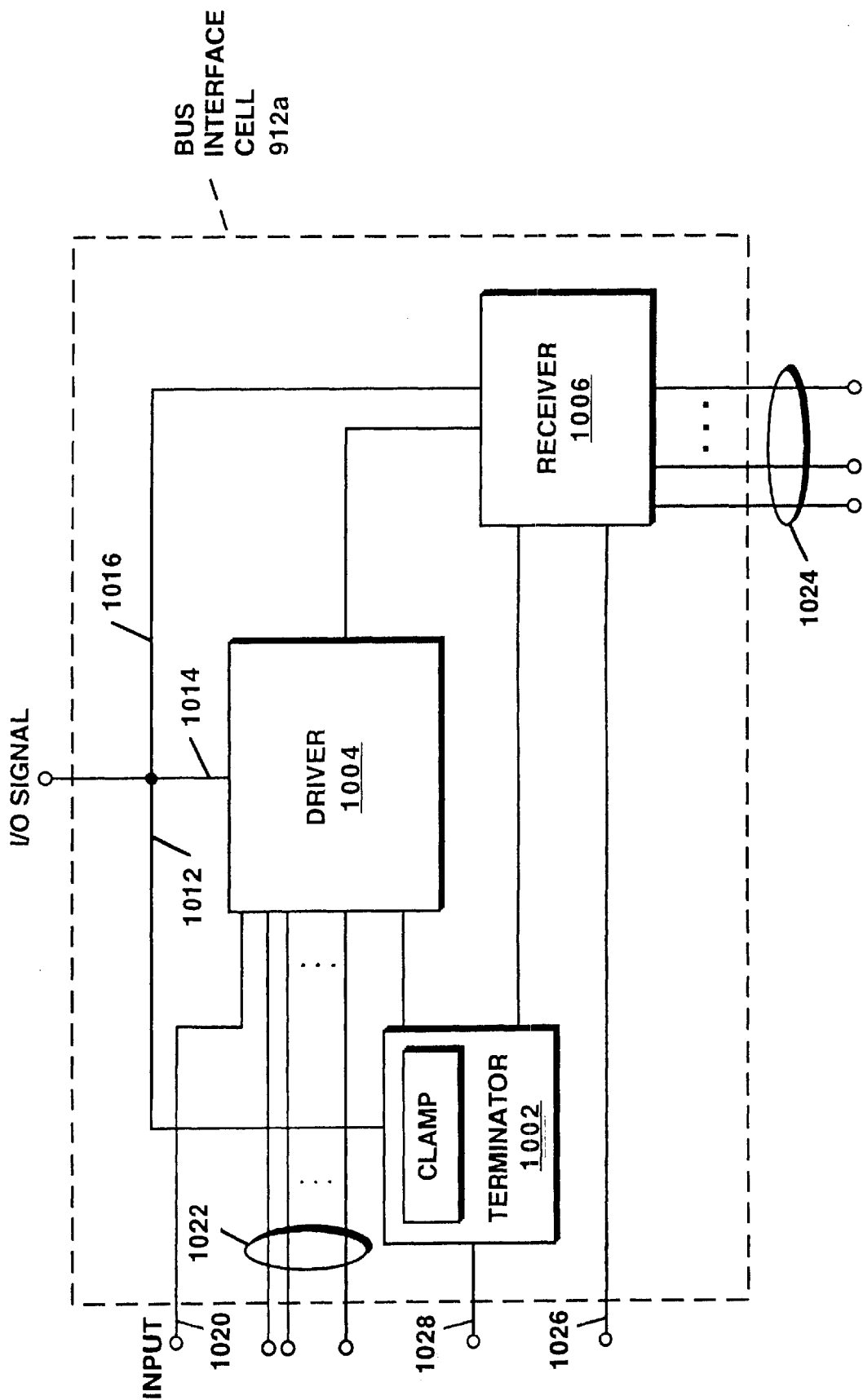
FIG. 10 is a block diagram of a representative bus interface of FIG. 9.

FIG. 10 shows a representative illustration of one of the bus interface cells 912a. The other bus interface cells 912b, . . . , 912n can be of the same, illustrated design. The bus interface cell 912a has a termination resistance circuit or terminator 1002, a driver 1004, and a receiver 1006. The termination resistance circuit 1002 has an I/O output terminal 1012, which is connected to respective I/O terminals 1014, 1016 on the driver 1004 and receiver 1006 for establishing a termination resistance for those terminals 1004,1006. The driver 1004 converts input signals (e.g., from the core logic 908 of first device 902) received over line 1020 into corresponding, suitably-formatted driver output signals ("driver output"), which it "sends" via I/O terminal 1014 unto the bus 906 (FIG. 9). The receiver 1006 latches an unamplified, unresolved state of an incoming signal on bus line 914a at I/O terminal 1016, and resolves that signal into a control, address, or data signal. The driver 1004, receiver 1006 and terminator 1002 receive voltages, including, for example, supply and control voltages over a plurality of lines, including lines 1022 for the driver, lines 1024 for the receiver, and line 1028 for the terminator 1002. These various voltages will be described in more detail below.

B) Waveform Terminology

Figure 11A:
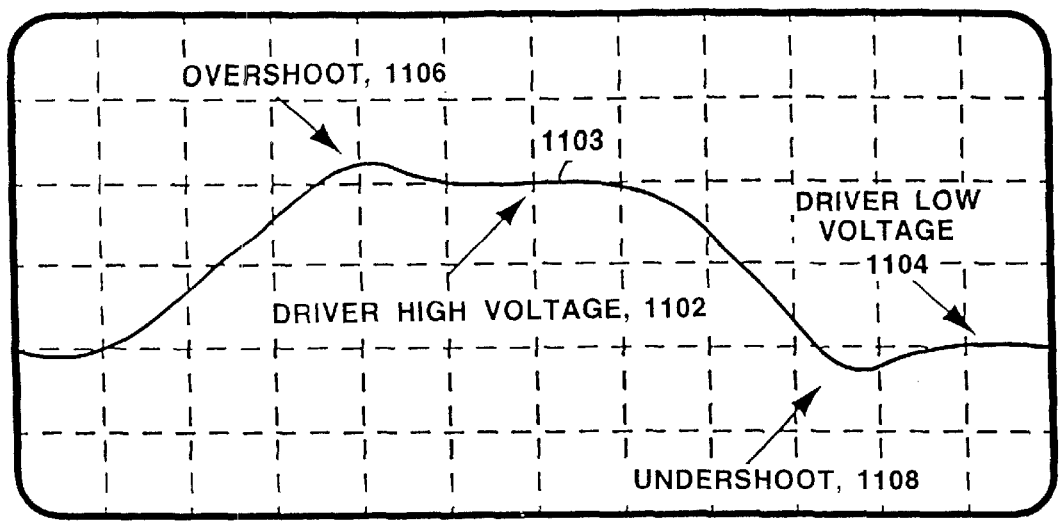
FIGS. 11A through FIG. 11E are waveform diagrams illustrating various bus parameters.
Figure 11B:
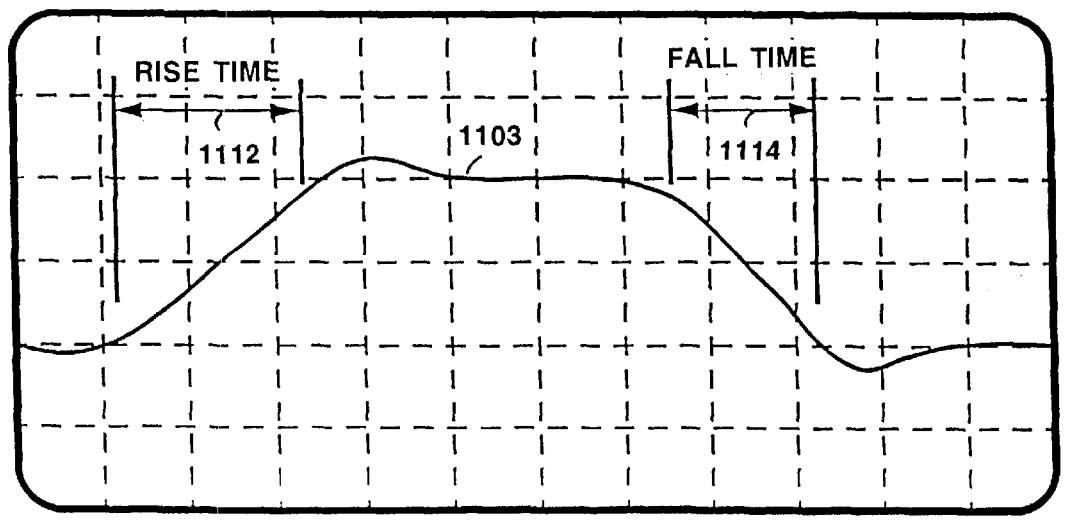
Figure 11C:
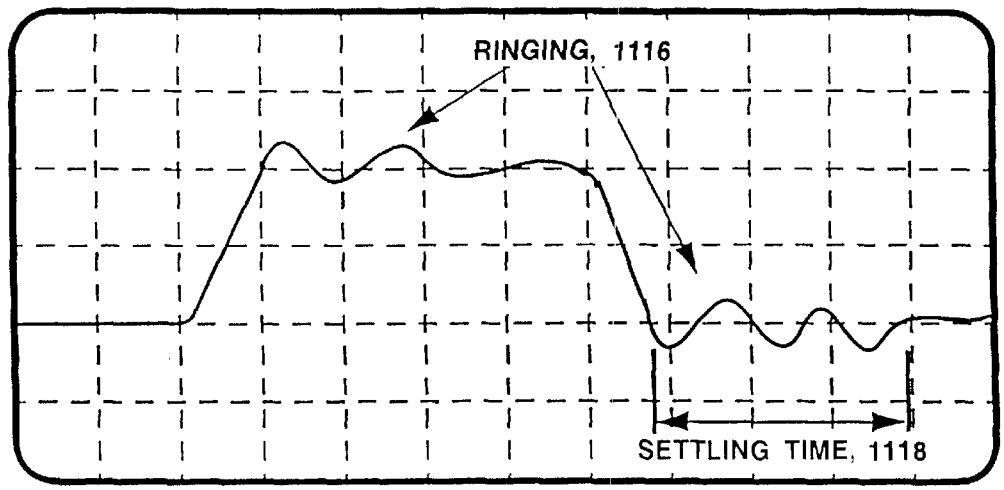
Figure 11D:
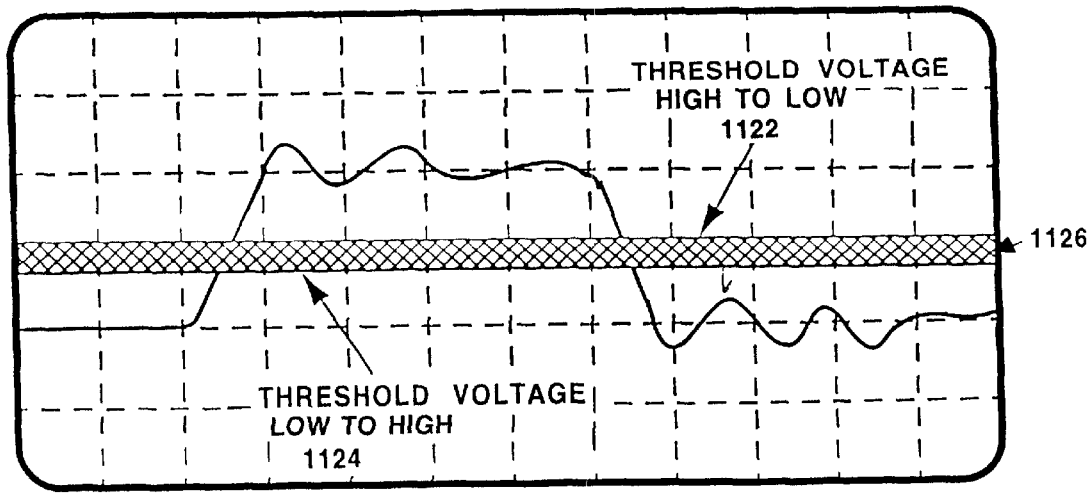
Figure 11E:
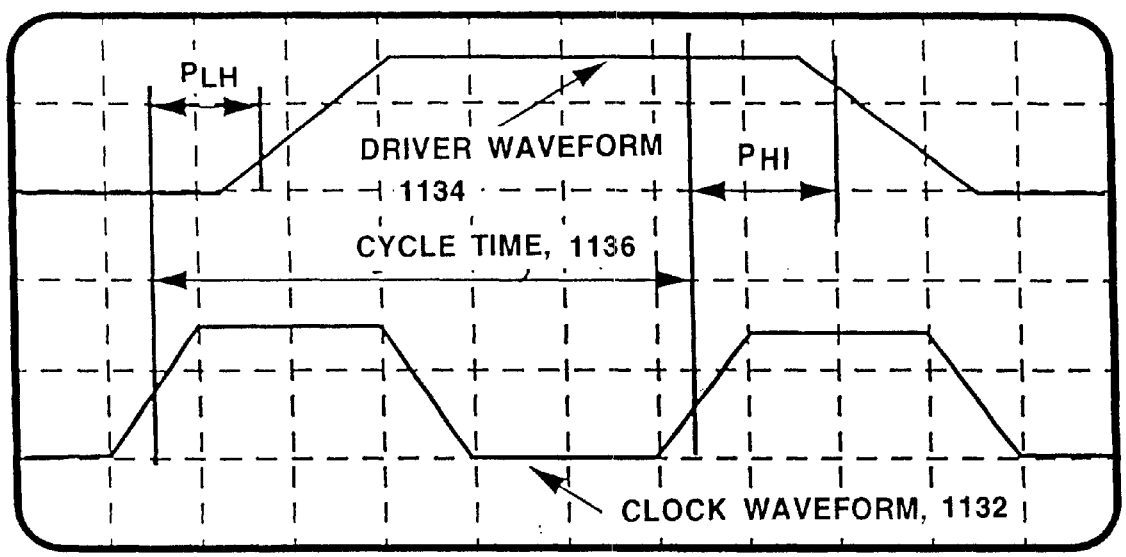

It may prove useful to introduce certain terminology and abbreviations used in this specification, with reference to FIGS. 11A–11 F.

Driver high voltage refers to the voltage (as designated at 1102 of FIG. 11A) measured when the driver output 1103 is stable in a logic HIGH state. In conventional drivers, this voltage 1102 is usually at the positive voltage rail, but more recent designs have used lower values in an attempt to reduce power. The driver high voltage should be well above the threshold voltage to insure adequate noise margins and it should also be as close as possible to the driver low voltage to minimize bus currents, and, thereby, the adverse effects of excessive power consumption. These two conditions are usually in conflict, resulting in an opportunity to adjust the drive high voltage for optimization for particular applications.

Driver low voltage refers to the voltage (as designated at 1104 of FIG. 11A) measured when the driver output 1103 is stable in a logic LOW state. This voltage 1104 can be, for example, that of the lower power rail or ground. The driver low voltage also has certain design considerations and trade-offs that are relevant here. Its value should be well below the threshold voltage to insure adequate noise margins and it should also be as close as possible to the driver high voltage to minimize bus currents, and thereby, the adverse effects of excessive power consumption. These two conditions are in conflict, resulting in an opportunity to adjust the drive low voltage for optimization for particular applications.

Rise time refers to the time period (as designated at 1112 of FIG. 11B) between the point at which the signal 1103 starts transitioning from a low voltage state to a high voltage state and the point at which this signal reaches the high voltage state. In practice the beginning and end times are measured at the transition of a defined voltage (typically, over a more or less linear portion of the rising voltage curve) in order to define these points clearly. Rise and fall times are basic components of the time from driver to receiver (defined below) and should be minimized to improve fastest bus cycle time (defined below). Unfortunately, if they become excessively fast, problems occur with undershoot, overshoot and ringing. Accordingly, here too there is an opportunity for optimization for particular applications.

Fall time refers to the time period (as designated at 1114 of FIG. 11B) between the point at which a signal starts transitioning from a high voltage state to a low voltage state and the point at which this signal reaches the low value. In practice, the beginning and end times are measured at the transition of a defined voltage (i.e., over a more or less linear portion of the falling voltage curve) in order to define these points clearly. See rise time, above.

Overshoot refers to a voltage excursion (as designated at 1106 of FIG. 11A) beyond the driver high voltage 1102 at the end of a low-to-high voltage transition. These excursions 1106 should be minimized with a properly set up bus because many receiver technologies do not tolerate them well. Typically such voltage excursions 1106 are caused, for example, by an overly fast rise time (defined above) which overshoots the driver high voltage 1102 due to inductance in the driver circuit.

Undershoot refers to a voltage excursion (as designated at 1108 of FIG. 11A) beyond the driver low voltage 1103 at the end of a high-to-low voltage transition. These excursions 1108 should be minimized to facilitate resolution of the signal by receivers.

Ringing (as designated at 1116 of FIG. 11C) refers to multiple voltage excursions above and below the driver high voltage or the driver low voltage, which slowly dampen out over a period of time known as "settling time" 1118, until the driver high voltage or driver low voltage is obtained. Ringing is often the result of excessively fast rise or fall times, and so can be controlled by adjusting those characteristics.

Reflections refers to a propagation phenomenon that occurs, when, in response to a driven signal reflected by a stub on the bus, a reflected signal traverses the bus in the reverse direction. This voltage-reflected waveform is summed with the driven waveform, resulting in waveform distortion, often a signal having multiple "steps" and exhibiting other distortions. Multiple reflections can occur when the original reflection is again reflected at the driver. Reflections are often the result of an improperly set termination resistance, and so can be controlled by adjusting that characteristic.

Termination resistance has an optimal value that is dependent on multiple variables, including the number of terminated stubs on the bus and the impedance of the driver and the bus. Furthermore, the necessary precision in setting the value of the termination resistance depends on a number of bus signal characteristics, such as rise and fall times. These bus signal characteristics can be optimized for particular applications. Both source/driver and destination/receiver termination have an affect on them. On a bus that utilizes both termination schemes, both should be optimized.

Threshold voltage refers to the voltage having a value between the driver high voltage and the driver low voltage, above which one logic state is sensed and below which the other logic state is sensed. The threshold voltage is often slightly different for the sensing of the different states, and thus, in practice, can constitute two voltage levels, threshold high to low (as designated at 1122 of FIG. 11D) and threshold low to high (as designated at 1124 of FIG. 11D). The difference between these voltage levels is an "area of uncertainty", as indicated by the cross-hatched region 1126 in FIG. 11D, which should be avoided at the time the state is sensed by the receiver. Threshold voltages should be optimized for the maximum margins between the driver high and low voltages and the state sensing threshold voltages. Since these margins are affected by ringing and other bus noise sources that are not symmetrical, an opportunity for optimization exists for particular applications.

Propagation time refers to the time between the leading edge of a cycle of the clock waveform (as designated at 1132 of FIG. 11E) and the leading edge of the driver voltage (as designated at 1134 of FIG. 11E) starting to drive a state change. Typically, these two events are measured at the transition of a voltage level. The propagation time for HIGH-to-LOW transitions ($P_{HL}$) can be different from the propagation time for LOW-to-HIGH transitions ($P_{HL}$), as measured at an arbitrary point along the voltage waveform selected based on design considerations. Propagation time is usually thought of as a negative characteristic that should be minimized. It uses up cycle time without any benefit, except, in some applications, for providing room to meet hold-time requirements. Since, in many bus applications, such a hold time restriction is readily met, propagation time is typically minimized to improve cycle time.

Cycle time (as designated at 1136 of FIG. 11E) refers to the time from a point on a waveform in one cycle to the same point on the next cycle of the waveform; in other words, the time between the repeat of cycles. The inverse of cycle time is the frequency of the waveform. Example: a 100 MHz waveform has a cycle time of 10 nSec.

Fastest Bus Cycle Time refers to the fastest cycle time in which a bus can operate.

Effective Time Cycle is a concept introduced herein to represent the time from the start of the driver changing the bus state until the time that the receiver is expected to sense this state change. Effective time cycle should be contrasted with the real time cycle, which is a new name for the time from driver to receiver, and represents the total of effective time, cycle and driver propagation time. Another way of looking at this concept is that the effective time cycle removes the driver propagation time from the time from driver to receiver, and only counts the time that the bus is actually in transition. The effective time cycle can be changed by adjusting the propagation time. Given a real bus cycle time, the effective time cycle is reduced as the propagation time is increased. Accordingly, for driving, reading and verifying data, stress testing by reducing the effective time cycle can be used to test the bus for errors that may arise during operations (e.g., read and write operations) or to optimize the bus parameters for particular applications. Controlling the effective time cycle this way would be independent of the CPU clock. This is different than the traditional approach of relating the bus cycle time to the CPU clock by a gear ratio of m/n, where (m) and (n) are integers. The proposed stress testing allows the system to be tested using a separate bus stress from that imposed by the CPU or system, and provides a means to direct or target testing to a specific bus.

Minimum Time from Driver to Receiver refers to the minimum time needed for a signal to transition the bus and be captured by the receiver. The minimum time from driver to receiver can be calculated as the summation of the five following elements, representing the fastest bus cycle time:

1. Driver Propagation Time—the greater of $P_{HL}$ and $P_{LH}$
2. Rise or Fall Time—the greater of the two.
3. Settling Time—including reflection and dampening.
4. Travel time—the time needed for a signal to physically travel the length of the bus.
5. Receiver setup time—the time the signal must arrive before the data strobe.

Typically a reliability margin is added to the foregoing time from driver to receiver in yielding a practical value for the bus cycle time.

In accordance with an aspect of the invention, a controllable bus driver, bus receiver, and terminator can be provided for the purpose of controlling a number of signal characteristics, such as, for example, rise and fall time, with a view to improving bus operating and signaling parameters, and overall operation and reliability of the system.

C) Bus Driver with Controllable Drive Voltage Rise/Fall Times and Limits.

Figure 12:
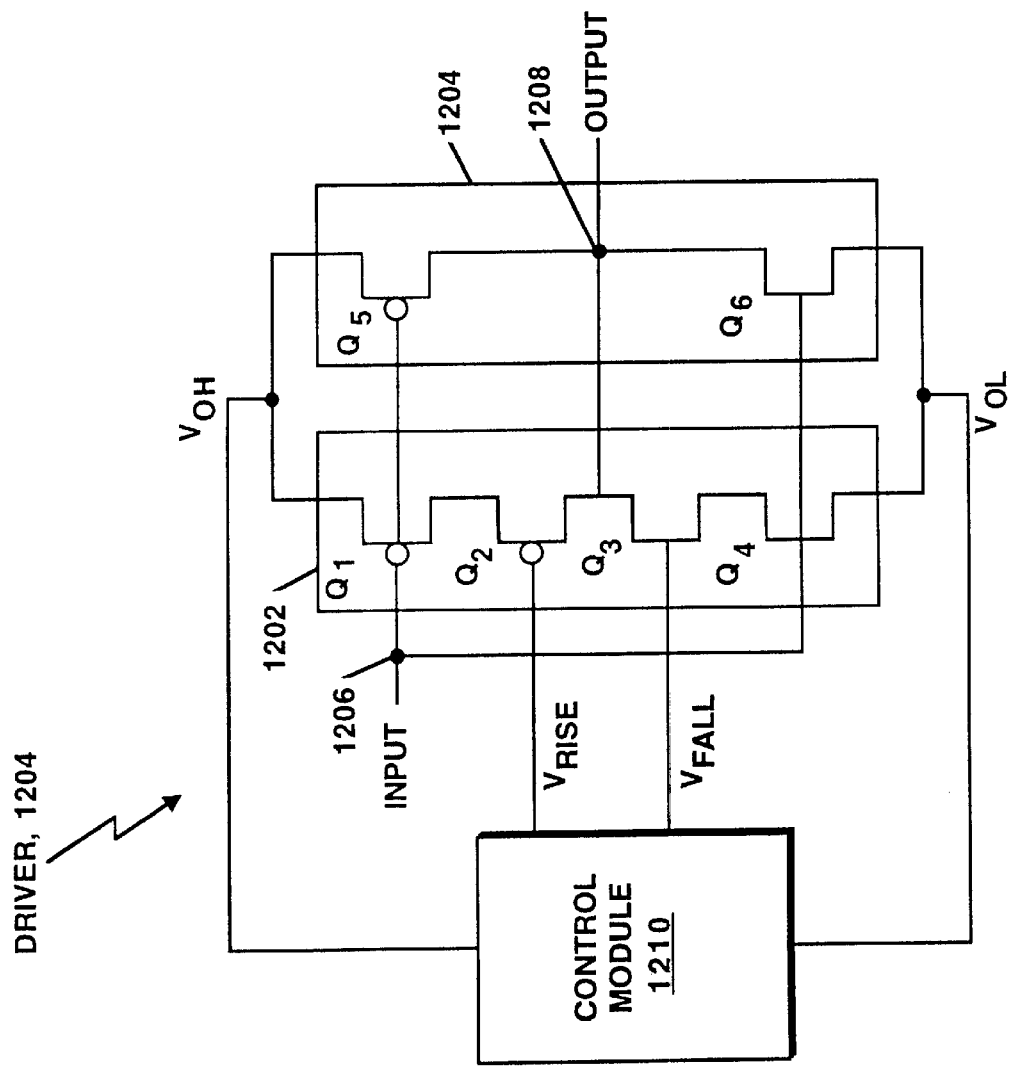
FIGS. 12, 13, and 14 are schematic views, partially in block diagram form, of alternative embodiments of the bus driver of FIG. 10.
Figure 14:
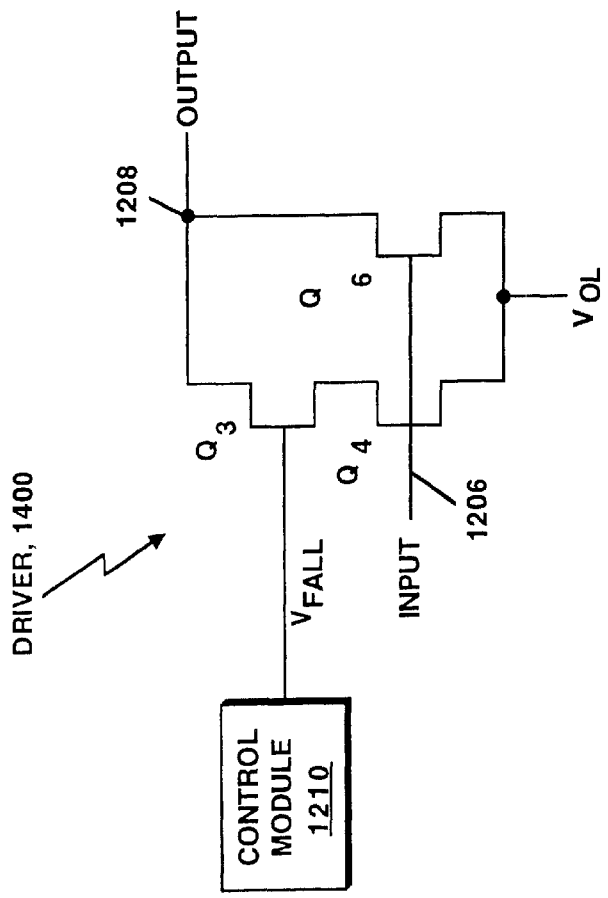
Figure 13:
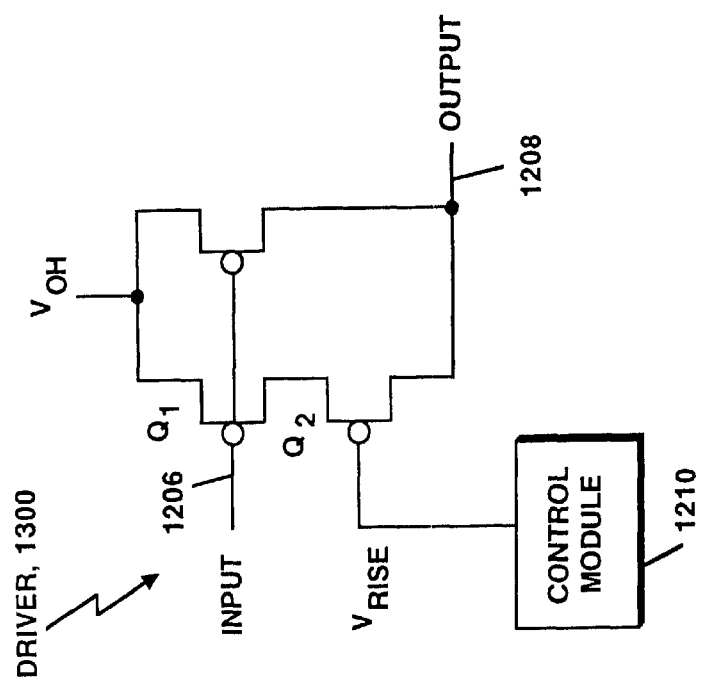

FIGS. 12, 13 and 14 show alternative implementations for the bus driver 1004 of FIG. 10, designated bus drivers 1200, 1300, 1400, respectively, which can have controlled rise and fall times as well as controlled driver voltage high and low limits. A voltage $V_{RISE}$ controls the rise time and a voltage $V_{FALL}$ controls the fall time. The driver high voltage is set by the power input voltage $V_{OH}$ and the driver low voltage is set by the power input voltage $V_{OL}$.

FIG. 12 depicts bus driver 1200, which is capable of driving a bus in both directions, high and low. It is composed of two inverters 1202, 1204 arranged in parallel. The first inverter 1202 has a stack composed of four transistors $Q_1$, $Q_2$, $Q_3$ and $Q_4$. The second inverter 1204 has a stack of two transistors $Q_5$ and $Q_6$. The gates of transistors $Q_1$, $Q_4$, $Q_5$ and $Q_6$ are all driven by a common signal, Input, applied to input terminal or node 1206. A voltage, Output, is tapped from a common node 1208 of transistors $Q_2$, $Q_3$, $Q_5$ and $Q_6$, which is also the output terminal or node of the driver 1200. During operation, when Input is low, e.g., 0 volts, the PMOS transistors $Q_1$ and $Q_5$ are on and provide a conduction path between the signal Output and $V_{OH}$. This same low voltage turns off the NMOS transistors $Q_4$ and. $Q_6$ and eliminates the conduction path to $V_{OL}$. This combination results in Output going to the voltage $V_{OH}$. When Input is high, the PMOS transistors $Q_1$, and $Q_5$ are off and there is no conduction path between Output and $V_{OH}$. This same high voltage turns on the NMOS transistors $Q_4$ and $Q_6$ and provides a conduction path to $V_{OL}$. This combination results in Output going to the voltage $V_{OL}$.

The rise and fall times can be controlled separately in driver 1200. The drive strength (i.e., amount of current that can be applied) of the conduction path between $V_{OH}$ and the signal Output determines the rise time at the terminal 1208, and is constituted by two components, the strength of transistor $Q_5$ and the strength of transistors $Q_1$ and $Q_2$. The strength of transistor $Q_5$ is constant and is determined primarily by the size of the transistor. In parallel with this is the combination of transistors $Q_1$, and $Q_2$; the strength of this pair is limited by transistor $Q_2$ and its gate control voltage $V_{RISE}$. The lower this voltage, $V_{RISE}$, the stronger transistor $Q_2$ pulls up the Output. Thus, a lower voltage makes the rise time faster. According to an aspect of the invention, a control module 1210 is provided, which can control the value of $V_{RISE}$. For example, $V_{RISE}$ can be set (e.g., factory set) to a mid-point value to achieve a preselected rise time, and the control module 1210 can program or vary the value of $V_{RISE}$ about that midpoint to achieve a desired value for rise time, as further described below.

The strength of the conduction path between $V_{OL}$ and Output determines the fall time at Output. This strength also has two components. The strength of transistor $Q_6$ is constant and primarily determined by the size of that transistor. In parallel with this is the combination of transistors $Q_3$ and $Q_4$; the strength of this pair is limited by transistor $Q_3$ and its gate control voltage $V_{FALL}$. The higher this voltage, $V_{FALL}$, the stronger transistor $Q_3$ pulls down the signal Output. Thus a higher voltage $V_{FALL}$, makes the fall time faster. According to another aspect of the invention, the control module 1210 can control the value of $V_{FALL}$. For example, $V_{FALL}$ can be set (e.g., factory set) to a midpoint value to achieve a pre-selected fall time, and the control module 1210 can program or vary the value of $V_{FALL}$ about that midpoint to achieve a desired value for rise time, as further described below.

The driver high and low voltages can also be controlled separately in the driver 1200. Driver high voltage is determined by $V_{OH}$, the high power supply voltage to the driver 1200. According to yet another aspect of the invention, the control module 1210 can control the value of $V_{OH}$ so as to provide programmable regulation of the driver high voltage. Driver low voltage is determined by $V_{OL}$, the low power supply voltage to the driver 1200. The control module 1210 can control the value of $V_{OL}$ so as to provide programmable regulation of the driver low voltage.

Various alternative embodiments of drivers can be utilized in the practice of the invention instead of that shown in FIG. 12. For example, FIGS. 13 and 14 show respective bus drivers 1300, 1400, which, as noted above, drive a bus line in only one direction instead of both directions as does driver 1200. Bus driver 1300 is a "drive high only" driver, while bus driver 1400 is a "drive low only" driver. The drivers 1300 and 1400 are essentially sub-parts of the driver 1200 of FIG. 12, with corresponding circuit elements and operation as described above in conjunction with FIG. 12. For convenience, analogous components have been designated with the same reference numbers.

Figure 15:
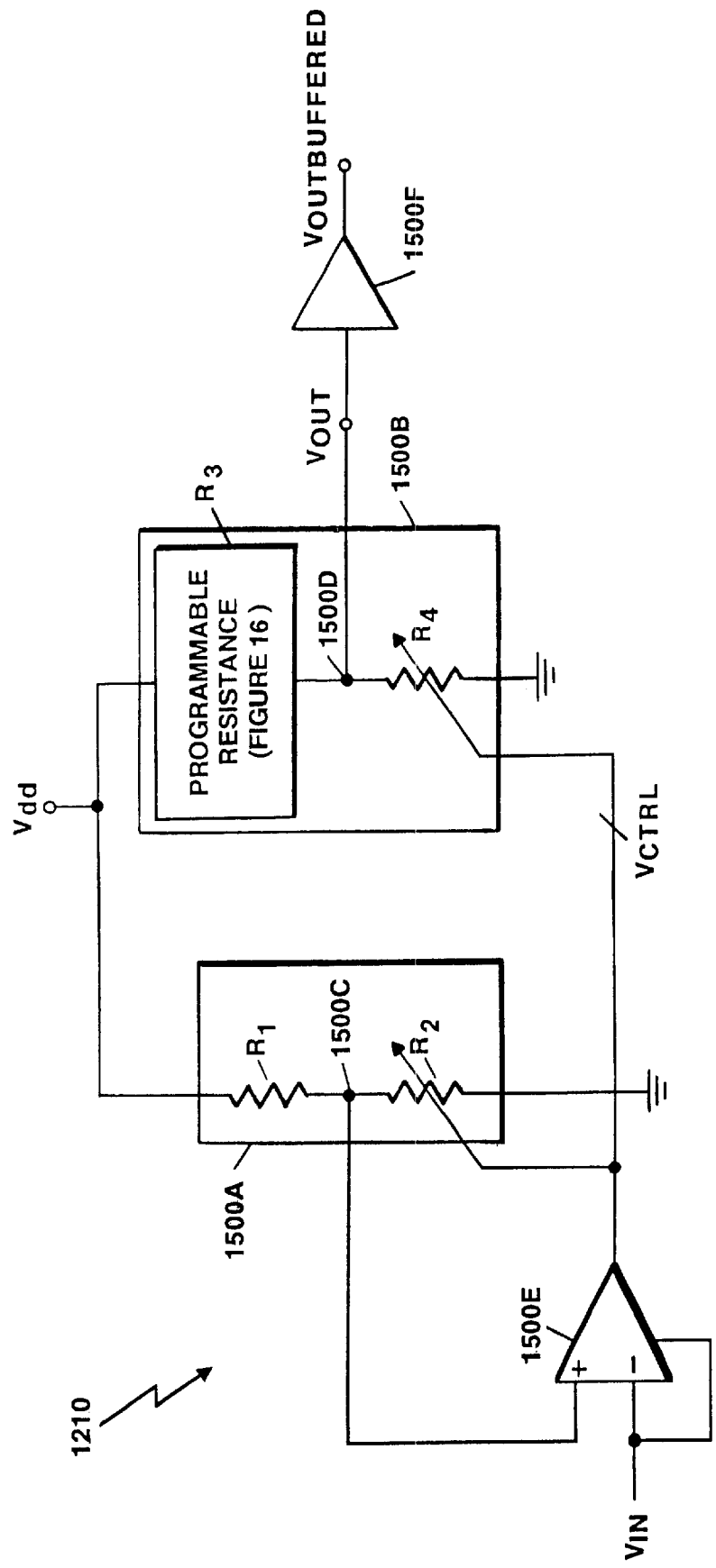
FIGS. 15 and 16 are schematic views, partially in block diagram form, of an exemplary embodiment of the control modules of FIGS. 12, 13 and 14 for adjusting at least one bus parameters in accordance with an application of the invention.
Figure 16:
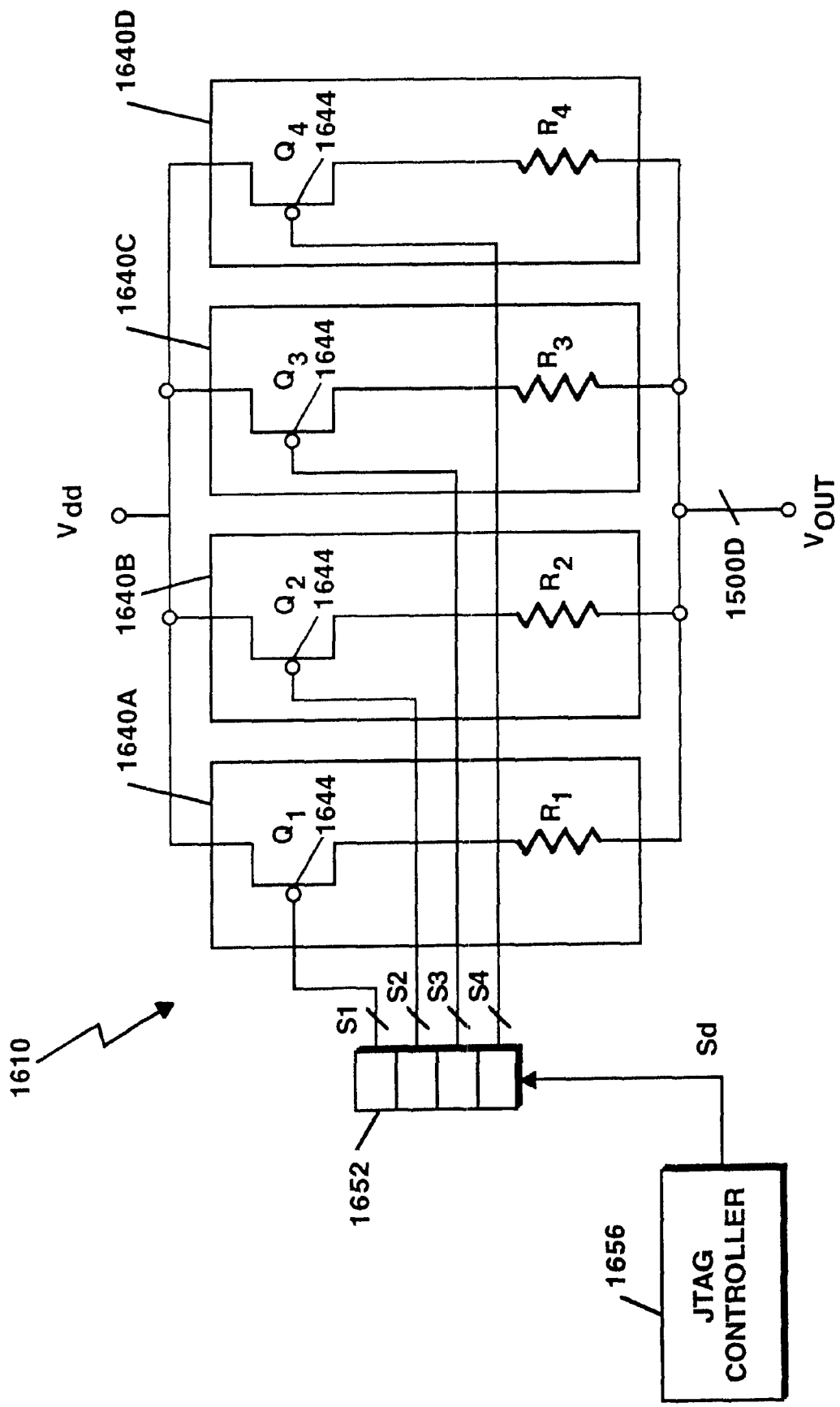

With renewed reference to the driver 1200 of FIG. 12, FIGS. 15 and 16 will now be described. FIG. 15 and 16 shows an implementation of the control module 1210 for providing programmable control of any one of the voltages $V_{RISE}$, $V_{FALL}$, $V_{OH}$ and $V_{OL}$. In order to control all of these voltages, the illustrated implementation can be replicated, with the control voltage $V_{OUT}$ from the replicated circuitry applied to the appropriate terminal that is shown in FIG. 12 as receiving $V_{RISE}$, $V_{FALL}$, $V_{OH}$ or $V_{OL}$.

FIG. 15 shows an embodiment of the control module 1210, having two voltage dividers 1500A, 1500B. Voltage divider 1500A includes a resistor $R_4$ and a variable resistor $R_2$ interconnected by a common node 1500C. Voltage divider 1500B includes a programmable resistance $R_3$ and a variable resistor $R_4$ interconnected by a common node 1500D. A power supply voltage $V_{dd}$ is applied to $R_4$ and $R_3$, and $R_2$ and $R_4$ are connected to ground. The control module 1210 also employs an operational amplifier 1500E. An input voltage, $V_{in}$, is applied to a first input terminal of the operational amplifier 1500E, whose second input terminal is tied to node 1500C. The operational amplifier's output; $V_{ctrl}$, is applied to the resistance adjustment terminals of variable resistors $R_2$ and $R_4$. $V_{ctrl}$ is generated such that the voltage at node 1500C is at the same level as $V_{in}$. The control module's output, $V_{OUT}$, is tapped at node 1500D, and in some applications can be buffered by amplifier 1500F so as to form a $V_{outbuffered}$ signal capable of sourcing and sinking current while preventing voltage drops and thus avoiding the effects of changes in current loading. During operation, $V_{ctrl}$ causes resistors $R_2$ and $R_4$ to assume the same resistance value. Accordingly, the relationship between resistance values of $R_1$ and $R_3$ determines the output voltage $V_{OUT}$. Since the resistance of $R_1$, is preferably fixed, the resistance of $R_3$ determines $V_{OUT}$. According to an aspect of the invention, the resistance of $R_3$ is programmable, responsive to a digital signal $S_d$ (described below), so as to provide a controllable value for $V_{OUT}$. As noted above, $V_{OUT}$ is applied to the driver 1200 of FIG. 12 as $V_{RISE}$, $V_{FALL}$, $V_{OH}$ or $V_{OL}$. Consequently, any of these electrical characteristics can be regulated, and thus the bus operating or signaling parameters that depend on them adjusted.

FIG. 16 shows a programmable resistance circuitry 1610 for implementing the programmable resistance $R_3$ of FIG. 16. The resistance circuitry 1610 includes a plurality of resistance cells 1640A–D. The number of cells can vary with the application, e.g., depending on the desired degree or range of resistance control. Each resistance cell 1640A–D includes a controllable, variable resistor $R_1$, $R_2$, etc. and a transistor switch $Q_1$, $Q_2$, etc. $V_{dd}$ is applied to the cells 1540A–D as the positive rail for the resistance circuitry 1610, and the other end of the cells are tied to node 1500D, from which $V_{out}$ is tapped.

The state of the transistor switches $Q_1$, $Q_2$, etc. determines whether the corresponding resistance cells 1640A–D are connected into the resistance circuit or open circuited. For these purposes, the source of each transistor switch 1644 is connected to $V_{dd}$, and the drain is connected to the associated resistor $R_1$, $R_2$, etc. of the same cell containing the transistor switch. The gate of each transistor switch 1644 is connected to control signal lines, which carry digital selection signals $S_1$, $S_2$, . . . $S_4$. The selection signals cause the transistor switches $Q_1$, . . . , $Q_4$ to conduct or cease conducting, i.e., turn "on" and "off", depending on whether the selection signals are HIGH or LOW. Accordingly, the resistance circuitry 1610 is designed to selectively place a greater or lesser number of cells, and thus a greater or lesser number of resistors $R_1$, . . . , $R_4$, in parallel, responsive to the individual selection signals. The sizes of the variable resistors $R_1$, . . . , $R_4$ can be all equal, or, alternatively, can be different so as to provide discrete resistance value steps of respectively the same size or different sizes as more or less of the variable resistors are switched on or off in the resistance circuitry 1610. The selection signals $S_1$, $S_2$, . . . , $S_4$ are provided to the gates of transistor switches $Q_1$, . . . , $Q_4$ via a JTAG register 1652 from a JTAG controller 1656, which applies the selection signals to the register 1652 as voltages comprising a JTAG signal $S_d$. The JTAG controller 1656 and register 1652 can be implemented in compliance with the JTAG Spec. The JTAG controller 1656 is responsive to a digital signal generated, e.g., in response to a computer-executed program, which is implemented in compliance with the JTAG Spec. Accordingly, the JTAG controller 1656 controls the overall resistance of the programmable resistance circuitry 1610 by turning "on" (making active) individual resistance cells 1540A–D, individually and separately, via the programmable selection signals $S_1$, $S_2$, . . . , $S_4$ and the transistor switches $Q_1$, . . . , $Q_4$.

During operation, the JTAG controller 1656 establishes an initial internal resistance value for resistance $R_3$, for example, by causing approximately half of the resistance cells 1640A–D, (e.g., in terms of resistance value or number of cells) to be switched on. For example, in the illustrated embodiment, cells 1640A and 1640B can be switched on, while cells 1640C and 1640D can be switched off. With those initial conditions, in order to control $V_{RISE}$, $V_{outbuffered}$ is applied to driver 1200 as $V_{RISE}$, and produces a first value for the rise time. To modify that first value, the JTAG controller 1656 can cause $S_d$ to connect a greater or lesser number of resistance cells 1640A–D into the resistance circuitry 1610, causing $V_{RISE}$ to vary, either increasing or decreasing, in discrete steps corresponding to the differences in the resistance values through a range determined by respectively the minimum and maximum values of the programmable resistance. Similarly, in order to control $V_{FALL}$, $V_{outbuffered}$ is applied to driver 1200 as $V_{FALL}$, and, under the initial conditions, produces a first value for the fall time which can appropriately be adjusted. To control $V_{OH}$ or $V_{OL}$, and thus to establish driver high or low voltage limit, $V_{outbuffered}$ is applied to driver 1200 as $V_{OH}$ or $V_{OL}$, respectively, and, under the initial conditions, produces a first value for the respective drive high or low voltage limits, which can appropriately be adjusted, as described herein.

Accordingly, in summary, the JTAG controller 1656 can cause the rise and fall times to be modified by changing the number of active resistance cells 1640A–D. Increasing the number of active resistance cells 1640A–D causes the internal resistance to decrease. The rise and fall times and drive high and low voltage limits thus can be changed in discrete steps, corresponding to the contribution of each resistance cell to total internal resistance, within a range about the first value. It should be evident that to control separately each of these signal characteristics, the circuitry of FIGS. 15A and 15B can be replicated and the $V_{outbuffered}$ from each can be applied to control a different one of these signal characteristics.

Figure 18A:
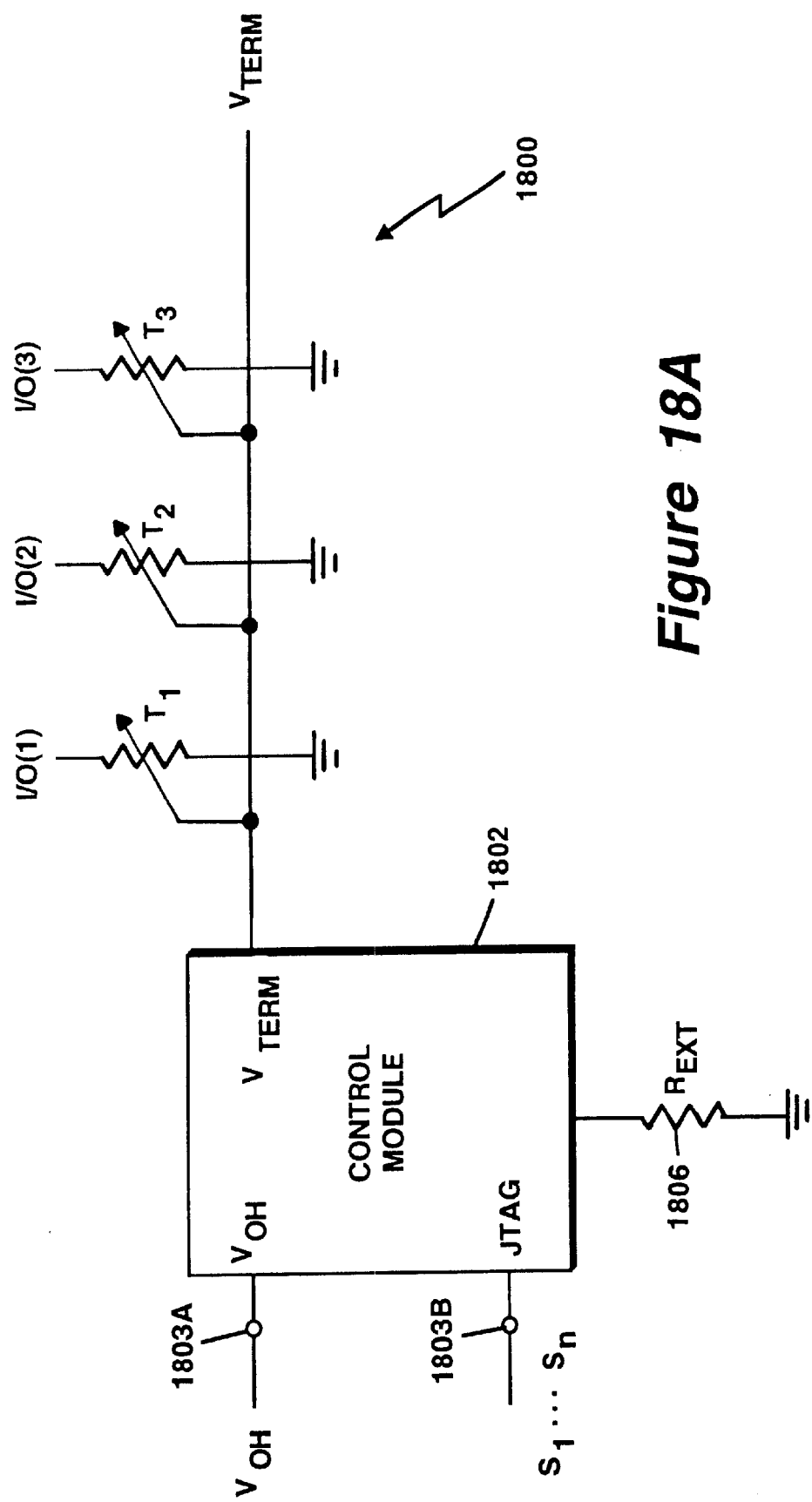
FIG. 18A is a schematic view, partially in block diagram form, of an embodiment of the terminator of FIG. 10.

Returning to FIG. 15, the implementations for resistors $R_1$, $R_2$ and $R_4$ deserve further description. Resistor $R_1$ preferably is implemented as shown in FIG. 16, without the need for the JTAG controller 1656 and register 1652, and with the $S_1, \ldots S_4$ lines hard wired so that, e.g., only transistor switches 1640A and 1640B are switched on. In such an implementation, the-node designated 1500D in FIG. 16 would become node 1500C of FIG. 15. Thus, the resistance value of $R_1$ will match that of the initial value, as described above, of programmable resistance $R_3$. Resistors $R_2$ and $R_4$ are preferably implemented as instances of the resistance circuit shown in FIG. 18C (described below) with the DrvVar node corresponding to respective nodes 1500C and 1500D for resistors $R_2$ and $R_4$, and $V_{SS}$ being grounded. The resistance values of each of $R_2$ and $R_4$ being set by JTAG select signals as shown in FIG. 18A so that the voltage at node 1500C is equal to voltage Vin. Both resistors $R_2$ and $R_4$ of FIG. 15 receive the same control voltage, $V_{ctrl}$, as noted above, and should have the same resistance value. Accordingly, the implementations as described herein for resistors $R_1, \ldots, R_4$ of FIG. 15 will assure substantially identical voltage dividers 1500A and 1500B, with the voltage $V_{OUT}$ adjustable by changing the $S_d$ signals for the resistance of programmable resistance $R_3$.

The just-described implementation of the control module 1202 (as shown in FIGS. 15 and 16 for use as part of the driver of FIG. 12) can also be used to implement the control module for the drivers 1300, 1400 of FIGS. 13 and 14. With renewed reference to those figures, where drivers 1300,1400 drive in one direction only, the control module 1210 regulates the appropriate voltage $V_{OH}$ or $V_{OL}$ to control the driver high or low voltage, respectively. The terminator 1002 (FIG. 10) can be tied to a programmable source, (as described below) to provide the high voltage for the driver low only driver 1400, and can be used to pull the bus line down to provide the low voltage in the drive high only driver 1300.

D) Bus Receiver with Controllable Threshold Voltage

Figure 17:
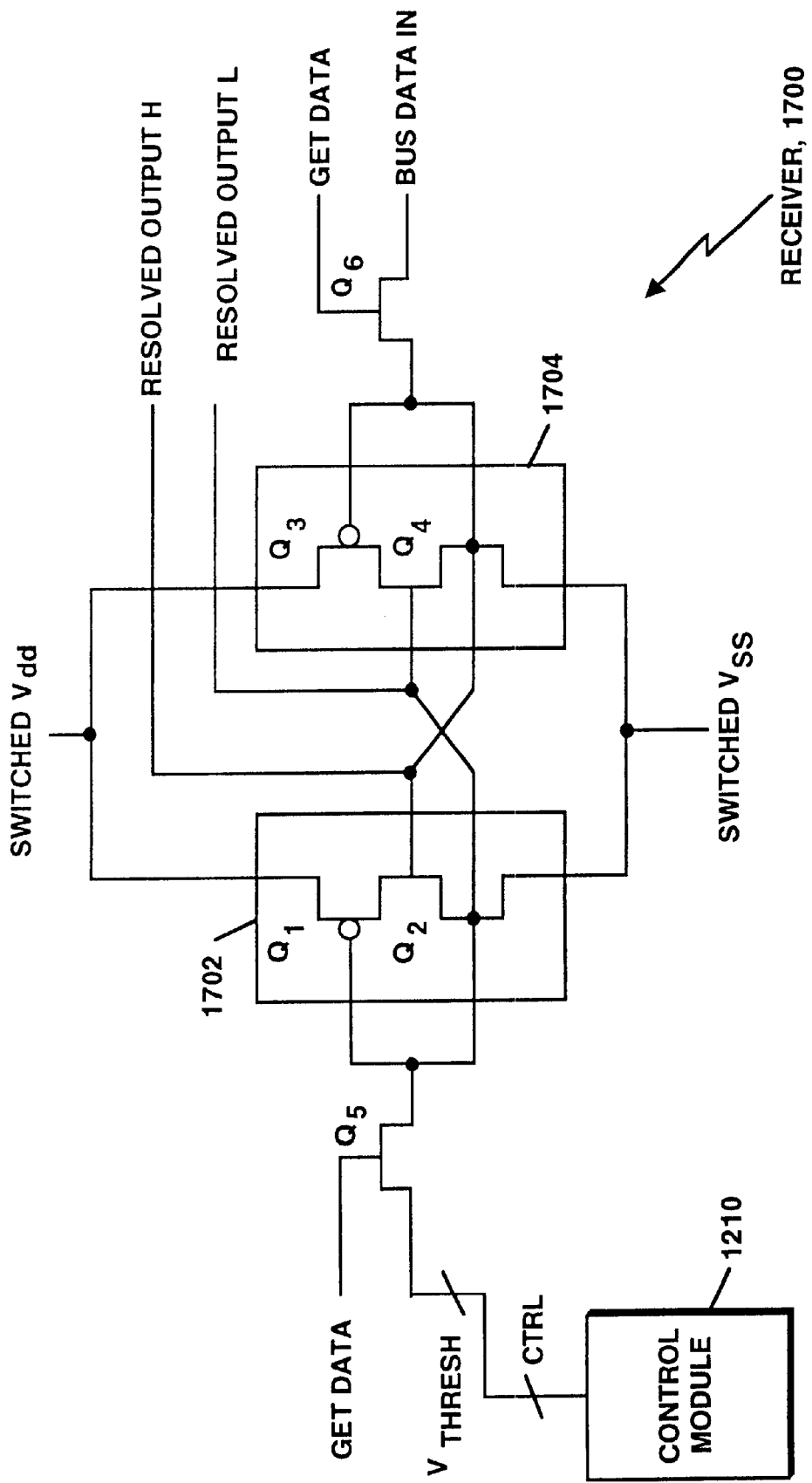
FIG. 17 is a schematic view, partially in block diagram form, of an embodiment of the bus receiver of FIG. 10.

FIG. 17 shows a bus receiver 1700 implemented as a sense amplifier circuit. The receiver 1700 receives two input voltages, $V_{THRESH}$ and BusDataIn, and resolves the outputs to a unique state depending upon which of the two inputs is higher than the other. The receiver 1700 has two cross-coupled inverters 1702 and 1704. The first is a stack composed of transistors $Q_1$ and $Q_2$. The second is a stack composed of transistors $Q_3$ and $Q_4$. The input to the first inverter 1702 is connected to the signal $V_{THRESH}$ through the NMOS transistor $Q_5$. The input to the second inverter 1704 is connected to the signal BusDataIn through the NMOS transistor $Q_6$. The input of the first inverter 1702 is further connected to the output of the second inverter 1704, ResolvedOutputL. The input of the second inverter 1704 is further connected to the output of the first inverter 1702, ResolvedOutputH. Both of the inverters 1702 and 1704 are connected to power by the signals SwitchedV$_{ss}$ and SwitchedV$_{dd}$. The transistors $Q_5$ and $Q_6$ act as switches to connect the inputs to $V_{THRESH}$ and BusDataIn, respectively. The connections are made when the gates of the transistors $Q_5$ and $Q_6$ are at a high voltage due to the signal GetData. When the signal GetData is low, the connections are open.

The various signals illustrated in FIG. 17 can be described as follows: $V_{THRESH}$ is a programmed voltage provided to the receiver 1700, and acts as a threshold voltage. It effectively determines the switch point from "one" to "zero". When BusDataIn is higher than $V_{THRESH}$, the signal ResolvedOutputH goes high and ResolvedOutputL goes low. This is normally thought of as resolving to the "one" state. When BusDataIn is lower than $V_{THRESH}$, the signal ResolvedOutputH goes low and ResolvedOutputL goes high. This is normally thought of as resolving to the "zero" state. BusDataIn is the data input that is compared against $V_{THRESH}$ to determine the resolved state. GetData controls the input transistors $Q_5$ and $Q_6$. When this signal is high, the inverter inputs get their data through these transistors from $V_{THRESH}$ and BusDataIn. When the signal is low, these inputs are not connected to $V_{THRESH}$ and BusDataIn. If SwitchedV$_{ss}$ and SwitchedV$_{dd}$ are off, the inverter transistor gates act as capacitors and hold their value.

When SwitchedV$_{ss}$ and SwitchedV$_{dd}$ are on, the inverter transistors gates are driven by the output of the opposite inverter.

SwitchedV$_{dd}$ supplies high voltage power source to the inverters 1702 and 1704 so they can act as a resolver when this voltage is on. When this voltage SwitchedV$_{dd}$ is off, it floats and the inverters are not powered. SwitchedV$_{ss}$ supplies low voltage power source to the inverters so they can act as a resolver when this voltage is on. When voltage SwitchedV$_{ss}$ is off, it floats and the inverters are not powered. ResolvedOutputH is an output of the receiver 1500. It goes high when BusDataIn is higher than $V_{THRESH}$ and it goes low if BusDataIn is lower than $V_{THRESH}$. ResolvedOutputL is an output of the receiver 1700. It goes low when BusDataIn is higher than $V_{THRESH}$ and it goes high if BusDataIn is lower than $V_{THRESH}$.

The receiver 1700 resolves to the correct state by using the following timing sequence. The power signals, SwitchedV$_{ss}$ and SwitchedV$_{dd}$, start in the off state. That is, they do not provide any power to the inverters. The signal GetData is low so the inputs are not connected to the inverters. Then, the following sequence of events occur: The signal GetData transitions to a high state. This connects $V_{THRESH}$ and BusDataIn to the inputs of their respective inverters. These signals charge the gates of the input transistors to their respective voltage values. A finite time later GetData transitions to a low. This disconnects the inputs $V_{THRESH}$ and BusDataIn. The gates of the inverter input transistors act as capacitors and hold their charge. The inverters are not powered so they do not affect the charge. A finite time later the signals SwitchedV$_{ss}$ and SwitchedV$_{dd}$ are turned on. This powers up the inverters. The inverters each have a voltage on their inputs and the inverter output tries to move in the direction these voltages determine. The direction depends on where the voltage is in relation to the intrinsic threshold of the inverters. As they start to move they move the other input because of the cross coupled outputs to inputs. If both inverters move in the same direction the one further from its intrinsic threshold moves faster and wins the cross coupled battle. The two outputs move toward the opposite rails as they resolve to the proper state. After resolution is completed the output are stored into an output stage (not shown). This is used to save the output during the next cycle and provide the receiver output. After storage into the output stage the inverter power is turned off and the cycle is repeated for the next cycle of receive data.

The resolution threshold is determined by the value of $V_{THRESH}$. This voltage can be programmable using the control module 1500 of FIG. 15 and the programmable circuitry of FIG. 16, where the voltage $V_{outbuffered}$ is applied as the voltage $V_{THRESH}$, and thus provides a programmable threshold receiver.

E) Bus Terminator with Controllable Resistance.

FIG. 18A depicts a voltage-controlled terminator or termination resistance circuit 1800. The terminator 1800 has a control module 1802 and a plurality of terminator resistances $T_1$, $T_2$, $T_3$ for terminating respective I/O lines I/O(1), I/O(2), I/O(3), which can include, for example, the Output line 1208 of the driver 1200 of FIG. 12 and the BusDataIn line of the receiver 1700 of FIG. 17. The number of such I/O lines so terminated can be increased or decreased according to the needs of a particular application; accordingly, the selection herein of three such I/O lines (numbered 1, 2 and 3) is purely for convenience in illustration and description. The terminator resistances $T_1$, $T_2$, $T_e$ have programmably adjustable resistance values dependent on the voltage $V_{TERM}$. The control module 1802 receives a voltage $V_{ctrl}$ at an input terminal 1803A and, responsive to a digital select signal $S_1, \ldots S_n$ applied, for example, at a JTAG terminal 1803B, regulates the terminator resistance values of terminator resistance I/O(1), I/O(2), I/O(3). Preferably, the terminator resistance values are programmably adjustable within a pre-selected range about a central value (i.e., a value falling within the range, though not necessarily at its mid-point) determined by an external resistor $R_{EXT}$ 1806. Moreover, as will be described shortly, the terminator resistances $T_1$, $T_2$, $T_e$ can be adjusted as a group in an "aggregate" or "bank" adjustment, or each can be adjusted separately in an "individual" adjustment, or both bank and individual adjustments can be implemented in particular applications.

Figure 18B:
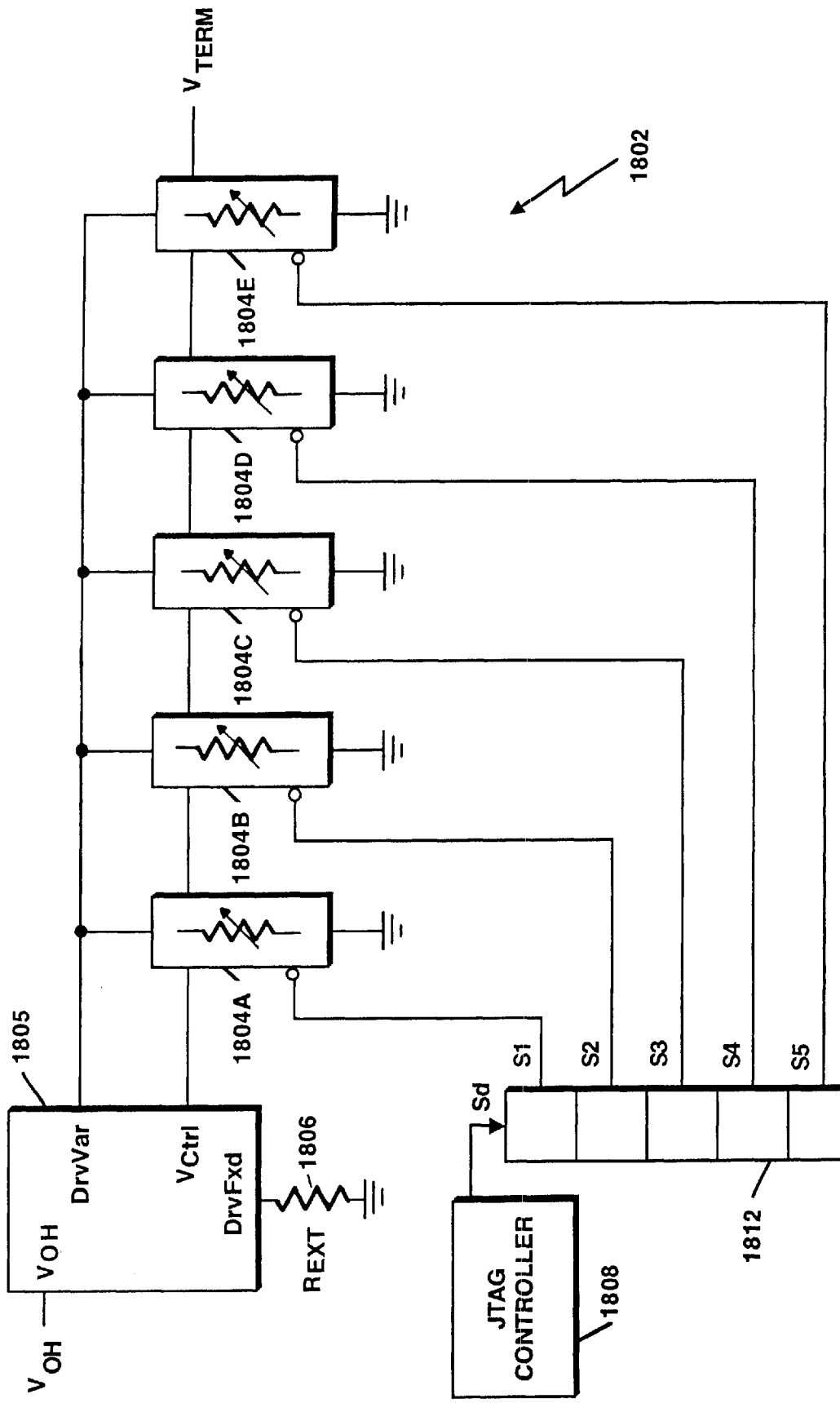
FIG. 18B is a schematic view, partially in block diagram form, of an embodiment of the control module of FIG. 18A.

FIG. 18B shows an exemplary implementation of the control module 1802. As depicted, control module 1802 includes a control module 1805 and a plurality of programmable resistance cells 1804A–E, whose collective resistance is set programmably by select signals $S_d$ ($S_1, S_2, \ldots, S_5$) generated by a JTAG controller 1808 and applied via a JTAG register 1812. The resistance cells 1806A–E are connected in parallel and, responsive to the select signals $S_d$, are either active or inactive, as defined below. The control module. 1805 is designed to generate both a DrvFxd voltage applied to the external resistor $R_{EXT}$ 1806 and a DrvVar voltage applied to the resistance cells 1804A–E. When generated as described herein, those voltages will cause the resistance of resistance cells 1804A–E to equal that of the external resistor $R_{EXT}$ at a first set of values of the select signals $S_d$, when a selected number of cells are active, and can be varied about that resistance by changing the values of the select signals and thus rendering active a different number of cells. The number of active resistance cells 1804A–E will determine the overall value of the resistance of the resistance cells 1804A–E. For example, when $S_1$, $S_2$ and $S_3$ are selected (e.g. have low values), resistance cells 1804A–C are active and the values of the terminator resistors $T_1$, $T_2$, $T_3$ will match external resistor $R_{EXT}$. As more resistance cells 1804D–E are turned on, i.e., made active, via select signals $S_4$ and/or $S_5$ assuming low values, the values of the terminator resistance $T_1$, $T_2$, $T_3$ rises. On the other hand, as more resistance cells 1804D–E are turned off, i.e., made inactive, via select signals $S_1$, $S_2$ and/or $S_3$ assuming high values, the values of the terminator resistances $T_1$, $T_2$, $T_3$ falls.

Figure 18C:
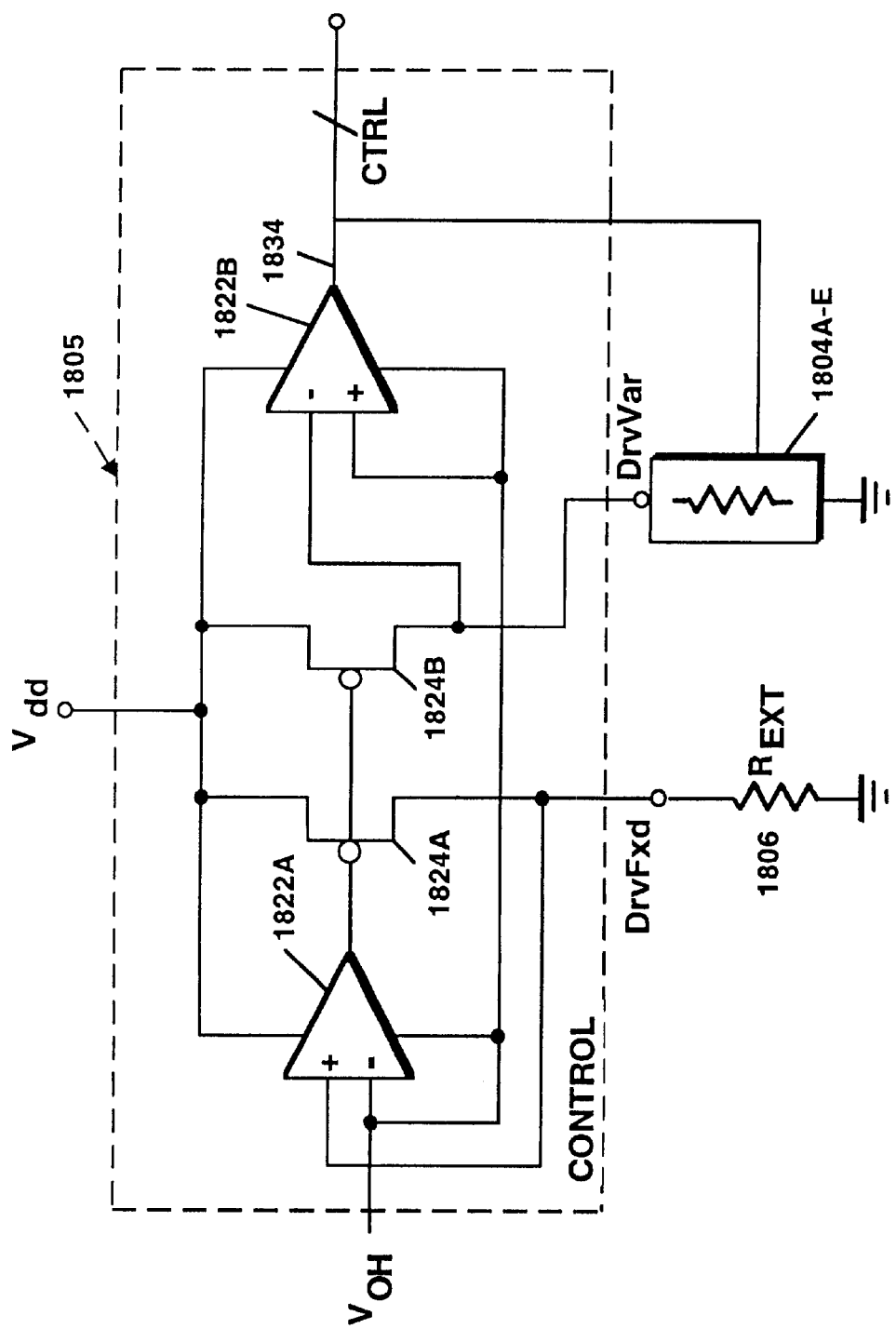
FIG. 18C is a schematic view, partially in block diagram form, of an embodiment of the control module of FIG. 18B.

FIG. 18C shows an embodiment for the control module 1805, which generates the drive voltage DrvFxd for an external resistor $R_{EXT}$ 1806 and the drive voltage DrvVar for the resistance cells 1804A–E, as well as a control signal $V_{ctrl}$ for use in setting the resistance values of the individual resistance cells 1804A–E. The external resistor 1806 is, for example, a discrete device, provided separately from an integrated circuit (IC) on which all or most of the rest of the control module 1802 is preferably implemented, hence the descriptor "external." The resistance cells 1804A–E are depicted collectively as a single variable resistance 1804, for ease in illustration. The control module 1802 has a pair of operational amplifiers 1822A, 1822B, and identical transistor constant current sources 1824A, 1824B used to generate DrvFxd and DrvVar. The control module 1802 receives a supply voltage $V_{OH}$ at an inverting (−) terminal of the operational amplifier 1822A and at the non-inverting terminal of operational amplifier 1822B. The non-inverting (+) input of the operational amplifier 1822A, and the inverting (−) input of operational amplifier 1822B are coupled to receive voltages DrvFxd and DrvVar, respectively, as feedback signals. The output of the operational amplifier 1822A is applied to the control gates of the transistors 1824A, 18?4B. The transistors 1824A, 1824B have sources connected to $V_{dd}$, the power supply voltage, have drains connected to the non-inverting (+) terminal of operational amplifier 1822A and the inverting (−) terminal of operational amplifier 1822B, and provide the output signals DrvFxd and DrvVar to output terminals 1830, 1832, respectively. $V_{ctrl}$ is provided from the output terminal 1834 of operational amplifier 1822B.

During operation, the operational amplifier 1828A supplies the gates of both transistors 1824A and 1824B with the same voltage. This drives current through both resistor 1806 and resistance 1804, and, via the feedback, adjusts the gate drives until the voltage level of DrvFxd is $V_{OH}$. The operational amplifier 1828B adjusts the level of $V_{ctrl}$ via feedback until the voltage level of DrvVar is at $V_{OH}$. At this point, the external resistor 1806 and the programmable resistance 1804 match. The voltage $V_{ctrl}$ can be passed to other instances of variable resistance 1804. More specifically, $V_{ctrl}$ is passed to each of the resistance cells 1804A–E of FIG. 18A.

Figure 18D:
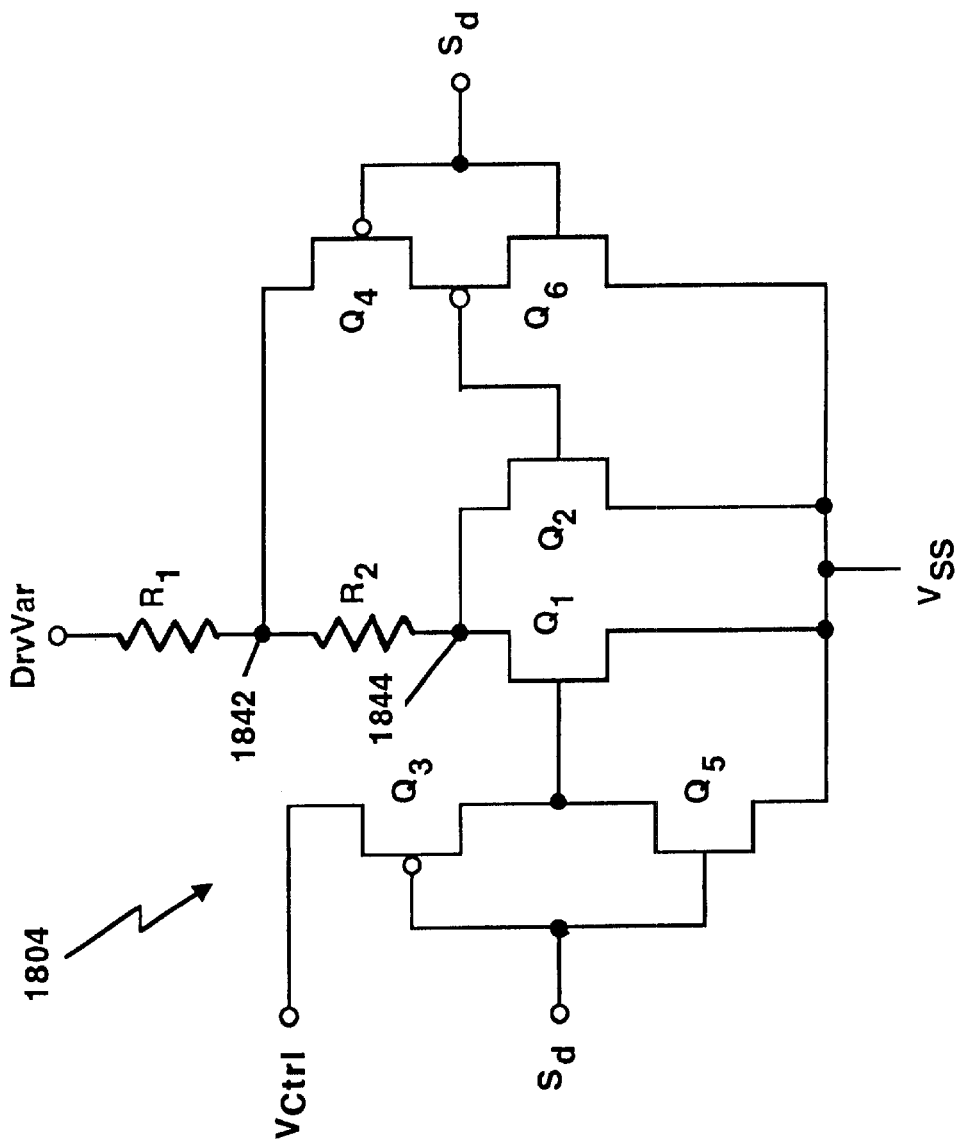
FIG. 18D is a schematic view, partially in block diagram form, of an embodiment of the programmable resistance of FIG. 18B.

FIG. 18D shows an illustrative embodiment for a representative one of the programmable resistance cells 1804A–E of FIG. 18A. Each resistance cell 1804A–E has a resistor $R_1$ in series with a resistor $R_2$ in series with the parallel configuration of transistors $Q_1$ and $Q_2$, with the resistors $R_1$, $R_2$ and transistors $Q_1$ and $Q_2$ are connected between DrvVar and $V_{ss}$. The gates of transistors $Q_1$ and $Q_2$ are each connected to a gate control circuit for switching on or off the respect transistors. When transistors $Q_1$ and $Q_2$ switched on, the resistance cell 1804A–E is active, and when switched off, the resistance cell 1804A–E is inactive. The gate control circuit for transistor $Q_1$ includes transistors $Q_3$ and $Q_5$ connected in series between $V_{ctrl}$ and $V_{ss}$, with a select signal $S_d$ applied to their gates as a switching signal. The gate control circuit for transistor $Q_2$ includes transistors $Q_4$ and $Q_6$ connected in series between a node 1842 connecting resistors $R_1$, and $R_2$ and $V_{ss}$, with the same select signal $S_d$ applied to their gates as a switching signal. The resistance through transistor $Q_1$ is dependent upon the value of $V_{ctrl}$, such that the resistance increases as the value of $V_{ctrl}$ decreases. This resistance is not linear for all values of voltage DrvVar. Given a value of $V_{ctrl}$, the resistance goes lower as DrvVar goes lower because the effective resistance is related to the voltage between the gate and source of transistor $Q_1$, that is, the voltage at node 1844. As the source of transistor $Q_1$ goes more positive than its gate, conduction decreases so the resistance increases. Since $V_{ctrl}$ is constant and DrvVar lower, the source to gate voltage decreases and eventually goes negative. This nonlinear relationship is compensated by transistor $Q_2$, which is biased to provide the opposite relationship between DrvVar voltage and resistance than that of transistor $Q_1$. As the voltage level of DrvVar decreases, the voltage across resistor $R_2$ decreases. This results in the source to gate voltage of transistor $Q_2$ decreasing, causing its conduction to increase while its resistance decreases. The relative sizes of the two transistors $Q_1$, $Q_2$ are selected to complement each other and result in effective compensation of the voltage-to-resistance relationship across a desirable range in values of $V_{ctrl}$. Furthermore, when the select signal $S_d$ is in a low state, the PMOS transistors $Q_3$ and $Q_4$ conduct, and, consequently, transistors $Q_1$ and $Q_2$ conduct. Under those conditions, the resistance cell 1804A–E is active. When the select signal $S_d$ is in a high state, the NMOS transistors $Q_5$ and $Q_6$ conduct and ground the gates of transistors $Q_1$ and $Q_2$, causing these transistors to stop conducting and disconnect the resistors $R_1$ and $R_2$ from the circuit. In other words, under that latter condition, the path from DrvVar to $V_{ss}$ is open and the cell is inactive.

Accordingly, the termination resistance is determined by the select signals $S_d$, which are programmable using JTAG technology in the control module 1802. The JTAG controller 1856 establishes an initial internal resistance value, for example, by causing approximately half of the resistance cells 1804A–D (e.g., in terms of resistance value or number of cells) to be switched on. For example, in the illustrated embodiment, cells 1804A and 1804B can be switched on, while cells 1804C and 1804D can be switched off. Under those initial conditions, the internal feedback voltages DrvFxd, DrvVar modify voltage CTRL, thus changing the internal resistance of resistance circuitry 1804, until the voltages DrvFxd, DrvVar produced by the identical transistor constant current sources 1824A, 1824B cause the same voltage drop across the internal resistance (established by the active resistance cells 1804A–D) as that across the external resistance $R_{EXT}$. This happens when the internal and external resistances are equal, and voltages DrvFxd, DrvVar, and CTRL are equal.

Returning to FIG. 18A, the terminator resistances $T_1$, $T_2$, $T_3$ can be implemented, for example, in any of a variety of embodiments depending on the application. For example, the terminator resistances $T_1$, $T_2$, $T_3$ can each be implemented as shown in FIG. 18B, but without a control module analogous to module 1805. Thus, replicas of that circuit can be used to implement both the control module 1802 of FIG. 18B as well as the individual terminator resistances $T_1$, $T_2$, $T_3$ of FIG. 18A. Of course, different select signals $S_d$ will need to be applied to control the value of each terminator resistance. Moreover, for purposes of implementing the terminator resistances $T_1$, $T_2$, $T_3$, lines I/O(1), I/O(2) and I/O(3) would replace the line on which DrvVar is applied in FIG. 18B.

Figure 18E:
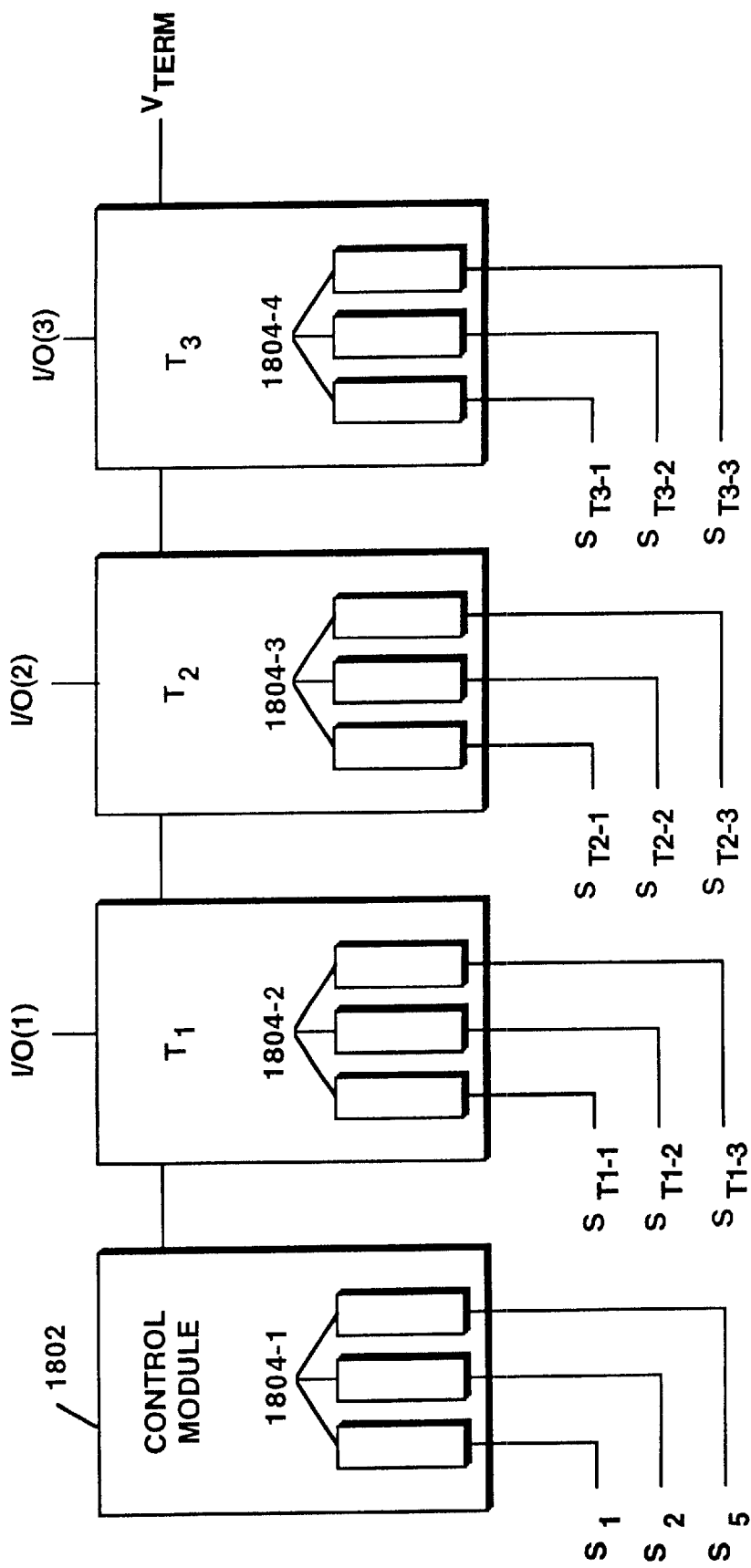
FIG. 18E is a schematic view, partially in block diagram form, of an embodiment of the terminator of FIG. 18A, two levels of control for both bank and individual adjustment of termination resistance levels.

FIG. 18E illustrates the resulting control aspects of a terminator 1800 having both bank and individual adjustment capability for the line terminations. Bank adjustment of the terminator resistances $T_1$, $T_2$, $T_3$ is achieved by select signals $S_1$, $S_2$, ... $S_5$ controlling the number of resistance cells 1804-1 active in the control module 1802. Individual adjustment of the terminator resistances $T_1$, $T_2$, $T_3$ can be achieved by adjusting the number of resistance cells 1804-2, 1804-3, 1804-4 active in the particular terminator resistance $T_1$, $T_2$, $T_3$ whose value is being adjusted. For example, terminator resistance $T_1$ can be individually adjusted programmably using select signals $S_{T1-1}$, ... $S_{T1-3}$ to render active a selected number of resistance cells 1804-2. Similarly, terminator resistance $T_2$ can be individually adjusted programmably using select signals $S_{T2-1}$, $S_{T2-3}$ to render active a selected number of resistance cells 1804-3, and terminator resistance $T_3$ can be individually adjusted programmably using select signals $S_{T3-1}$, ... $S_{T3-3}$ to render active a selected number of resistance cells 18044. The select signals $S_{T1-1}$, $S_{T2-1}$, $S_{T3-1}$, ..., $S_{T3-3}$ can be applied to the corresponding device (i.e., control module 1802, or terminator resistance $T_1$, $T_2$, $T_3$) by the JTAG controller 1808 (FIG. 18B), which generates those signals under program (e.g., software) control.

Alternatively, in applications in which individual adjustments of the terminator resistances are not required, each terminator resistance can be implemented as shown in FIG. 18D, but, e.g., without the select circuitry of transistors $Q_3$, $Q_4$, $Q_5$, and $Q_6$. In such an implementation, $V_{CTRL}$ is applied to the gate of transistor $Q_1$, and resistor $R_1$, is connected to the I/O line rather than DrvVar as illustrated. Such an arrangement permits the terminator resistances $T_1$, $T_2$, $T_3$ to be bank adjusted programmably. For a given $V_{CTRL}$, the resistance from I/O to $V_{ss}$ would be set to equal e.g., the resistance from DrvVar to $V_{ss}$ (ground) in FIG. 18A when three of the select signals are enabled.

F) Bus Driver with Controllable Propagation Time

A measure of bus performance is the bus transfer rate, which specifies the rate at which address, control, and data are transferred on the bus. Several difficulties are encountered when improving bus performance. A characteristic called bus cycle time gives an indication of the speed of a bus. For a synchronous bus, a bus cycle can be viewed as that period of time required to complete a transfer on the bus before a new transfer can begin. (In synchronous busses, all transfers are synchronized to a common timing signal referred to as a clock signal). This minimum period determines the maximum clock rate. In general, the minimum cycle time for a synchronous bus is related to (a) phase accuracy (or temporal shift) in the clock (generally referred to as clock skew), (b) propagation delay from an asserting edge of the clock to the point of time that the data appears at the output of the driver connected to the bus, and (c) delay associated with driving the bus. The delay associated with driving the bus includes two components. The first one is the propagation delay through the bus driver and the second is the period of time necessary to have the bus settle. For an asynchronous bus, similar considerations are present to determine a minimum cycle time. (In asynchronous busses, hand-shaking signals are used to transfer information as quickly as possible.) For the asynchronous bus, the minimum cycle time is related to noise in the handshaking signals, propagation delay from an asserted edge of the handshaking signals to the point of time that the data appears at the driver connected to the bus, and delay associated with driving the bus.

For purposes hereof, the focus will be on synchronous busses, though aspects of the invention can be practiced as well with asynchronous busses. Also, for these purposes, propagation time for a voltage output signal of a bus driver can be considered as the time from when the driver is presented data until it drives the bus to transmit that data. This time is part of the effective bus cycle time and is usually minimized; however, it may be possible to shorten effectively the bus cycle by increasing the propagation time.

Figure 19:
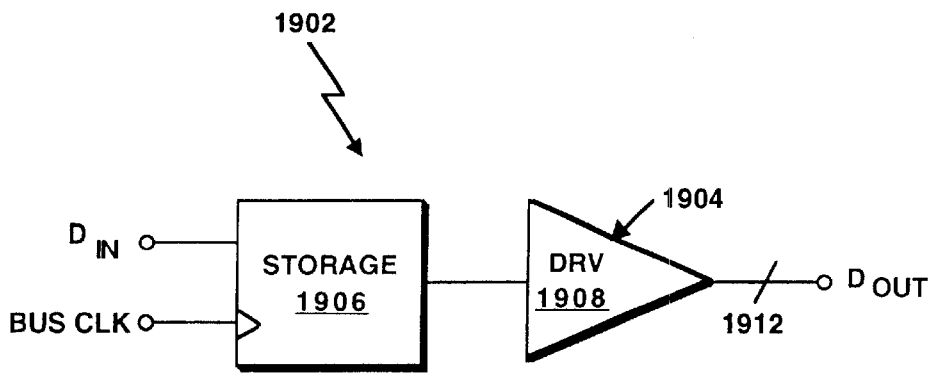
FIG. 19 is a block diagram of a conventional bus driver module.

FIG. 19 shows a conventional bus driver module 1900 as including an input stage 1902 that acquires the data being transmitted and an output stage 1904 that presents the output data to the bus. The first stage 1902 includes a storage element 1906, in which the data is stored at BusClk time, and the output stage 1904 includes a driver circuit 1908 for sending the data out as $D_{out}$ on driven line 1912.

Figure 20:
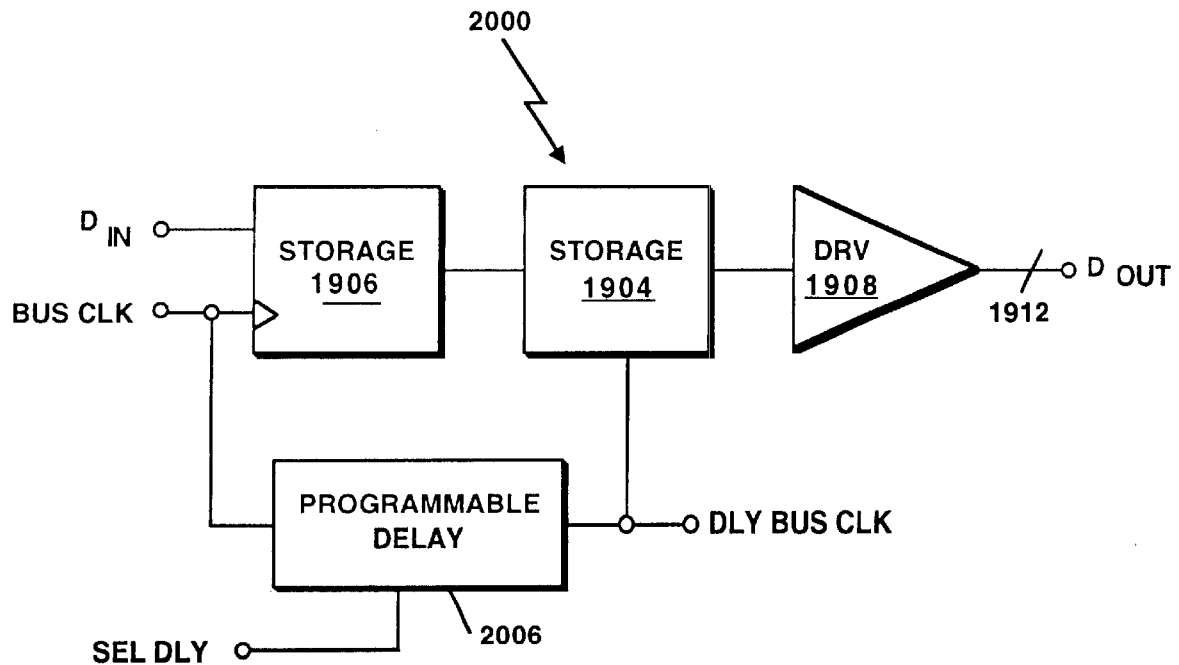
FIGS. 20 and 21 are block diagrams of a bus driver module in accordance with alternative embodiments of another aspect of the invention regarding programmable propagation time.

FIG. 20 shows a bus driver module 2000 in accordance with an embodiment of an aspect of the invention. FIG. 20 differs from FIG. 19 in that it includes a transparent latch 2004 disposed between the storage element 1906 and the driver 1908. The latch 2004 is opened to allow data to be latched therein by a delayed bus clock, and retains the previously latched data until the latch 2004 is opened again by the delayed bus clock. Thus, the latch 2004 acquires the data from the storage element 1906, latches it for a selected period of time, preferably a programmable time so as to introduce a controllable delay, and then passes it to the driver 1908. Accordingly, the bus driver module 2000, by latching the data on BusClk and presenting it to $D_{out}$ after the programmable delay, effectively implements a programmable propagation time.

Figure 21:
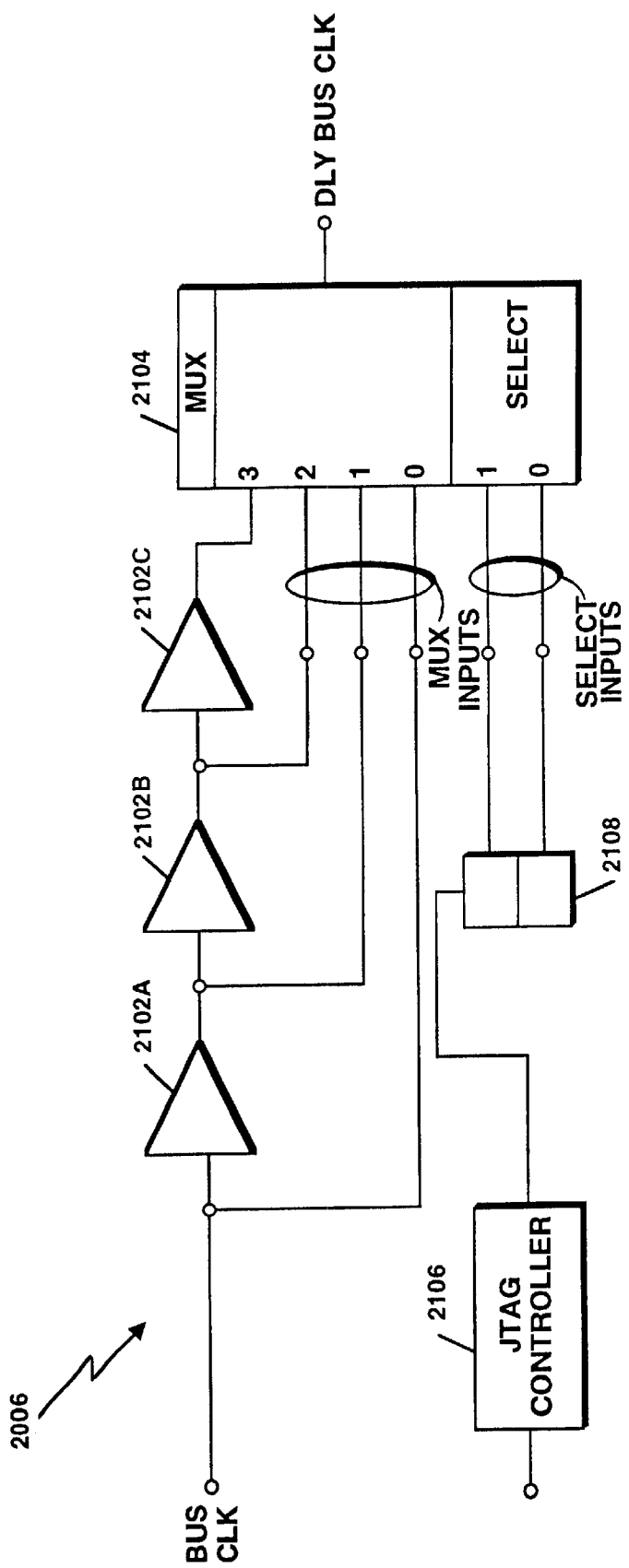

FIG. 21 shows an implementation of the programmable delay 2006 of FIG. 20. The programmable delay includes a chain of serially connected amplifiers 2102A–C, a multiplexer (MUX) 2104, and a JTAG control 2106. The amplifiers 2102A–C are preferably non-inverting, and are characterized by a finite propagation time between their input terminals and output terminals. The bus clock signal BusClk is applied to the input terminal of amplifier 2102A, which introduces a delay in the clock signal equal to its characteristic input-output propagation time. The resulting signal is passed to amplifier 2102B, which introduces another delay, and passes the resulting signal to amplifier 2102C where yet another delay is introduced (The number of amplifiers can be varied for particular applications. The clock signal BusClk is provided as an input 0 of the MUX 2104, and the output terminals of amplifiers 2102A–C are connected individually to respective inputs 1–3 of the MUX 2104. The JTAG controller, responsive to a control signal, produces a digital select signal $S_d$, e.g., which is provided via JTAG register 2108 to select terminals of the MUX 2104. As illustrated, the select signal $S_d$ can be two bits in length that represent and select any one of the four inputs 0–3, which is to be passed to the output of the MUX 2104. Thus, if the select signal is set, for example, at a value of 00, the input 0 can be passed through the MUX, which means that the output of the MUX is essentially the undelayed BusClk. Otherwise, for another value of the select signal, one or another of the delayed outputs of the amplifiers 2102A–C will be passed by the MUX onto its output terminal, with the delay being longer in direct relation to the number of amplifiers-through which the BusClk signal must pass. The output of the MUX is a signal called DLYBUSCLK, and is provided as a clock to the latch 2004.

Accordingly, the programmable delay 2006 can introduce delay in discrete steps under programmable control so as to vary the delay in the clock that controls storage in storage unit 2004. As the propagation delay is increased, propagation time increases. As propagation time increases, the effective time cycle is reduced. Reducing the effective time cycle is an effective way to stress test a bus for data transfer errors or to optimize bus parameters for particular applications.

Alternatively, the programmable delay can be introduced into the data signal itself, by substituting the programmable delay of FIG. 21 for the storage element 1904 in the driver 2000 of FIG. 20. With this arrangement, the data signal is applied to amplifier 2102A (instead of Bus CLK), and the output of MUX 2104 is a delayed data signal (instead of DlyBusClk), which is applied to the driver circuit 1904. With this arrangement, it is not necessary to delay the BusClk signal, per FIG. 20. A further alternative to the approach of FIG. 21 for delaying the clock so as to form a DlyBusClk signal uses a phase lock loop and frequency multiplier arrangement.

G) Computer Systems

Figure 22:
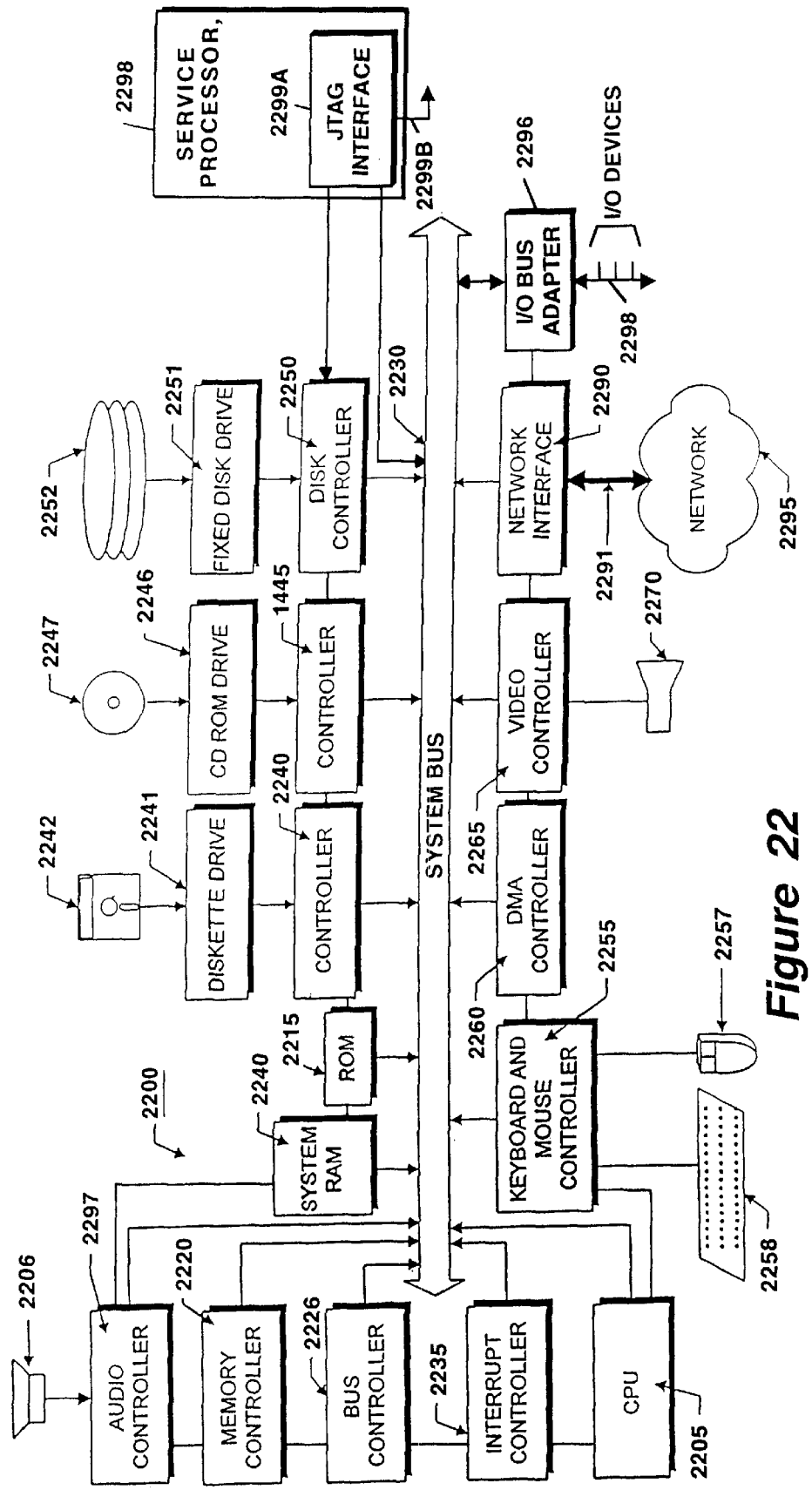
FIG. 22 is a block diagram of an illustrative architecture of a single-processor computer system in which the invention can be practiced.
Figure 23:
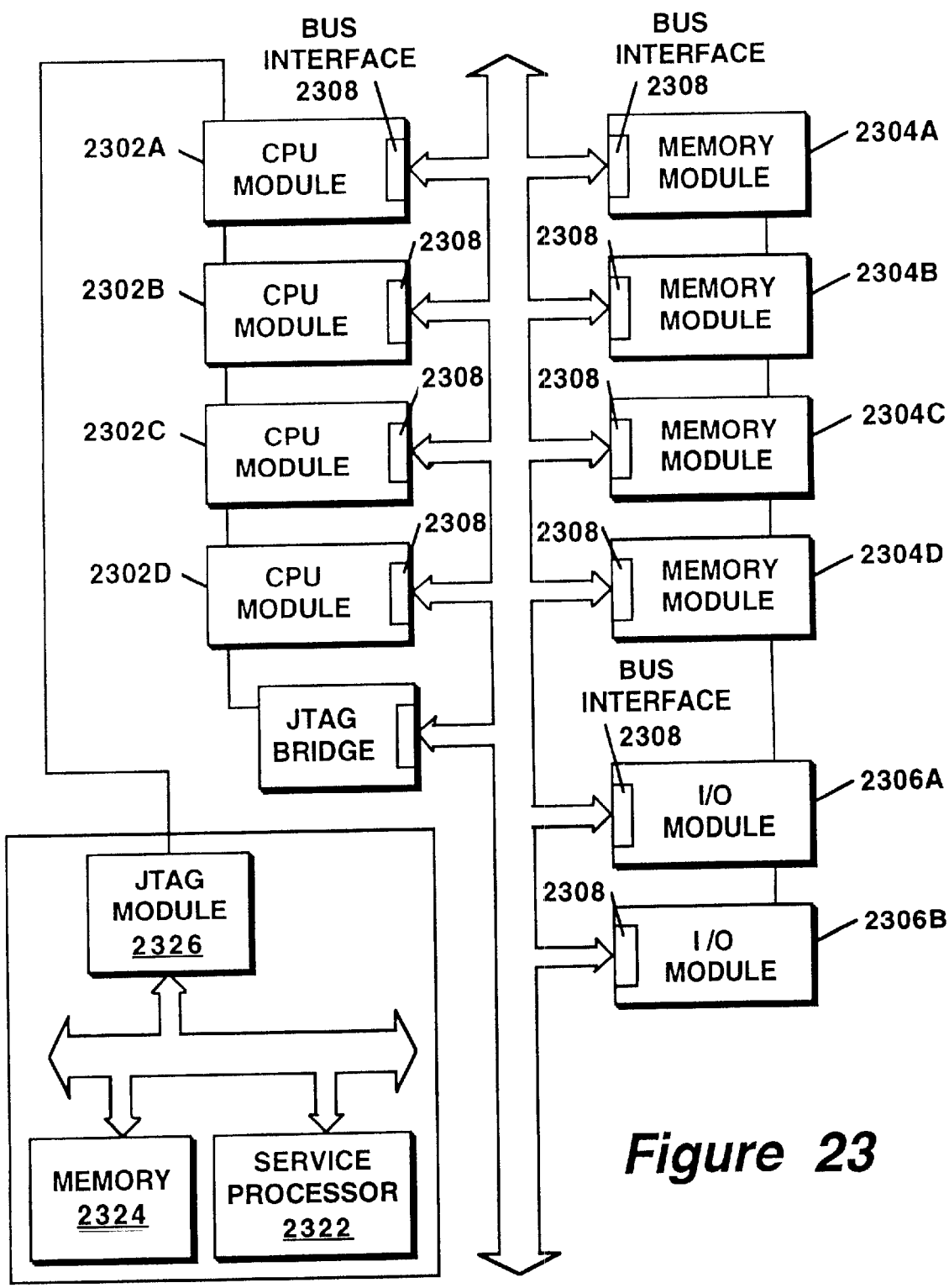
FIG. 23 is a block diagram of an illustrative architecture of an alternative, multiprocessor computer system in which the invention can be practiced.

As noted above, the electronic systems 100, 600, 900 of FIGS. 1, 6, and 9, respectively, as well as the service processor can be implemented as a computer system. FIGS. 22 and 23 illustrate types of computer systems in which the invention can be implemented. It should be understood at the outset that the invention can be implemented in any of a great variety of computer architectures, including both single-processor and multiprocessor designs. In addition, the invention can be practiced in other forms of intelligent devices, having system or other busses, for which the invention can be advantageously employed. Such other intelligent devices may include network devices, such as bridges and gateways, and communication devices.

Moreover, the single-processor computer system 2200 shown in FIG. 22 and the multiprocessor computer system 2300 shown in FIG. 23 are discussed only for illustrative purposes, and their specific layout and design should not be considered a limitation of the invention. Although the description below may refer to terms commonly used in describing particular computer systems, the described concepts apply equally to other computer systems, including systems having architectures that are dissimilar to that shown in FIGS. 22 and 23.

In FIG. 22, the computer system 2200 includes a central processing unit (CPU) 2205, which may include a conventional microprocessor, random access memory (RAM) 2210 for temporary storage of information, and read only memory (ROM) 2215 for permanent storage of information. A memory controller 2220 is provided for controlling system RAM 2210. A bus controller 2225 is provided for controlling system bus 2230, and an interrupt controller 2235 is used for receiving and processing various interrupt signals from the other system components.

Mass storage may be provided by diskette 2242, CD-ROM 2247, or hard disk 2252. Data and software may be exchanged with computer system 2200 via removable media, such as diskette 2242 and CD-ROM 2247. Diskette 2242 is insertable into diskette drive 2241, which is connected to system bus 2230 by controller 2240. Similarly, CD-ROM 2247 is insertable into CD-ROM drive 2246, which is connected to system bus 2230 by controller 2245. Finally, the hard disk 2252 is part of a fixed disk drive 2251, which is connected to system bus 2230 by controller 2250.

User input to and output from the computer system 2200 may be provided by a number of devices collectively constituting an I/O subsystem. For example, a keyboard. 2256 and a mouse 2257 may be connected to a system bus 2230 by keyboard and mouse controller 2255. An audio transducer 2296, which may act as both a microphone and a speaker, is connected to bus 2230 by audio controller 2297. It should be obvious to those reasonably skilled in the art that other input devices, such:as a pen and/or tablet and a microphone for voice input, may be connected to computer system 2200 through bus 2230 and an appropriate controller. DMA controller 2260 is provided for performing direct memory access to system RAM 2210. A visual display is generated by a video controller 2265, which controls video display 2270. Where the computer system 2200 is a server, the foregoing I/O devices may be part of the system only when needed for system monitoring, upgrading or servicing.

Computer system 2200 also includes a network adapter 2290 that allows the computer system 2200 to be interconnected to a network 2295 via a bus 2291. The network 2295, which may be a local area network (LAN), a wide area network (WAN), or the Internet, may utilize general-purpose communication lines that interconnect multiple network devices.

Moreover, the computer system 2200 can include an I/O bus adapter 2296 connected between the system bus 2230 and an I/O bus 2298 for communication between components connected to the system bus and one or more I/O devices connected to the I/O bus. The I/O bus adapter 2296 typically is a node on each of the busses 2230, 2298, and serves to convert signals on one of the busses intended for devices on the other into signals having the appropriate protocol and addressing for their destination.

The system bus 2230, network bus 2291, and I/O bus 2298 are collectively referred to herein for convenience as the "computer busses", a term intended to a encompass not just these named busses, but also any and all busses implementable in a computer system, including switched network interconnects. The computer busses each include address, control, and data lines for communication via the particular bus protocols with which each complies. Each of the devices connected to any of the computer busses includes a bus interface (as described above, though not separately shown in this figure) for driving and receiving signals over the bus in accordance with its bus protocol. Additionally, the computer system 2200 can include a service processor 2298. The service processor 2298 has a JTAG interface 2299A, which communicates over a dedicated JTAG link 2299B with other devices connected thereto.

Computer system 2200 generally is controlled and coordinated by operating system software, such as the SOLARIS™ operating system (available from Sun Microsystems, Palo Alto, Calif., USA). Among other computer system control functions, the operating system controls allocation of system resources and performs tasks such as process scheduling, memory management, networking and I/O services.

In FIG. 23, the multiprocessor computer system 2300 is shown as including four CPU modules 2302A–D, four memory modules 2304A–D, and two I/O modules 2306A–B. The exact number of each of these devices is used merely for purposes of illustration and other computer system implementations may include a greater or lesser number of these devices. Each of the modules 2302A–D, 2304A–D, and 2306A–B includes a bus interface 2308 for connecting their respective module to a system bus 2310. The system bus 2310 can be, for example, implemented as a network containing a point-to-point switching fabric. The interfaces 2308 contain logic for driving and receiving signals over the system bus 2310 in accordance with its bus protocol, preferably implemented as an integrated circuit, (IC). Moreover, each module 2302A–D, 2304A–D, and 2306A–B can be implemented as a separate application specific integrated circuit ("ASIC") containing the interface 2308.

FIG. 23 also shows a service processor module 2320 for managing service-related activities for the computer system 2300. The service processor module includes a service processor 2322 for executing programs, such as software, a memory 2324 for storing data and programs, and a JTAG module 2326, which can implement the JTAG interfaces 2306, for example, under the control of the service processor 2322. The service processor module 2320 can be implemented as a computer system, having the components discussed above in conjunction with FIG. 22.

A software implementation of components of the above-described embodiment may comprise computer instructions and routines either fixed on a tangible medium, such as a computer-readable media, e.g. the diskette 2242, CD-ROM 2247, ROM 2215, or fixed disk 2252 of FIG. 22, or transmittable via a modem or other interface device, such as communications adapter 2290 connected to the network 2295 over a medium 2291. Medium 2291 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

III. Bus Testing System for Performing HALT and HASS Testing and Bus Tuning

A. Product Operating Specifications

Generally speaking, in the electronics industry, manufacturers publish product operating specifications for their electronic devices, such as computer systems, in order to guide system integrators, service technicians and users. Design engineers typically employ operational testing of samples of the electronic device and empirical analysis to determine the product operating specifications. More recently, engineers use computational design analysis instead (or in addition) to simulate device performance, calculate ranges for operating parameters, and compute the product operating specifications. Many computer-aided design and verification tools have been introduced for this purpose. Even where operating specifications are computed by means of computational design analysis, the design house or manufacturer often employs operational testing to confirm and validate the calculated specifications, and verify simulation models and results. For example, where the electronic device is a computer system, the operating parameters for the computer's bus system need to be tested, which is conventionally performed using the computer's operating system and hardware instrumentation of product samples (e.g., production line samples), as described above.

"Safety margins" have to be built into the product operating specifications to safeguard against the effects of unusually extreme or even, for some cases, unanticipated operating conditions. The computer-generated and/or empirically determined ranges for operating parameters thus are used as starting points for determining the published or recommended values. Moreover, simple performance testing of new products is not sufficient. An electronic device's performance can change over the period of time in which the device is in use. In recognition of this, manufacturers perform burn-in procedures during final stages of manufacture of an electronic device. Unfortunately, actual operating parameter values can continue to change or drift after burn-in. Moreover, as heterogeneous input/output and other components from various manufacturers are added to the computer system, the bus signaling and operating components can change. Manufacturers do not necessarily take such potential parameter drift and other parameter time-dependent and use-dependent variations into account when determining safety margins. This process of setting operating specifications with built-in safety margins results in compromising optimal performance of the electronic device over its life expectancy.

Figure 24:
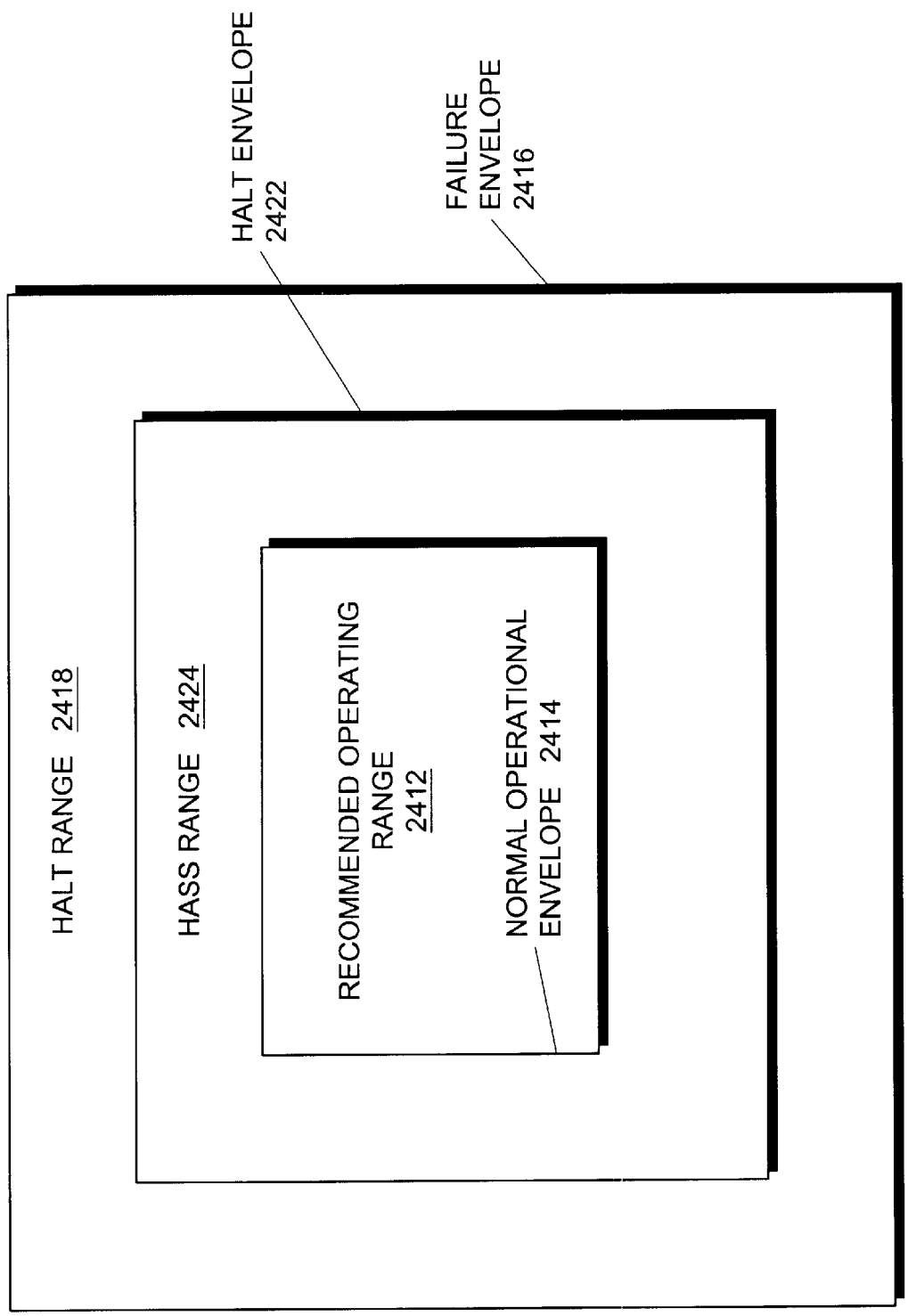
FIG. 24 is an illustration of HALT and HASS ranges and envelops associated with operation of an electronic device.

FIG. 24 illustrates operating range specifications for an electronic device and is useful in explaining how they are established and how the invention can be advantageously employed. A new device typically has a recommended operating range 2412, i.e., a range of values for operational parameters specified by, for example, its designer or manufacturer. The outer limits of this normal or recommended operation range 2412 can be called its normal operational envelope 2414. Beyond the normal operational envelope 2414 is another limit, called the failure envelope 2416. Operation of the device beyond the failure envelope 2416 is likely to result in an operational error condition, system failure, or even system crash. In short, at and beyond the failure envelop the device "breaks". Design engineers recognize that safety margins are required to assure, at least to some extent, that the device does not operate at or beyond the failure envelop 2416. Two types of safety margins are frequently considered in the design of electronic devices.

A first type of safety margin is called the HALT range 2418. HALT is an acronym for "Highly Accelerated Life Test". As the name imports, HALT subjects an electronic device to conditions that simulate a product life to determine the values of operating parameters that constitute the failure envelope. Once those values are determined, a current HALT range 2418 can be established by backing off those values by a selected margin. Accordingly, the HALT range 2418 is a safety margin adjacent to the failure envelope and determines a HALT envelope 2422. More specifically, for each operational parameter, the value (called the failure value) of that parameter at the failure envelope 2416 minus the HALT range (e.g., 10% less than the failure value) for that parameter yields the value of that parameter at the HALT envelop 2422. The foregoing calculation on a per-parameter basis is somewhat over simplistic because often parameters interact and are interdependent during operation. Thus, the HALT range for individual parameters depends often on the actual operational values of other parameters.

Additionally, the percentage used for the safety margin for each parameter or type of parameter can be different to reflect the different effects of time and use on the respective parameters. Thus, the HALT range 2418 can be, e.g., 10% for some parameters and, e.g., 2% for others. The HALT range 2418 for all of the parameters can be set, e.g., by testing the system relative to its failure modes and determining the minimal margin for the parameters that will statistically avoid system failure. If the failure envelop 2416 is so small as to render the design non-functional within that envelop for intended applications, then the designer must change the design, e.g., physically replace components of the design or alter the circuit layouts, etc., and re-test the new design.

A second type of safety margin is called the HASS range 2424. HASS is an acronym for "Highly Accelerated System Screening." HASS is used to assure that enough margin is built into a system to achieve acceptable levels of operation for approximating optimal performance. For example, a manufacturer may represent that the design can achieve certain levels of speed, and so would need to assure the attainment of those levels of performance under anticipated operating conditions by appropriate design testing. HASS involves cycling electrical characteristics (such as, e.g., voltages) and environmental characteristics (such as, e.g., operating temperatures), and observing not only mortality issues but also performance issues. Thus, HASS is used to determine parameter values that produce a deviation from desired levels of performance of the design. In other words, the HASS range 2424 is set as an additional safety margin (e.g., 8%) within the HALT envelope 2422, within which the design may not perform adequately enough, e.g., per customer expectations, for the manufacturer to recommend operation in that range. Accordingly, and again in a simplistic view, the recommended operational envelope 2414 can be computed by subtracting the HALT margin (e.g., of 10%) and the HASS margin (e.g., of 8%) from the failure values of operational parameters. If the resulting recommendable operational envelope 2414 would be so small as to render the design unacceptable for intended applications, then the designer must change the design, e.g., by replacing components or altering the circuit layouts, etc., and re-perform HALT and HASS on the new design.

B. Bus Testing Methodology for HALT and HASS Testing

Figure 25:
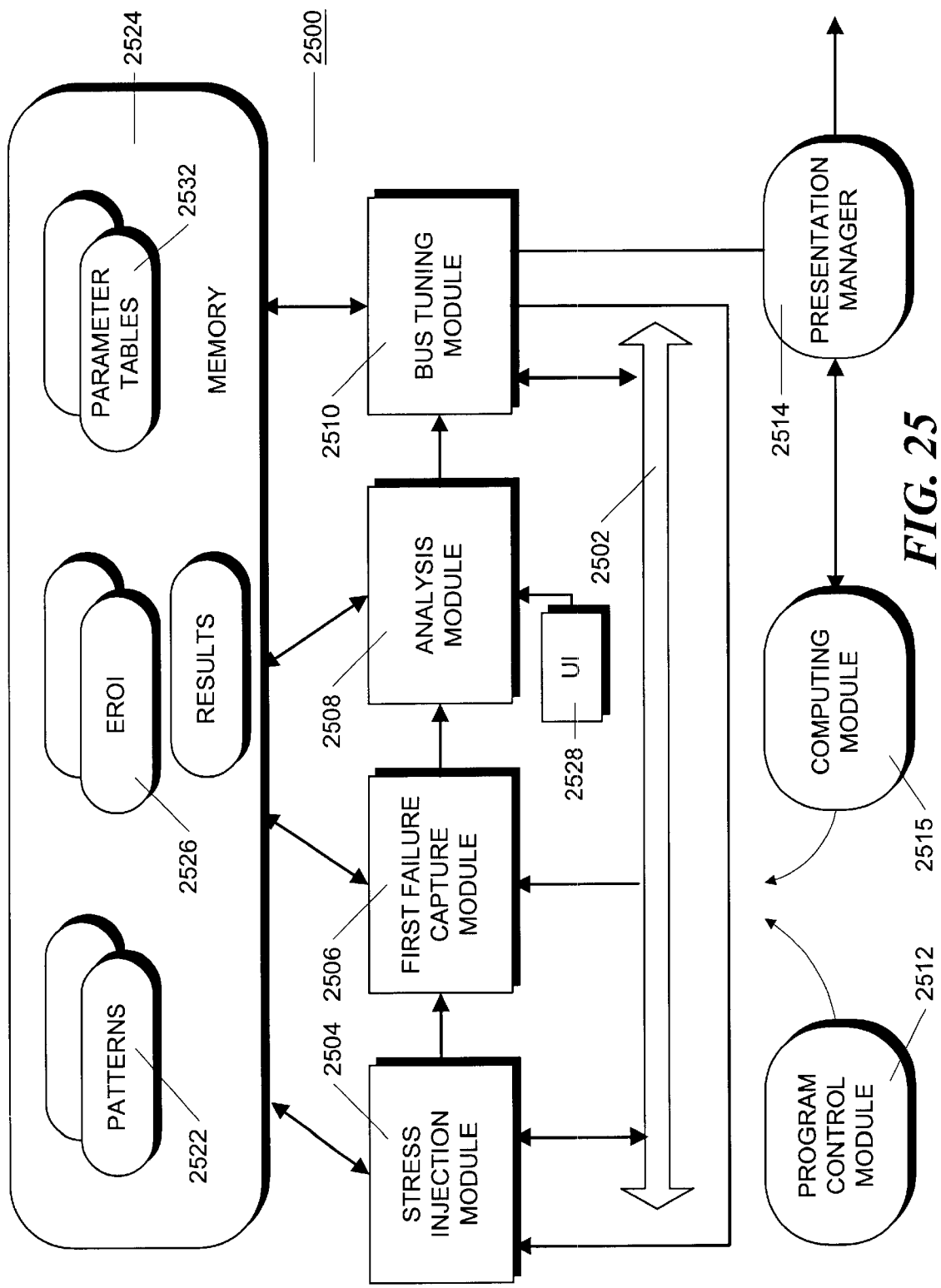
FIG. 25 is a block diagram of an embodiment of a bus testing system in accordance with an aspect of the invention.

FIG. 25 shows a system 2500 for testing a bus 2502, including the performance of HALT and HASS testing. The testing system 2500 includes a number of preferably embedded test modules, as follows: (a) a stress injection module 2504 for injecting test cycles (e.g., stimulus patterns) on the bus 2502, (b) a first failure capture module 2506 for identifying a first failure produced by the injected test cycles and capturing error-related operating information, (c) an analysis module 2508 for analyzing the error-related operating information, and (d) a bus tuning module 2510 for adjusting electrical characteristics of signals applied to the bus so as to adjust operating and signaling parameters of the bus. The test modules 2504–2510 preferably take advantage of digital data scanning through a program control module 2512, e.g., in accordance with the JTAG Spec. A presentation manager 2514, including a user interface, preferably a GUI, provides data output and reports on test results. Most, if not all, of these modules can be embedded within the device under test, e.g., on a single IC with other circuitry of the device used in carrying out the intended functions of the device.

More specifically, the stress injection module 2504 can be implemented, for example, as shown and described above in conjunction with FIGS. 1–5. The stress injection module 2504 can include the bus testing logic 120 (FIG. 1), which operates through the bus interface 122 (FIG. 1) to inject stimulus patterns 2522 from a pattern storage, e.g., memory 2524, onto the bus 2502; and, employing a unidirectional or loopback test methodology, obtain and store received patterns pending analysis, as described hereinabove or capture any resulting failure as also described above. The program control module 2512 is responsible for scanning the stimulus and received patterns in and out of the pattern storage 2524, respectively.

The first failure capture module 2506 can be implemented, for example, as shown and described above in conjunction with FIGS. 6–8. The first failure capture module 2506 can include the FFM logic 120 (FIG. 6), which operates to identify first failure conditions, as indicated by error flags 718 (FIG. 7), and to capture attendant error-related operating information (EROI) including state information in a dedicated shadow storage.device 706, 726 (FIGS. 7A, 7B). The program control module 2512 is responsible for scanning the EROI out of the dedicated storage device, and can place the EROI in an EROI storage 2526, e.g., in memory 2524 pending analysis, as described hereinabove.

The analysis module 2508 can be implemented, for example, to perform the comparisons of the test compare logic 422 (FIG. 4A) and perform other analysis regarding the EROI gathered by the first failure capture module 2506, so as to diagnosis any failures and performance issues. The analysis module 2508 can access the pattern storage 2522 and the EROI storage 2526, and, e.g., can provide a set of recommended electrical characteristics for the bus that would improve system performance. The analysis module 2508 can preferably do so using a rules-based expert system, but, alternatively, can rely on selections made by a human operator of the recommended electrical characteristics, based on the above-described comparisons and/or EROI, and their analysis. The operator can access the memory 2524 through a user interface 2528, and selections can be entered through the user interface 2528. The selections can be stored in parameter tables 2532 in memory 2524.

The bus tuning module 2510 can be implemented, for example, as described above in conjunction with FIGS. 9–21. The bus tuning module 2506 can access the selections in the parameter tables 2532 and adjust the bus 2502 accordingly. Specifically, the bus tuning module 2506 can set the electrical characteristics, for example, the voltages that control bus operating and signaling characteristics, such as driver rise and fall times, driver high and low voltage limits, receiver threshold voltages levels, termination resistance, driver and propagation time, as set forth in the parameter tables. In addition to controlling those types of bus operating and signaling parameters, the same voltages can be used to control other bus operating and signaling parameters, such as overshoot, undershoot, ringing, reflections, etc., as described above. The program control module 2512 is responsible for selecting values of digital select signals that determine the electrical characteristics, as described hereinabove.

Figure 26:
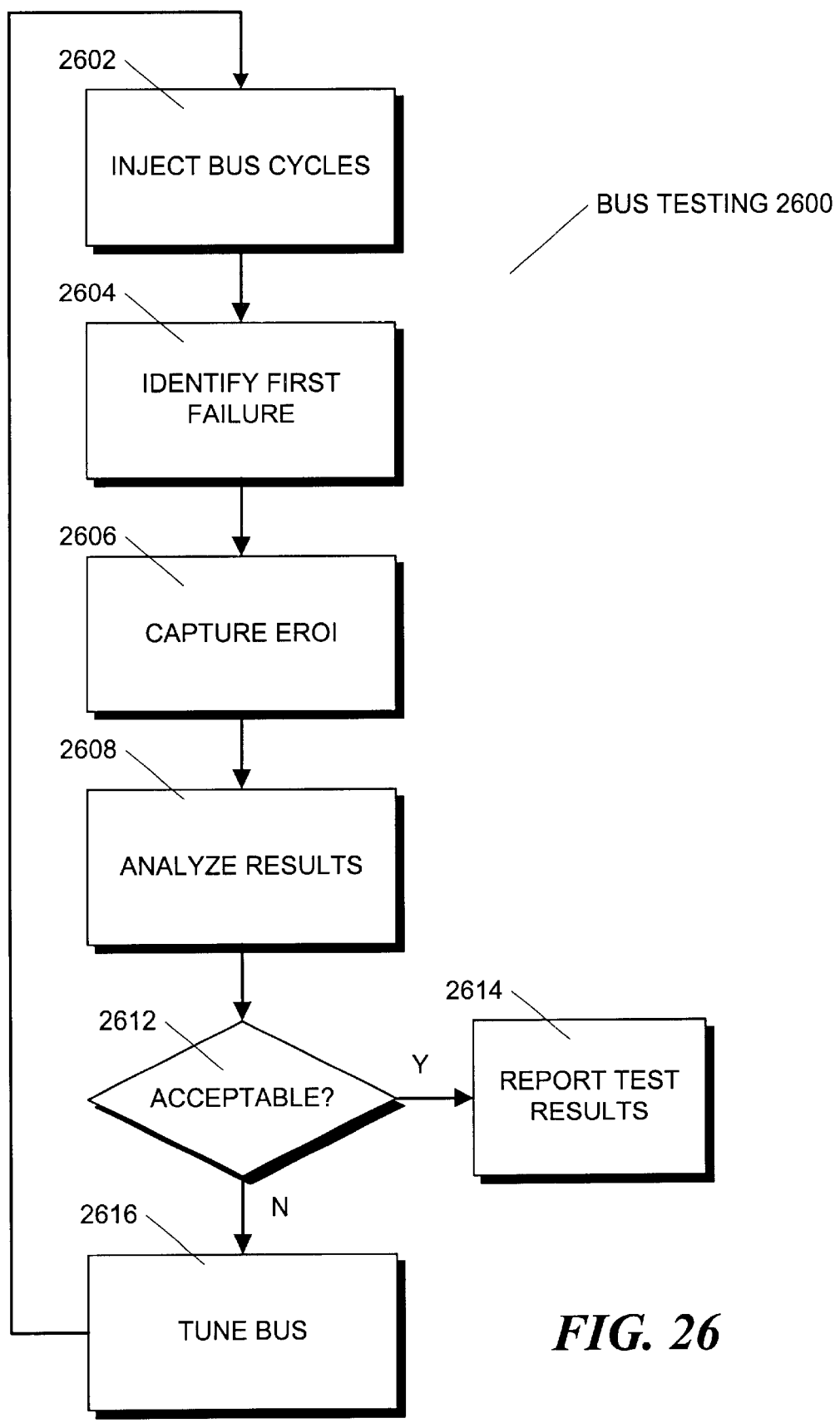
FIG. 26 is a block diagram of an exemplary method of bus testing using the apparatus of FIG. 25, in accordance with an aspect of the invention.

FIG. 26 shows a method 2600 for testing the bus 2502 (FIG. 25) using the bus tester 2500 just described. In block 2602, the method 2600 injects bus cycles, e.g., patterns of digital values, onto the bus and generates a set of received patterns. Then, the method 2600 identifies a first failure in block 2604 and captures EROI. In block 2608, the method 2600 analyzes the results. In block 2612, the method 2600 determines if a failure or system performance issue has been identified, or whether the results were within acceptable limits. If within acceptable limits, the method 2600 reports the results in block 2614. The method 2600 also determines in block 2612 whether any identified failure or performance issue can be corrected by adjusting the bus. If it cannot, the method 2600 so reports this conclusion via block 2614. On the other hand, if the method 2600 determines that a bus adjustment would be appropriate, the bus is tuned in block 2616 and, preferably, the test is repeated starting with block 2602. The method 2600 can be practiced to capture, diagnose, and correct errors in, and otherwise improve the performance of electrical devices, such as, for example, the computer systems 2200, 2300 shown in FIGS. 22 and 23, respectively. When so practiced, the program control module 2512 can be implemented, for example, as the service processor module 1520.

C. HALT Testing of Bus System

In accordance with another aspect of the invention, HALT testing is used to determine the failure envelope and related safety margins. HALT is performed usually at a manufacturer or testing facility charged with generating product operating specifications with suitable, built-in HALT margins. The HALT testing can be performed on samples of the electronic device, e.g., prototypes and, later, production run units, in order to establish the specifications. Then, from time to time during production, or when a design change occurs, HALT testing can be repeated to confirm the specifications.

Figure 27:
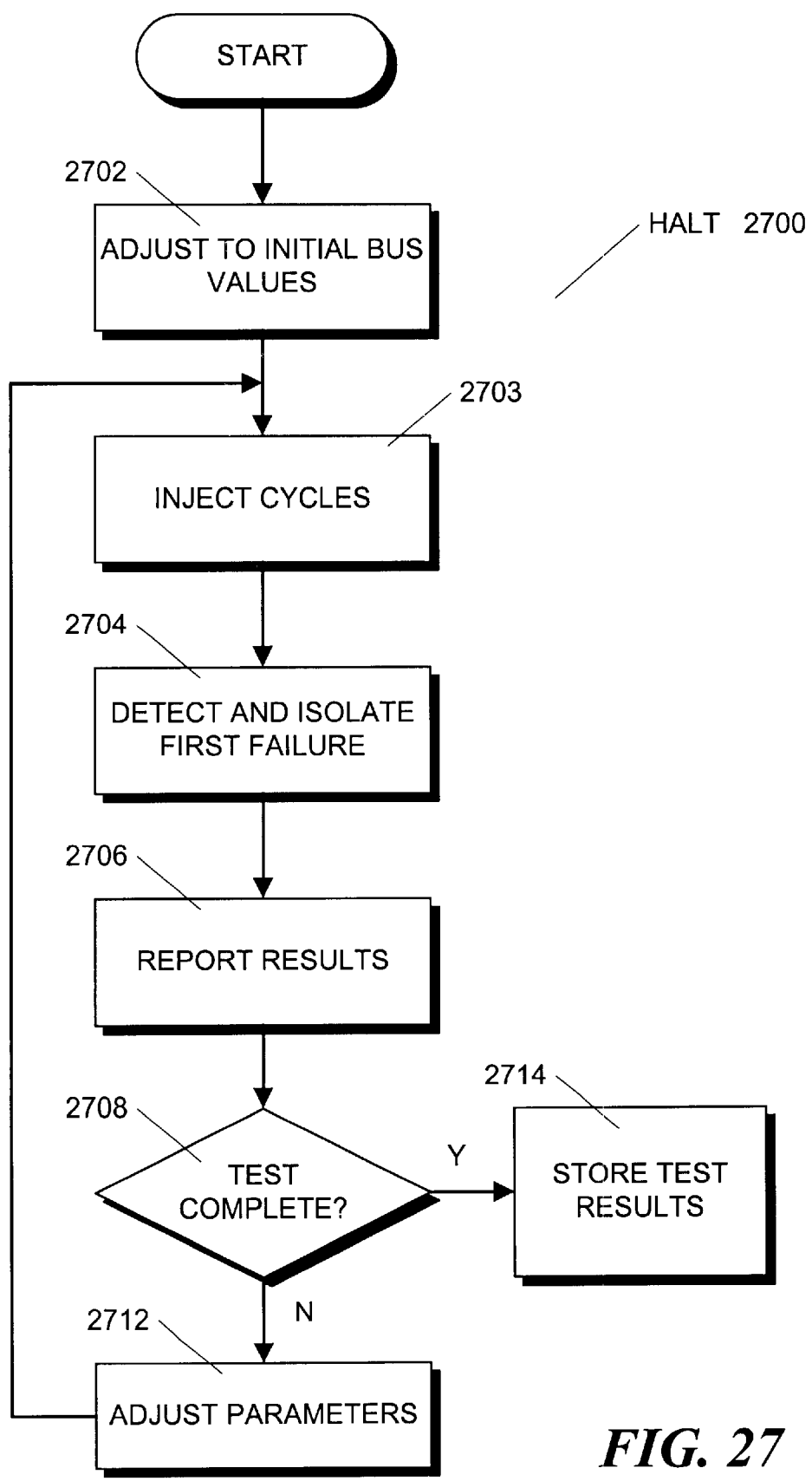
FIG. 27 is a block diagram of an exemplary method for performing HALT testing and tuning of electronic devices.

FIG. 27 shows a method 2700 for performing a HALT test, e.g., on a computer system, using the testing system 2500 (FIG. 25) in accordance with an embodiment of the invention. In block 2702, the method 2700 sets the bus operating and signaling parameters to an initial set of values predicted or calculated to stress the bus system and potentially cause a failure in the electronic device under test. Then, in block 2703, the method 2700 injects cycles, e.g., at 100% saturation or another percentile of bus utilization, onto the bus while the computer system is not necessarily running instruction stream code. A preferred approach to performing the cycle injection step employs the stress injection module 2504 (FIG. 25) to inject a number of preselected stimulus patterns intended to test the bus system under predetermined, often extreme, operating conditions. In block 2704, the method 2700 detects and isolates any resulting failure. A preferred approach to performing the failure detection and isolation step employs the first failure capture module 2506 (FIG. 25). In block 2706, the method 2700 reports the results of the testing. The method 2700 next, in block 2708 determines whether the test is complete. If it is not, then, in block 2718, the method 2700 adjusts the operating and signaling parameters to values that are incrementally more likely to cause failure. This is preferably performed using the bus turning module 2510 (FIG. 25) under control of the program control module 2612 and, in some applications, the computing module 2515 which computes the new set of values. Then, the method 2700 returns to block 2702. If block 2704 determines that the test is complete, the method 2700 in block 2714 reports results of the HALT test in block 2812.

An alternative approach to the HALT test involves adjusting the bus operating and signaling parameters until a first failure is detected, and then reporting the values that caused the failure. The program control module 2512 can be programmed to adjust the parameters in a certain order and/or within certain ranges so as to produce sets of parameter values that are sequential tested until failure occurs. The stimulus patterns that implement the sequence of sets of parameter values can be preloaded into the pattern storage 2522 (FIG. 25).

The HALT testing as just described can be used to aid in the design process. Different designs for the electronic device can be tested and their failure modes analyzed at various bus operating and signaling parameter values. Moreover, potential HALT ranges can be verified, e.g., at extreme operating conditions to assure that failure will not occur. Accordingly, the HALT testing as just described can also be used to determine the failure envelop and to establish the HALT range for use in determining the normal operating range and recommended specifications for the device or system. By re-running the test at a later time and comparing the results, aging and other changes can be detected. Other advantages and variations on the described HALT testing methodology will be apparent to those skilled in the art.

D. HASS Testing of Bus System

As noted above, HASS is used to assure that enough margin is built into the recommended operating specifications for an electronic device so that it will operate correctly when used within those specifications under a variety of anticipated operating conditions. The invention can be employed to perform HASS testing to tune one or more bus interfaces so as (a) to establish the HASS range and to determine the normal operating envelop and recommended specifications for the device or system; (b) to maintain substantially "like new" operation of the bus interface of an electronic device, and correct for parameter drift and other parameter time-dependent and use-dependent variations in signaling and operating parameters; and (c) to optimize operating and signaling parameters, e.g., for communication over a bus of an individual computer system as it exists, e.g., at a customer's location, and/or for particular customer applications.

For a better understanding of this aspect of the invention, consider a computer system set up to operate under conditions where the HASS range is 10% over the recommended operating range, and the HALT range is such that the failure envelop is only 1% over the HASS range. If the operating conditions (e.g., resulting parameter drift due to time in service) are such that the computer system operates 9% over the recommended operating range, the actual safety margin until failure is only 2%. It would be desirable to reset the operating and signaling parameters to provide a wider safety margin so as to more assuredly avoid failure. The invention can aid in achieving this result.

As another example, consider a computer system set up to run with a preset bus speed per recommended operating specifications, but an application requires maximization of bus speed. It would be desirable to reset the operating and signaling parameters to achieve that higher speed while assuring proper bus functioning, perhaps with a decrease in the safety margins. The invention can also aid in achieving this result.

Figure 28A:
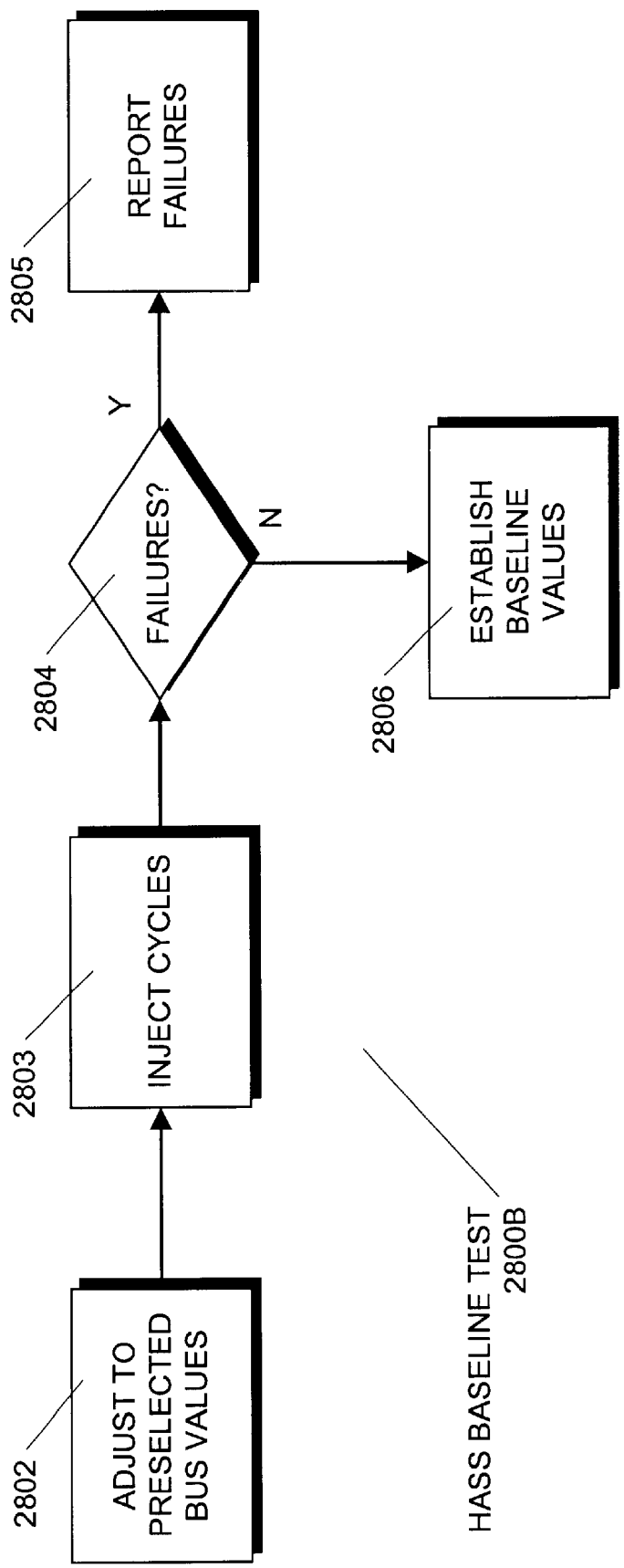

FIGS. 28A and 28B show methods 2800A and 2800B, respectively, for performing HASS testing, e.g., on a computer system, using the testing system 2500 (FIG. 25) in accordance with an aspect of the invention. The baseline-establishing method 2800A performs baseline testing, typically at manufacture time, to establish baseline values for signaling and operating parameters and resulting operating conditions of the computer system. The secondary method 2800B is performed later, such as after a period of Use of the electronic device, and at the factory or in the field, e.g., at a customer's facility. The results of the HASS secondary test can be compared with the baseline results, and, responsive to the comparison, the signaling and operating parameters adjusted, e.g., to return the system to substantially "like new" operation. Alternatively, the HASS secondary testing can be used to establish an initial set of test results, and the bus then adjusted to provide optimal results, e.g., for a particular application.

More specifically, the baseline-establishing method 2800A of FIG. 28A starts in block 2802 with adjusting the bus signaling and operating parameters to preselected bus values, e.g., those intended as the recommended operating values for the operating specifications for the electronic device. Then, in block 2803, the method 2800A injects cycles onto the bus, while the computer system is not running instruction stream code. A preferred approach to performing the cycle injection step employs the stress injection module 2504 (FIG. 25) to inject preselected stimulus patterns intended to test the bus system under predetermined operating conditions. In block 2804, the method 2800A tests to assure that no failures have been detected. Since the factory recommended values are used, the test should not detect any failure. A preferred approach to detecting such a failure is to,use the first failure capture module 2506 (FIG. 25). If any failures are detected, block 2805 reports the failure. If no failures are detected, as expected, the method 2800A in block 2806 establishes a set of baseline values for the electronic device. The set of baseline values can include, for example, the signaling and operating parameter values used in the test, along with the stimulus patterns applied to the bus, and the resulting operating information gathered by the capture module 2506. The set of baseline values can be stored and provided later for use in conjunction with HASS secondary testing.

The HASS secondary testing method 2800B of FIG. 28B preferably re-performs the steps 2802 and 2803 as performed in the baseline establishing method 2800A. Accordingly, the method 2800B starts in block 2807 with injecting cycles on the bus while the computer system is not running instruction stream code. A preferred approach to performing the cycle injection step employs the stress injection module 2504 (FIG. 25) to inject preselected stimulus patterns, preferably the same stimulus patterns used in the baseline-establishing test. In block 2808, the method 2800B detects and isolates any resulting failure and gathers information, including state information and other EROI produced by the stimulus patterns. A preferred approach to performing the failure detection and isolation step employs the first failure capture module 2506 (FIG. 25). Then, the method 2800B, in block 2810 compares the results with the baseline values obtained from the baseline-establishing test (FIG. 28A), and reports the results. Of course, from time to time during the use of the device, the method 2800B can be re-performed, as during POST procedures, with the results reported without the comparison being performed, as depicted by block 2812.

The method 2800B in block 2814 determines whether the performance of the comparison step is the initial one during the testing. If it is, then block 2815 determines whether parameter drift with respect to the baseline values, e.g., the recommended operating specifications, has occurred. Parameter drift has occurred if the comparison test indicates a significant difference between current test results and the baseline values. If parameter drift has not occurred, the method 2800B proceeds to block 2824 where the test results are stored. If block 2814 determines that the current pass through the comparison block 2810 is not the initial one, or block 2815 determines that parameter drift has occurred, the method 2800B proceeds with block 2816, where it determines whether parameter ranging is complete. If ranging has not yet begun, or is not otherwise completed, block 2818 undertakes adjustment of the signaling and operating parameters to return the device or system to normal operating specifications and/or substantially "as new" performance. This is performed, preferable, using the bus tuning module 2510 (FIG. 25). For example, the block 2812 can adjust or "range" the receiver threshold voltage, one or both of the driver output rise and fall times, bus termination resistance, etc. over a predetermined range of values, and, for each set of parameter values, block 2807 can inject cycles again until the comparison of block 2812 indicates specification-conforming performance. Upon such performance being achieved during testing or upon completion of ranging of parameter values, the method 2820 can proceed to block 2820, where the parameter values yielding the correct performance are identified. The method 2800B can then, in block 2822, e.g., set the bus parameter values to those parameter values found to yield the correct performance, and, in block 2824, store a record of those parameters and attendant test results, e.g., in memory 2524 (FIG. 25) for use, e.g., in subsequent HASS testing as the new baseline values.

Alternatively, the HASS secondary testing method 2800B can perform optimization of a device, such as a computer system. For this, the method performs the steps as described above, except that block 2810 compares the test results for each set of parameter values to the other tested sets of parameter values. In other words, for each tested set of parameter values, the comparison can be made against the prior test results that achieved the best or optimal performance, which test results can be regarded as the baseline results for comparisons with subsequent test results for other sets of parameter values. In block 2820, the method 2800B determines the parameter values yielding optimal performance. Block 2822 sets the device for those optimal parameters.

Figure 28C:
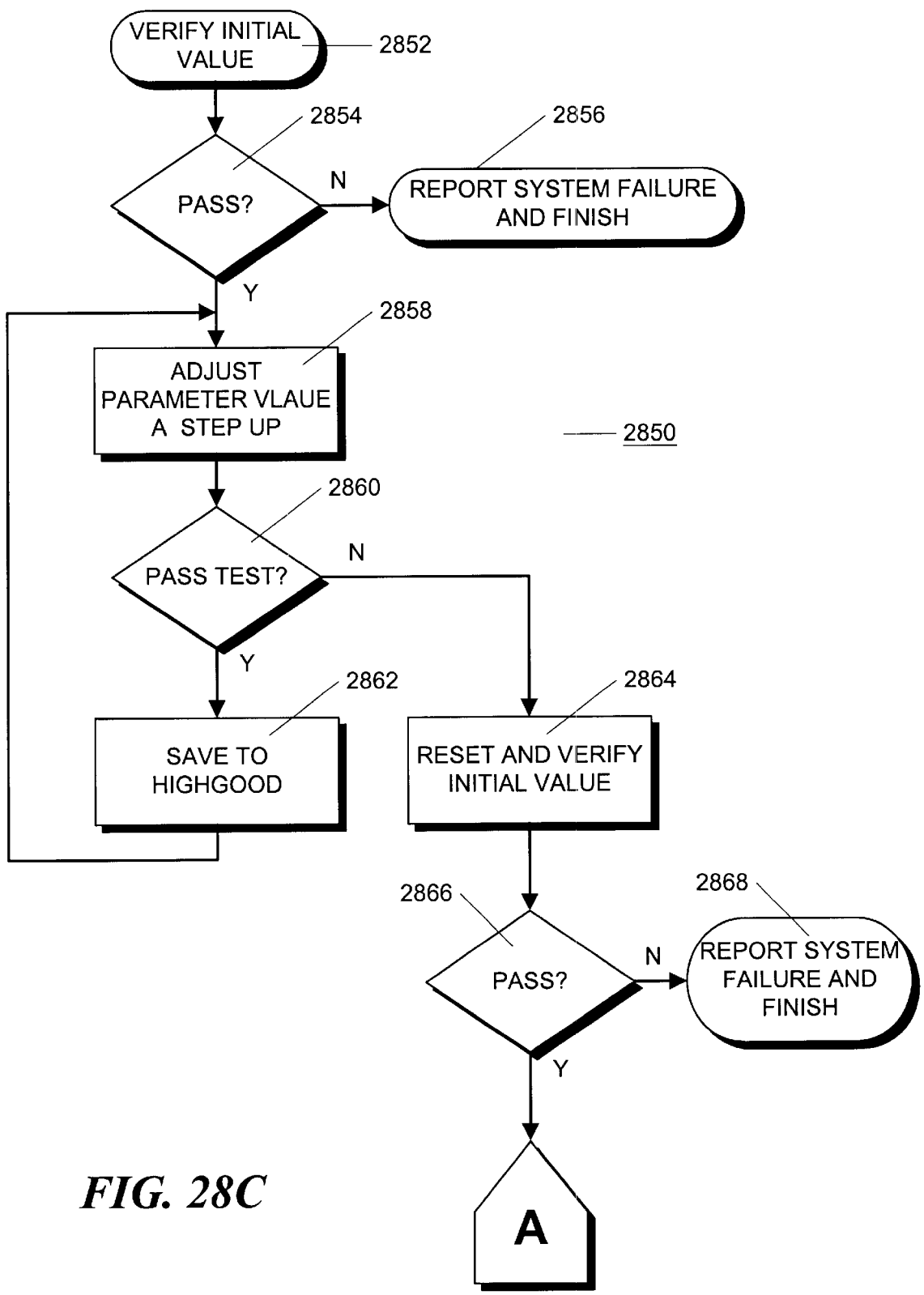
Figure 28D:
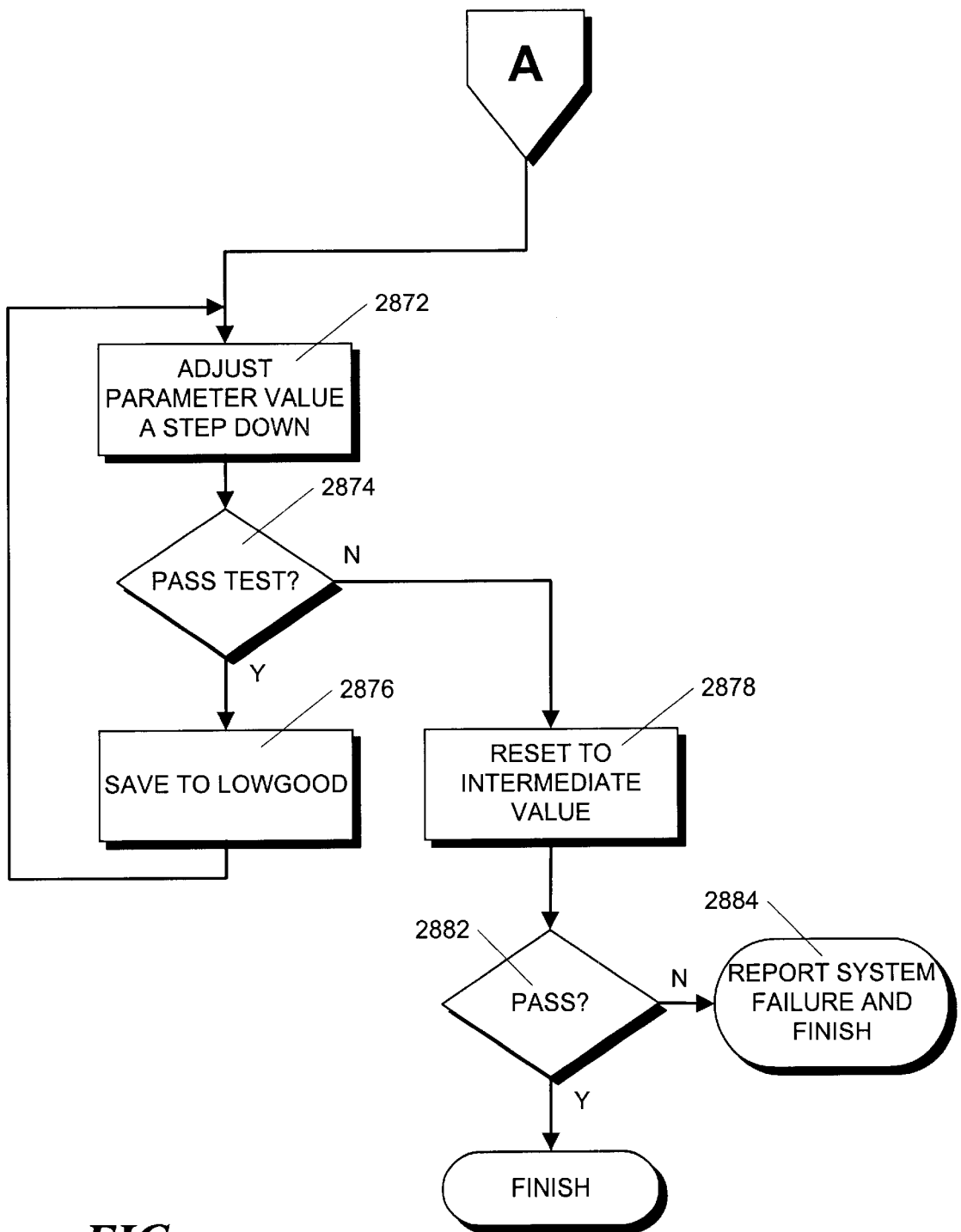

FIGS. 28C and 28D, when placed together, depict a method 2850 for establishing a baseline value for a signal parameter in a bus system, as referenced in FIG. 28A. The method 2850 starts at block 2852, where it verifies that the system operates correctly at a given initial value. The method 2850 in block 2854 tests whether the system passes at that value. If it does not, block 2856 reports a system failure. If the system passes, block 2858 adjusts the initial value to a new value, e.g., a single step up in the value. Block 2862 tests the system at this new value, and, if it passes, block 2862 saves the new value to a variable called HIGHGOOD. Then, method 2850 returns to block 2858 where the value can be again incremented in the same direction. If the test of block 2860 fails, the method 2850 proceeds to block 2864, where it resets the parameter to the initial value. Then, block 2866 tests whether the system passes at this value. If it does not, then block 2868 reports a system failure. If the system passes, block 2872 adjusts the parameter in the opposite direction to that of block 2858, e.g., a single step down. In other words, one of the blocks 2858 and 2872 increments the parameter value to test the operational limit in one direction, while the other decrements that value to test the operational limit in the other direction. Block 2874 tests whether the system passes at this value. If it does pass, block 2876 saves the new value to a variable called LOWGOOD, and then returns to block 2872 where the value is again adjusted. If it does not pass, the method 2850 in block 2878 resets the parameter to a value intermediate HIGHGOOD and LOWGOOD, e.g., the average of the values of those variables. Block 2882 tests the system at that value. If it does not pass, block 2884 reports system failure. If the system passes, then the method 2850 is finished. Preferably, the system starts with values of HIGHGOOD and LOWGOOD equal to the initial values and ends with the intermediate value between the values of the HIGHGOOD and LOWGOOD. The intermediate value is the baseline value for purposes of HASS testing and, in some implementations, for optimizing of the system.

There are many advantages to be obtained by practicing various testing applications and techniques in accordance with this aspect of the invention. HASS secondary testing can be used to optimize bus interface operation, e.g., to maintain a desired safety margin or a set of desired operating and signaling parameters for a particular application. For example, the method 2800 can be used to determine how a parameter may vary, and then an operator (or the system itself) can choose a maximum value or minimum value, whichever is more desirable for that parameter. Moreover, HASS secondary testing can also be used to predict failure of a tested system, and to change bus signaling and operating parameters to avoid the otherwise predicted failure, e.g., by widening HALT/HASS margins.

More specifically, HASS testing can be constructed to test and tune a bus system using a variety of different techniques, of which a few examples will now be described. For example, a series of moderate, selectable adjustments to propagation time would allow testing at a series of increasingly faster bus transfer speeds without stressing other system components. For example, for a 100 MHz bus, propagation time can be increased at a uniform rate of 0.1 nSec per step so as to increase effective bus transfer speeds.

Envelope testing of bus parameters can be performed for system margining. The bus parameters can be changed by predetermined amounts within the recommended operating range during HASS testing. If the system has degraded since manufacture, it is likely to fail at the extreme values within the recommended operating range. The number of different sets of parameter values to be used during testing can be predetermined to best stress the system. Failures indicate a shift in performance that can easily translate to a precursor of deteriorating system reliability.

Time optimization of bus parameters involves optimizing individual bus parameters for achieving each parameters best value for contribution to optimal bus operation. This can be performed by using the variable propagation time adjustment, described above, to increase effective bus speed and testing the bus while adjusting the parameter to find its fastest successful operating point.

Optimizing bus operation involves time optimization of individual parameters to tune the bus system for its optimal operating point. In this case, the term "optimal" can mean the fastest operating point. This can be performed by individually optimizing each parameter. The order of parameter optimization and the number of passes through the HASS secondary testing loop of FIG. 28B while adjusting the parameter should be selected to minimize parameter inter-dependencies.

Maximizing threshold margins involves, on a working system, setting the receiver threshold voltage to optimize noise margins. This is performed by running the HASS secondary test while raising the threshold voltage until a failure is detected, and noting this maximum voltage level that caused the failure. This voltage level is also lowered until a failure occurs, and this minimum voltage level is noted. The threshold voltage is then set to a value between the noted maximum and minimum voltages, e.g., at a level half way between them. This can be performed on an operating system to take into account effects of temperature, system noise, power supply voltages, and other normal operating conditions. This methodology sets the best point based on the actual strobe time rather than an artificial time, as does the above-described optimizing bus parameter technique.

D. Bus System Adjustment Based on Device Configuration

One issue in improving the performance and reliability of computer systems and other electronic devices is the heterogeneous components that make up the system, either as factory-installed components or as add-on components placed in the system by other parties, such as system integrators or customers. System performance and reliable can be improved by adjusting characteristics of bus signals to account for the loading, and noise and other contributions of such components.

Figure 29:
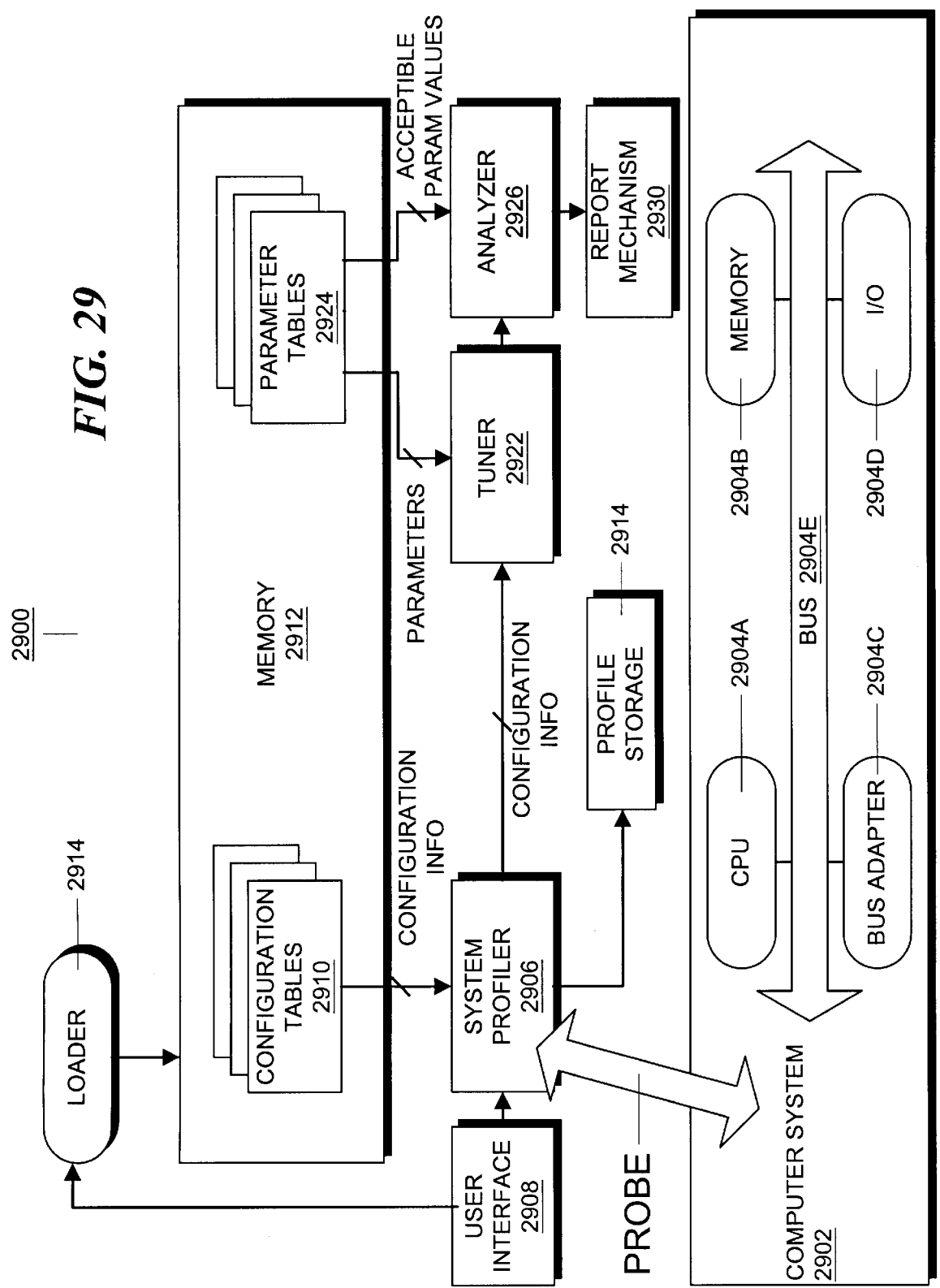
FIG. 29 is a block diagram of an exemplary tuning system for adjusting characteristics of bus signals based upon configuration make-up of an electronic system.

FIG. 29 shows a tuning system 2900 for adjusting characteristics of bus signals based upon configuration make-up of an electronic system, e.g., computer system 2902. The computer system 2902 is illustrated as containing a number of devices 2904A–D, including a central processing unit 2904A, a memory 2904B, a bus adapter 2904C and an I/O device 2904D, such as a monitor or keyboard (not separately shown in this figure), interconnected by a bus 2904E via respective bus interfaces (not shown in this figure). This aspect of the invention should not be construed as limited to use in conjunction with computer systems of the type as illustrated in FIG. 29.

The tuning system 2900 has a system profiler 2906, which probes the types of devices contained in the computer system, e.g., as part of a start-up or boot-up routine or POST procedure, thus developing a device profile for the computer system. The device profile can contain the identity (ID) of each device connected to the system bus, e.g., in terms of type of device (e.g., CPU, memory, etc.), manufacturer, model number, and/or other relevant specifications. Developing the system profile by probing the computer system 2902 has a number of advantages; for example, it can be performed dynamically to account regularly for all changes in configuration, and automatically without human involvement. For example, in systems so equipped, probing can use the same device ID information currently used in "plug and play" operation of add-on components. Nonetheless, the system profiler 2906 preferably is responsive to a user interface, 2908, e.g., a graphical user interface through which a technician can control its operation.

Alternatively, the system profiler 2906 can fetch the device configuration information from configuration tables 2910 stored in memory 2912. This can take place under user control, or automatically, in the event of difficulties encountered in performing a device probe. The configuration tables 2910 can be loaded into memory 2912 by a loader 2914, e.g., a computer-executed program operated by a technician, e.g., using the user interface 2908. To load the required information, the technician will need to have inventoried the devices 2904A–D and, in some cases, cross-referenced the devices in a configuration database to obtain the information. The configuration tables 2910 can contain system profiles for a plurality of computer systems, including computer system 2902, indexed, e.g., by a system identifier selectable by the technician. The technician will often need to confirm device information by comparing the information in the configuration tables with the inventory of component devices. Accordingly, it should be apparent that probing is a preferable approach to obtaining system profiles. The system profile containing the configuration information obtained by the system profiler 2906 either by probing or from the configuration tables 2910 can be stored for later reference in a profile storage unit 2914.

The tuning system 2900 also has a tuner 2922, which receives configuration information from the system profiler 2906, and uses that information as an index into a set of parameter tables 2924 to obtain a set of operating and signaling parameters for the bus interfaces of the devices contained in the computer system 2902. The parameter tables 2924 can be stored, e.g., in memory 2912, as illustrated, or on diskettes, CD ROMs or other portable storage devices. The parameter tables 2924 can contain operating and signaling parameters, e.g., for each of a multitude of potential devices that may be contained in the computer system 2902 or for the specific devices of each of a plurality of possible configurations of the computer system 2902. For example, each parameter table can contain parameters with respect to a different type of device, e.g., to a network card, expansion memory card, etc. The contents of the parameter tables 2924 can be empirically derived, e.g., during a quality assurance process or by HASS or HALT testing, or derived from manufacturer specifications. The operating and signaling parameters obtained from the parameter tables 2924 using the configuration information can include, for example, rise and fall times for the bus driver, voltage high and low limits for the bus driver, threshold voltage for the receiver, bus termination resistance, driver propagation time, or other adjustable parameters with respect to the bus drivers, receivers and terminators of computer system 2902. The tuner 2922 preferably can also tune the bus to those operating and signaling parameters to improve performance in light of the system profile.

The tuner system 2900 has an analyzer 2926 that cooperates with the tuner 2922 in performing HASS testing, as described above, to ascertain performance of the computer system 2902 at those operating and signaling parameters, and thus with its specific configuration. Preferably, the analyzer 2926 also ranges the parameters, as described in conjunction with FIG. 28B to yield optimized performance. The reporting mechanism 2930 stores the resulting test information, including the operating and signaling parameter values to which the computer system 2902 was adjusted, and can report those results to a technician.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Though an exemplary embodiment of the invention has been disclosed, it will be apparent to those skilled in the art that various changes and modifications can be made which will achieve some of the advantages of the invention without departing from the spirit and scope of the invention. For example, the invention can be implemented by those reasonably skilled in the art in the bus drivers, receivers, and terminators shown and described in the above-referenced patents instead of those described hereinabove. Moreover, it will be obvious to those reasonably skilled ii the art that other components performing the same functions may be suitably substituted. Further, the methods of the invention may be achieved in either all software implementations, using the appropriate processor instructions, or in hybrid implementations that utilize a combination of hardware logic and software logic to achieve the same results, or in hardware and firmware implementations. Further, aspects such as the size of memory, the specific configuration of logic and/or instructions utilized to achieve a particular function, as well as other modifications to the disclosed embodiments and the inventive concept are intended to be covered by the appended claims.

What is claimed is:

1. A testing method for testing a bus system of an electronic device, the bus system including a bus interface coupled with a bus characterized by a number of parameters, the testing method comprising:

(a) determining the configuration of the electronic device;
   (b) injecting a set of stimulus patterns on the bus;
   (c) collecting information regarding operation of the electronic device corresponding to the stimulus patterns, including information identifying any error resulting from the set of stimulus patterns;
   (d) comparing the collected information with information corresponding to the configuration of the electronic device;
   (e) determining, responsive to the comparing step, whether the electronic device is operating within a predetermined set of operating specifications; and
   (f) adjusting values of one or more of the parameters by varying one or more electronic characteristics of the bus interface in response to a set of digital control signals to obtain a set of operating and signaling parameters of the bus interface that cause the electronic device to operate within the predetermined set of specifications.

2. The testing method in accordance with claim 1, wherein the set of operating and signaling parameters include driver output voltage and receiver threshold voltage.

3. The testing method in accordance with claim 1, wherein the set of operating and signaling parameters include bus signal propagation time.

4. The testing method in accordance with claim 1, wherein the adjusting step includes adjusting bus signal propagation time to increase effective bus speed.

5. The testing method in accordance with claim 4, wherein the adjusting step includes testing the bus at a series of different bus transfer speeds by selectively adjusting bus signal propagation times.

6. The testing method in accordance with claim 1, wherein the adjusting step changes the values of the parameters within a range determined by the set of the operating specifications, and the method further includes:

(g) determining degradation of the device by identifying an error resulting from the adjusted parameters.

7. The testing method in accordance with claim 1, further comprising:

(h) setting the parameter comprising a receiver threshold voltage to optimize noise response, the setting step comprising: (h1) raising the receiver threshold voltage until an error is identified at a corresponding first level of the receiver threshold voltage; (h2) lowering the receiver threshold voltage until an error is identified at a corresponding second level of the receiver threshold voltage; and (h3) setting the receiver threshold voltage at a third level between the first and second levels.

8. The testing method in accordance with claim 1, wherein the configuration determining step comprises probing the electronic device to determine its configuration.

9. The testing method in accordance with claim 1, wherein the configuration determining step comprises extracting configuration information from a configuration table.

10. The testing method in accordance with claim 1, wherein the comparing step comprises extracting parameter related information corresponding to the configuration of the electronic device from a parameter table and comparing the collected information with the extracted information.

11. A testing apparatus for testing a bus system of an electronic device, the bus system including a bus interface coupled with a bus characterized by a number of parameters, the testing apparatus comprising:

a mechanism for determining the configuration of the electronic device;
   a mechanism for injecting a set of stimulus patterns on the bus;
   a mechanism for collecting information regarding operation of the electronic device corresponding to the stimulus patterns, including information identifying any error resulting from the set of stimulus patterns;
   a mechanism for comparing the collected information with information corresponding to the configuration of the electronic device;
   a mechanism for determining, responsive -to the comparing mechanism, whether the electronic device is operating within a predetermined set of operating specifications; and
   a mechanism for adjusting values of one or more of the parameters by varying one or more electronic characteristics of the bus interface in response to a set of digital control signals to obtain a set of operating and signaling parameters of the bus interface that cause the electronic device to operate within the predetermined set of specifications.

12. The testing apparatus in accordance with claim 11, wherein the set of operating and signaling parameters include driver output voltage and receiver threshold voltage.

13. The testing apparatus in accordance with claim 11, wherein the set of operating and signaling parameters include bus signal propagation time.

14. The testing apparatus in accordance with claim 11, wherein the adjusting mechanism is operable to adjust bus signal propagation time to increase effective bus speed.

15. The testing apparatus in accordance with claim 11, wherein the adjusting mechanism is operable to test the bus at a series of different bus transfer speeds by selectively adjusting bus signal propagation times.

16. The testing apparatus in accordance with claim 11, wherein the adjusting mechanism changes the values of the parameters within a range determined by the set of the operating specifications, and the testing apparatus further includes determining degradation of the device by identifying an error resulting from the adjusted parameters.

17. The testing apparatus in accordance with claim 11, further comprising a mechanism for setting the parameter comprising a receiver threshold voltage to optimize noise response, the setting mechanism operable for raising the receiver threshold voltage until an error is identified at a corresponding first high level of the receiver threshold voltage; lowering the receiver threshold voltage until an error is identified at a corresponding second level of the receiver threshold voltage; and setting the receiver threshold voltage at a third level between the first and second levels.

18. The testing apparatus in accordance with claim 11, wherein the configuration determining mechanism comprises a mechanism for probing the electronic device to determine its configuration.

19. The testing apparatus in accordance with claim 11, wherein the configuration determining mechanism comprises a mechanism for extracting configuration information from a configuration table.

20. The testing apparatus in accordance with claim 11, wherein the comparing mechanism comprises a mechanism for extracting parameter related information corresponding to the configuration of the electronic device from a parameter table and comparing the collected information with the extracted information.

21. A tuning apparatus for testing and adjusting a bus system of an electronic device, the bus system including a bus interface coupled with a bus characterized by a number of parameters, the tuning apparatus comprising:
   a mechanism for determining the configuration of the electronic device;
   a mechanism embedded in the device for injecting a set of stimulus patterns on the bus;
   a mechanism embedded in the device for collecting information regarding operation of the electronic device corresponding to the stimulus patterns, including information identifying any error resulting from the set of stimulus patterns;
   a mechanism embedded in the device for adjusting values of one or more of the parameters by varying one or more electronic characteristics of the bus interface in response to a set of digital control signals to obtain a set of operating and signaling parameters of the bus interface that cause the device to operate within the predetermined set of specifications; and
   a mechanism for selecting a set of values of the parameters that provide a desired performance of the bus system based at least in part on the configuration of the electronic device, and for causing the adjusting mechanism to adjust the parameters to the selected set of values.

22. The tuning apparatus in accordance with claim 21, wherein the set of operating and signaling parameters include driver output voltage and receiver threshold voltage.

23. The tuning apparatus in accordance with claim 21, wherein the set of operating and signaling parameters include bus signal propagation time.

24. The tuning apparatus in accordance with claim 21, wherein the adjusting mechanism is operable to adjust bus signal propagation time to increase effective bus speed.

25. The tuning apparatus in accordance with claim 21, wherein the adjusting mechanism is operable to test the bus at a series of different bus transfer speeds by selectively adjusting bus signal propagation times.

26. The tuning apparatus in accordance with claim 21, further comprising a mechanism for setting the parameter comprising a receiver threshold voltage to optimize noise response, the setting mechanism operable for A) raising the receiver threshold voltage until an error is identified at a corresponding first high level of the receiver threshold voltage; B) lowering the receiver threshold voltage until an error is identified at a corresponding second level of the receiver threshold voltage; and C) setting the receiver threshold voltage at a third level between the first and second levels.

27. The tuning apparatus in accordance with claim 21, wherein the configuration determining mechanism comprises a mechanism for probing the electronic device to determine its configuration.

28. The testing apparatus in accordance with claim 21, wherein the configuration determining mechanism comprises a mechanism for extracting configuration information from a configuration table.

* * * * *